US011899499B2

(12) United States Patent
Seger, Jr. et al.

(10) Patent No.: US 11,899,499 B2
(45) Date of Patent: Feb. 13, 2024

(54) TOUCH SENSING IN A DEVICE HAVING A FLEXIBLE/FOLDABLE TOUCH SCREEN DISPLAY

(71) Applicant: SigmaSense, LLC., Wilmington, DE (US)

(72) Inventors: Richard Stuart Seger, Jr., Belton, TX (US); Michael Shawn Gray, Elgin, TX (US); Daniel Keith Van Ostrand, Leander, TX (US); Patrick Troy Gray, Cedar Park, TX (US)

(73) Assignee: SigmaSense, LLC., Wilmington, DE (US)

( * ) Notice: Subject to any disclaimer, the term of this patent is extended or adjusted under 35 U.S.C. 154(b) by 0 days.

(21) Appl. No.: 18/102,413

(22) Filed: Jan. 27, 2023

(65) Prior Publication Data
US 2023/0168717 A1 Jun. 1, 2023

Related U.S. Application Data

(63) Continuation of application No. 17/444,417, filed on Aug. 4, 2021, now Pat. No. 11,592,874.

(51) Int. Cl.
G06F 1/16 (2006.01)
G06F 3/041 (2006.01)
G06F 3/044 (2006.01)

(52) U.S. Cl.
CPC .......... *G06F 1/1652* (2013.01); *G06F 1/1616* (2013.01); *G06F 1/1643* (2013.01);
(Continued)

(58) Field of Classification Search
CPC combination set(s) only.
See application file for complete search history.

(56) References Cited

U.S. PATENT DOCUMENTS 6,218,972 B1 4/2001 Groshong
6,665,013 B1 12/2003 Fossum et al.
(Continued)

FOREIGN PATENT DOCUMENTS

| CN | 103995626 A | 8/2014 |
| CN | 104182105 A | 12/2014 |
| CN | 104536627 A | 4/2015 |

OTHER PUBLICATIONS

Baker; How delta-sigma ADCs work, Part 1; Analog Applications Journal; Oct. 1, 2011; 6 pgs.
(Continued)

*Primary Examiner* — Lisa Lea-Edmonds
(74) *Attorney, Agent, or Firm* — Garlick & Markison; Harry S. Tyson, Jr.

(57) ABSTRACT

A device having a flexible touch screen display configured to display images in at least a first touch area and a second touch area. The first touch area is configured to rotate with respect to the second touch area along a folding axis. A first plurality of touch sensitive column and row electrodes are integrated into the first touch area and a second plurality of column and row electrodes are integrated into the second touch area of the flexible display. The device further includes a plurality of drive-sense circuits that drive sensor signals on the electrodes. A processing module senses, based on the sensor signals, an electrical characteristic of at least one row electrode and at least one column electrode of the first touch area or the second touch area and determines, based on the electrical characteristic, a proximal touch to at least one of the first touch area or the second touch area.

20 Claims, 55 Drawing Sheets

(52) U.S. Cl.
CPC .......... *G06F 1/1647* (2013.01); *G06F 1/1692* (2013.01); *G06F 3/0444* (2019.05); *G06F 3/0446* (2019.05); *G06F 3/04166* (2019.05)

(56) References Cited

U.S. PATENT DOCUMENTS

| | | | |
|---|---|---|---|
| 7,528,755 B2 | 5/2009 | Hammerschmidt | |
| 8,031,094 B2 | 10/2011 | Hotelling | |
| 8,089,289 B1 | 1/2012 | Kremin et al. | |
| 8,279,180 B2 | 10/2012 | Hotelling et al. | |
| 8,537,110 B2 | 9/2013 | Kruglick | |
| 8,547,114 B2 | 10/2013 | Kremin | |
| 8,587,535 B2 | 11/2013 | Oda et al. | |
| 8,625,726 B2 | 1/2014 | Kuan | |
| 8,657,681 B2 | 2/2014 | Kim | |
| 8,966,400 B2 | 2/2015 | Yeap | |
| 8,982,097 B1 | 3/2015 | Kuzo et al. | |
| 9,081,437 B2 | 7/2015 | Oda | |
| 9,201,547 B2 | 12/2015 | Elias | |
| 10,007,335 B2 | 6/2018 | Lee | |
| 10,152,087 B2 * | 12/2018 | Jung | G06F 1/1677 |
| 10,514,792 B2 * | 12/2019 | Kim | G06F 3/04164 |
| 10,620,732 B2 * | 4/2020 | Oh | G06F 3/0412 |
| 11,036,310 B2 | 6/2021 | Seo et al. | |
| 11,093,096 B2 * | 8/2021 | Hyun | G06F 3/04186 |
| 11,119,591 B2 | 9/2021 | Hong | |
| 11,182,038 B2 * | 11/2021 | Van Ostrand | G06F 3/044 |
| 11,216,133 B2 * | 1/2022 | Van Ostrand | G06F 3/0446 |
| 11,221,709 B2 * | 1/2022 | Van Ostrand | G06F 3/0441 |
| 11,269,436 B2 | 3/2022 | Van Ostrand | |
| 11,435,864 B1 | 9/2022 | Van Ostrand | |
| 11,460,999 B2 | 10/2022 | Gray | |
| 11,474,634 B2 | 10/2022 | Derichs | |
| 11,474,685 B2 | 10/2022 | Gray | |
| 11,481,059 B2 * | 10/2022 | Gray | G06F 3/0412 |
| 11,494,032 B2 * | 11/2022 | Seger, Jr. | G06F 3/04182 |
| 11,429,218 B2 | 12/2022 | Van Ostrand | |
| 11,531,436 B2 * | 12/2022 | Xu | G06F 3/0446 |
| 11,573,671 B2 * | 2/2023 | Hyun | G06F 3/0446 |
| 11,586,309 B2 * | 2/2023 | Gray | G06F 3/0416 |
| 11,592,874 B1 * | 2/2023 | Seger, Jr. | G06F 3/0416 |
| 11,662,847 B2 * | 5/2023 | Gray | G06F 3/0445 345/173 |
| 2011/0063154 A1 | 3/2011 | Hotelling et al. | |
| 2011/0298745 A1 | 12/2011 | Souchkov | |
| 2012/0278031 A1 | 11/2012 | Oda | |
| 2013/0278447 A1 | 10/2013 | Kremin | |
| 2014/0327644 A1 | 11/2014 | Mohindra | |
| 2015/0091847 A1 | 4/2015 | Chang | |
| 2015/0346889 A1 | 12/2015 | Chen | |
| 2016/0188049 A1 | 6/2016 | Yang et al. | |
| 2016/0328042 A1 * | 11/2016 | Chang | G06F 3/0446 |
| 2017/0139513 A1 | 5/2017 | Hong | |
| 2018/0059822 A1 * | 3/2018 | Seo | G06F 1/1652 |
| 2018/0157354 A1 | 6/2018 | Blondin et al. | |
| 2018/0275824 A1 | 9/2018 | Li | |
| 2019/0064980 A1 * | 2/2019 | Oh | G06F 3/0445 |
| 2019/0391680 A1 | 12/2019 | Jung | |
| 2020/0210014 A1 * | 7/2020 | Oh | G06F 3/0412 |
| 2020/0210024 A1 * | 7/2020 | Hyun | G06F 3/04164 |
| 2021/0104582 A1 | 4/2021 | Kim | |
| 2021/0149438 A1 | 5/2021 | Van Ostrand | |
| 2021/0149518 A1 | 5/2021 | Gray | |
| 2021/0365152 A1 * | 11/2021 | Xu | G06F 3/0412 |
| 2022/0035488 A1 * | 2/2022 | Hyun | G06F 3/0448 |
| 2022/0155897 A1 | 5/2022 | Van Ostrand | |
| 2022/0210253 A1 * | 6/2022 | Kwak | G06F 3/0418 |
| 2023/0039953 A1 * | 2/2023 | Seger, Jr. | G06F 3/0444 |
| 2023/0168717 A1 * | 6/2023 | Seger, Jr. | G06F 1/1616 361/679.02 |
| 2023/0244339 A1 * | 8/2023 | Jeong | G06F 3/0416 345/174 |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; dated Jun. 13, 2023; 7 pgs.

* cited by examiner

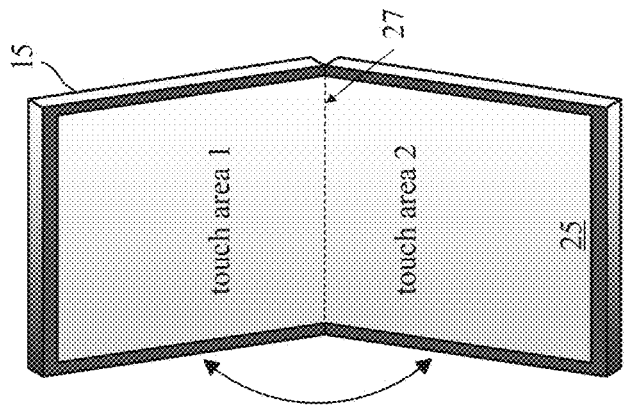
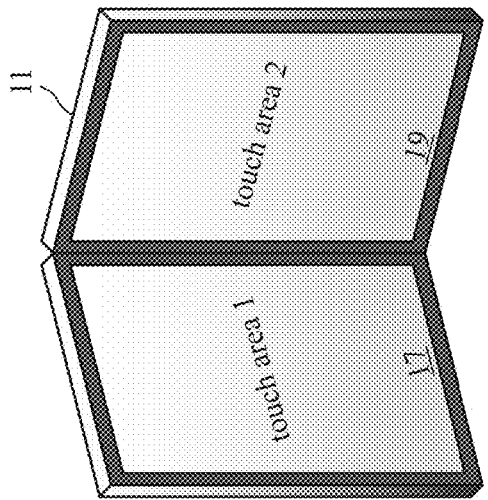
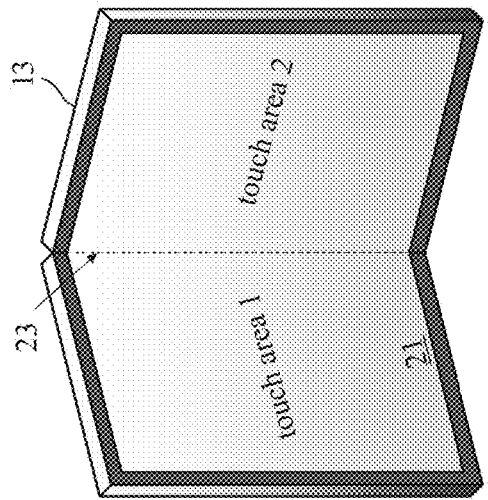
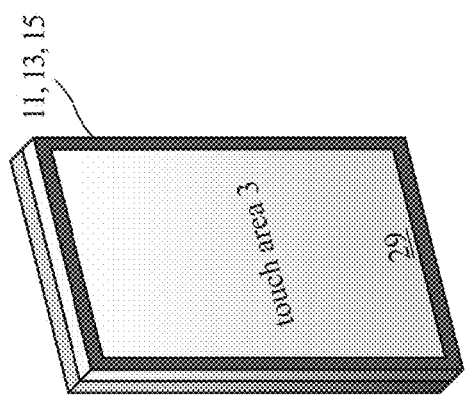

rolling touch screen display computing device 14 computing device 18 drive-sense circuit (DSC)

display 83 with in-cell touch sensors (OLED)

2-TFT AMOLED sub-pixel

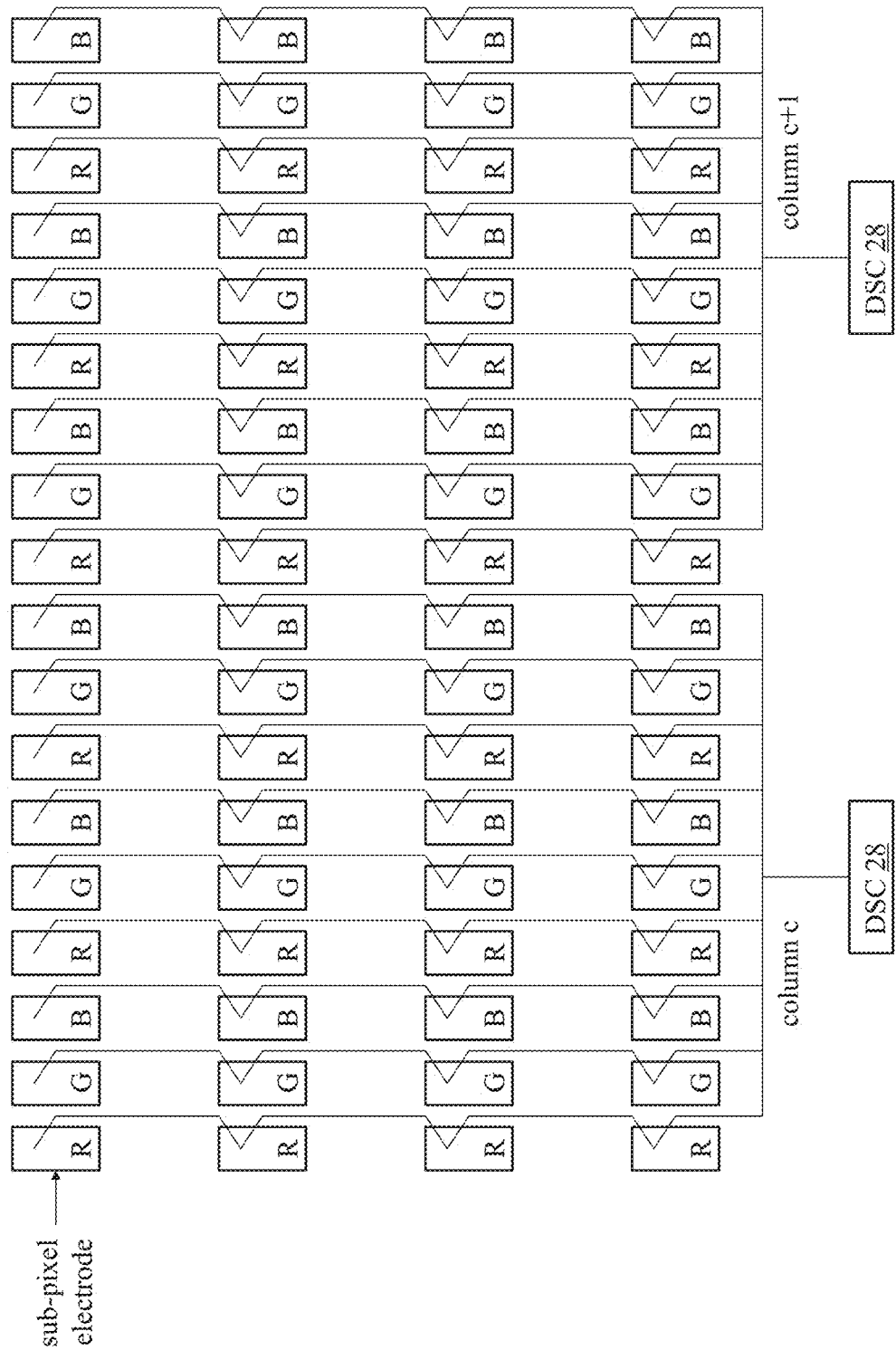

display 83-1 with on-cell touch sensors

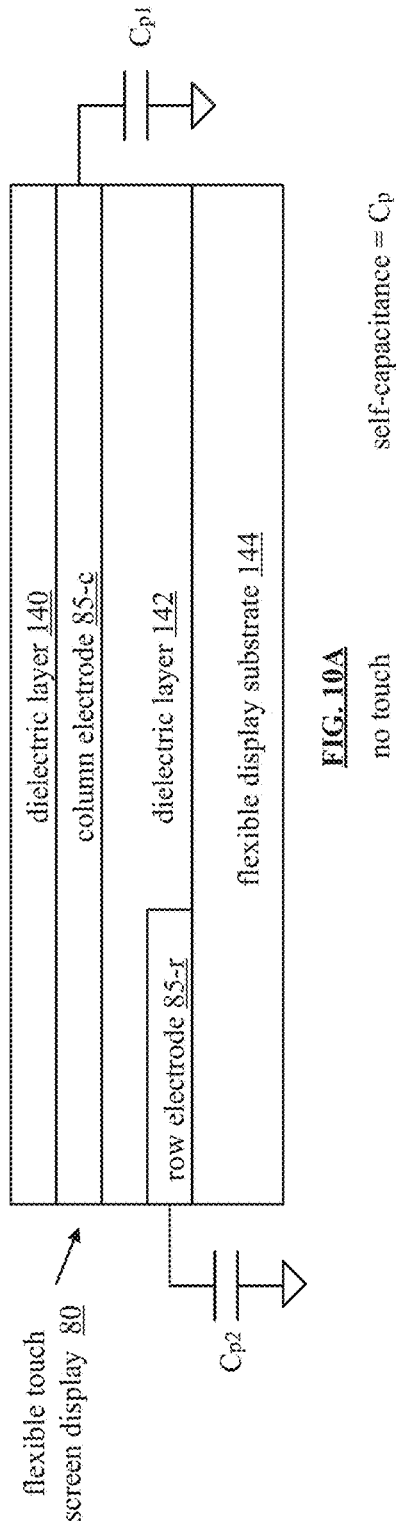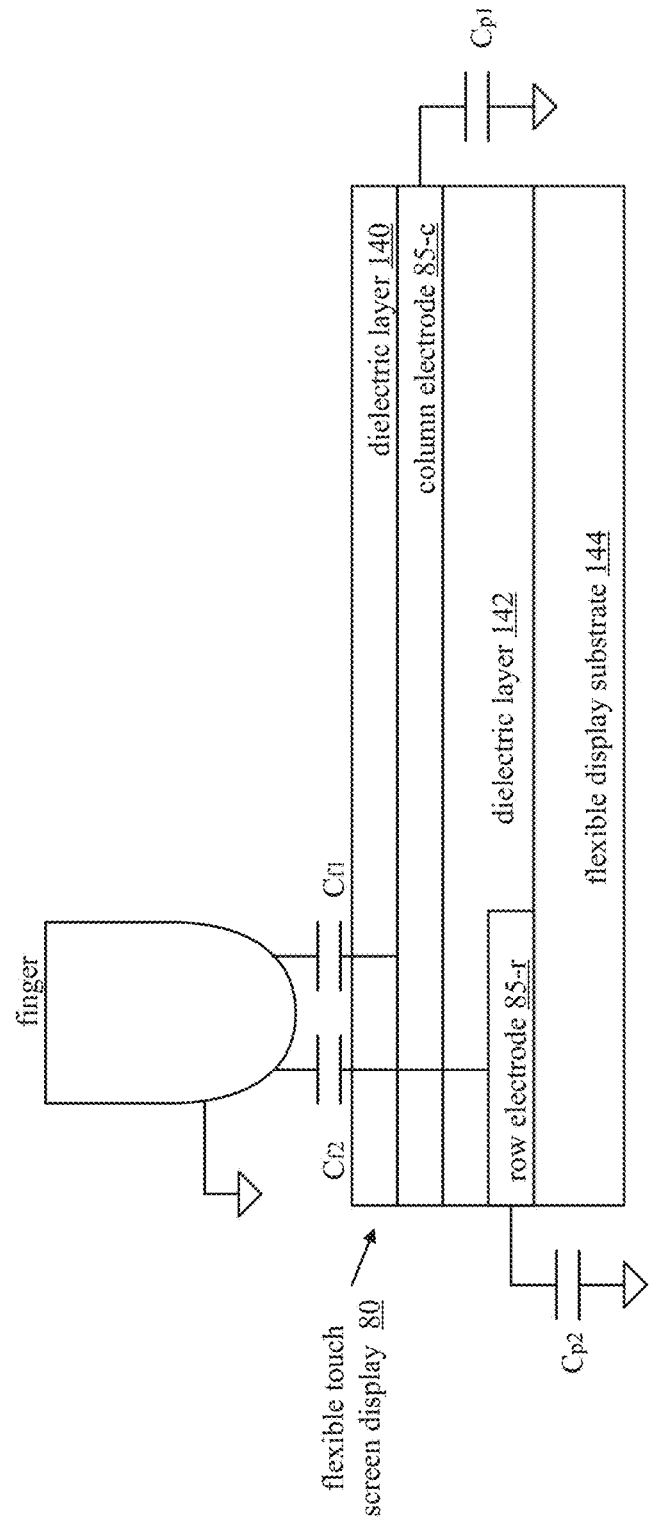

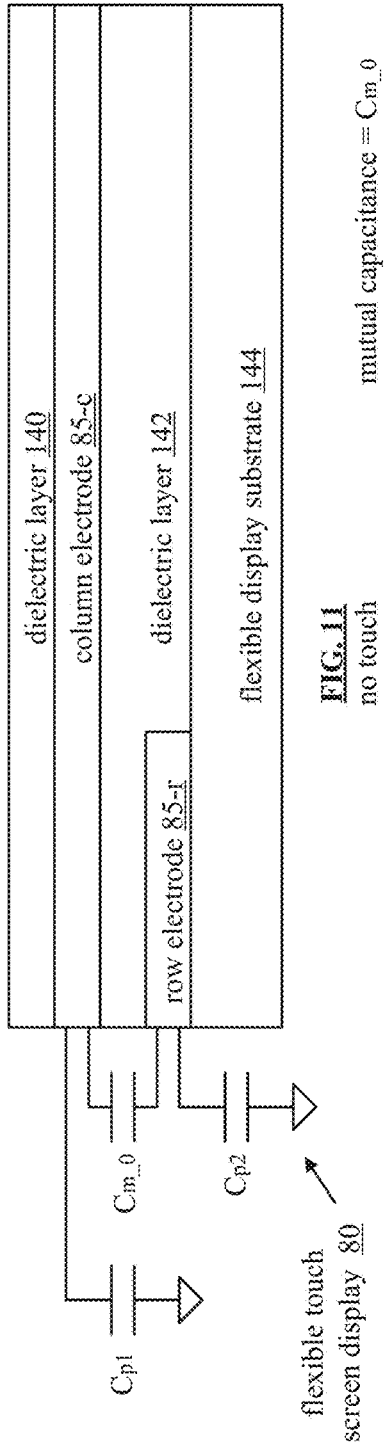
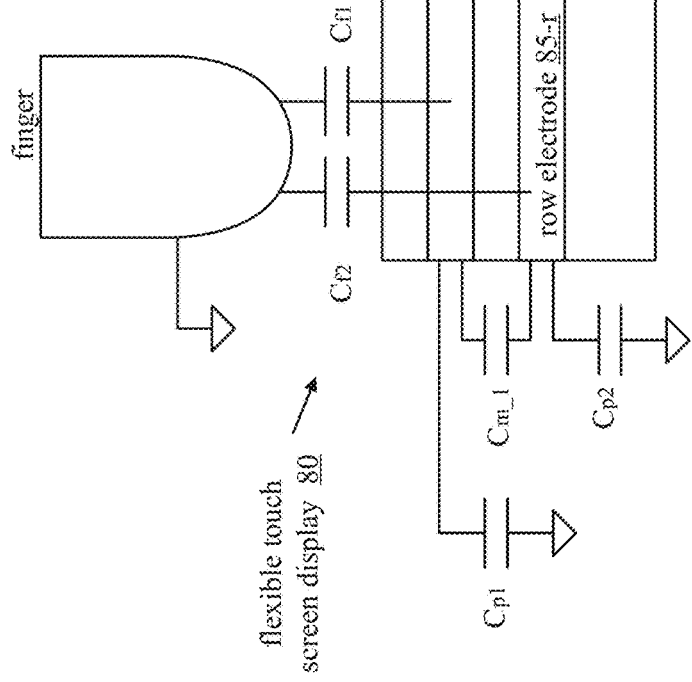

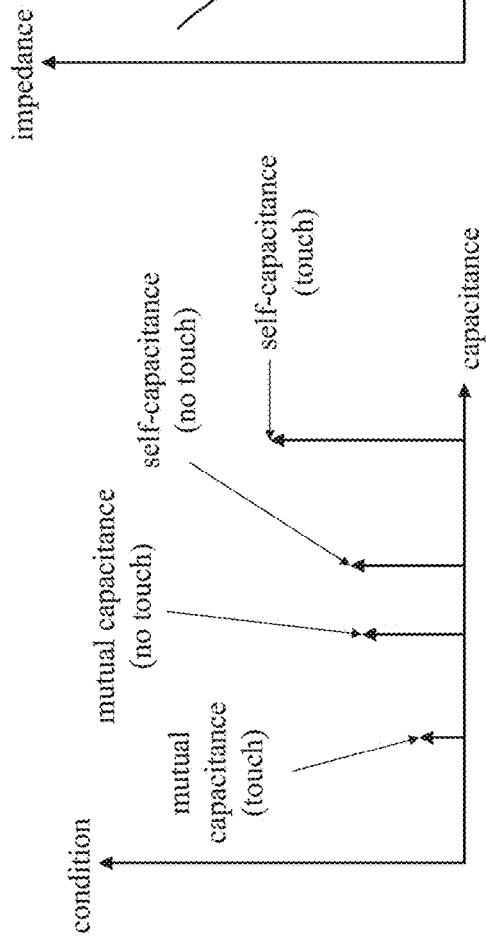
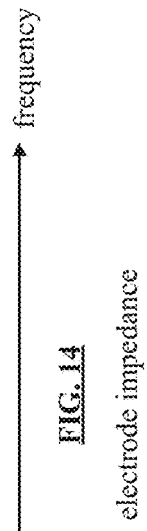
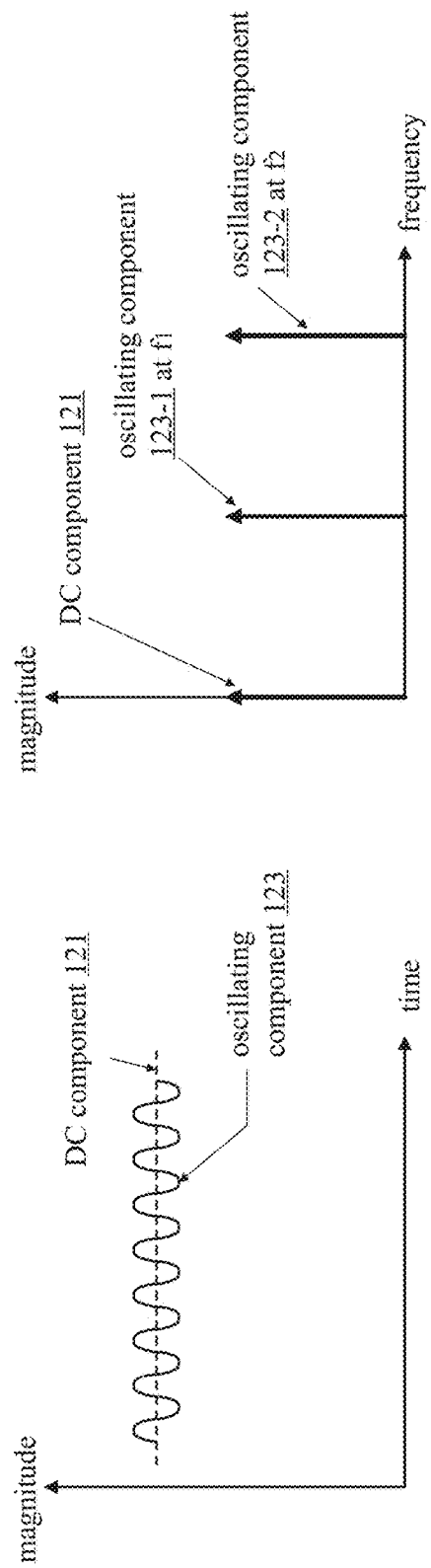

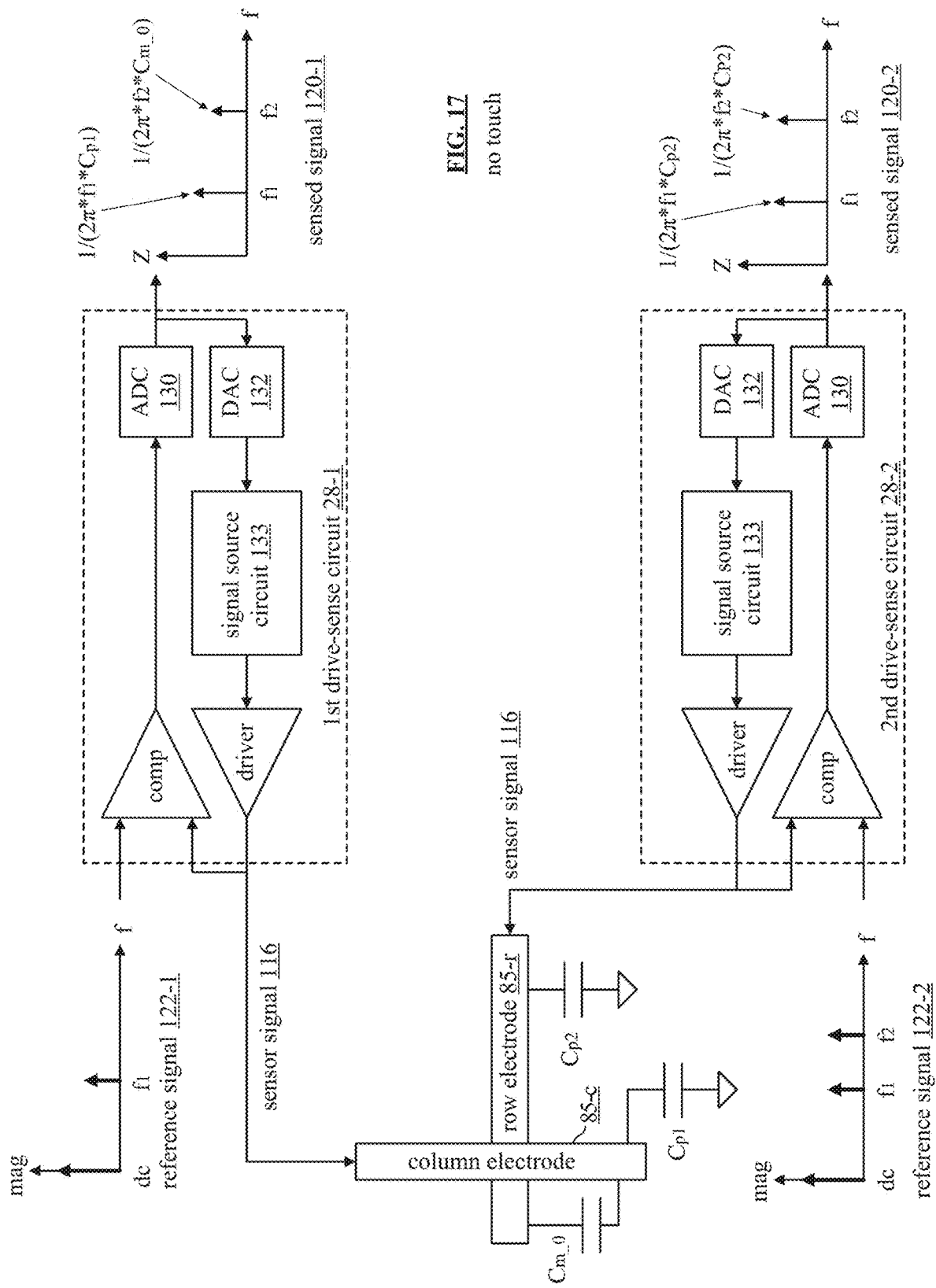

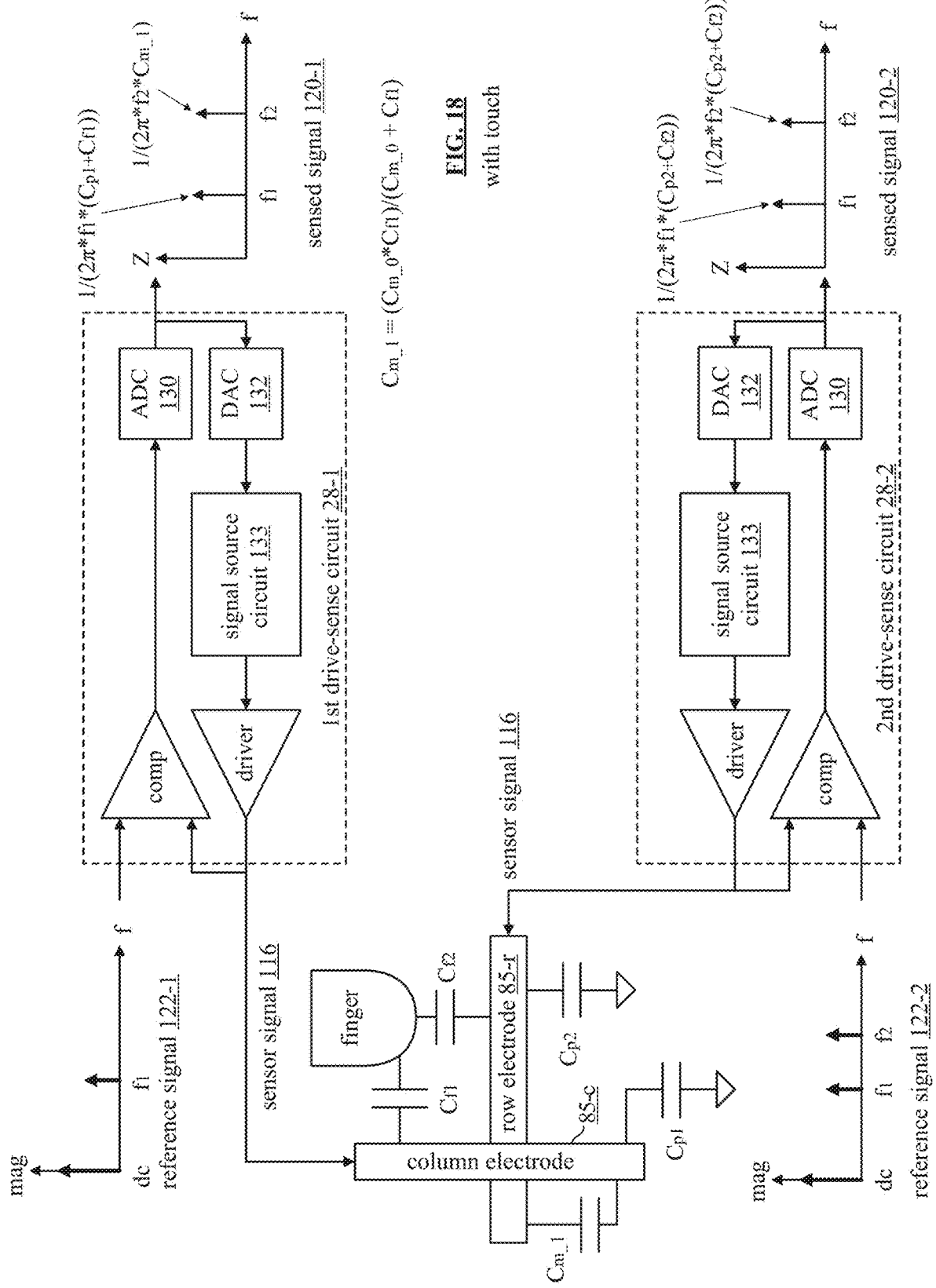

with pen with pen flexible touch screen display 80

FIG. 24 with pen and touch

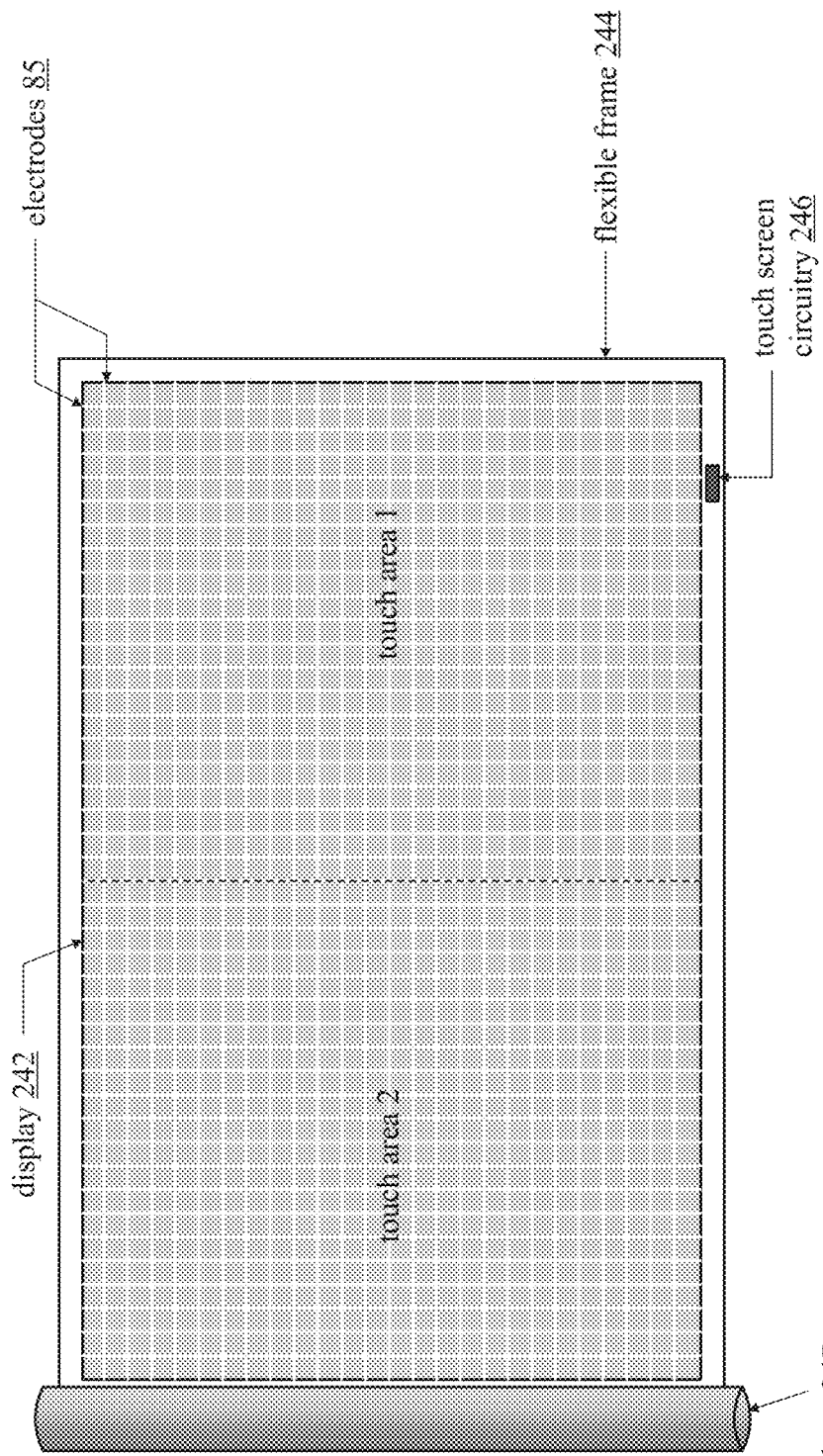

rollable touch screen display 240

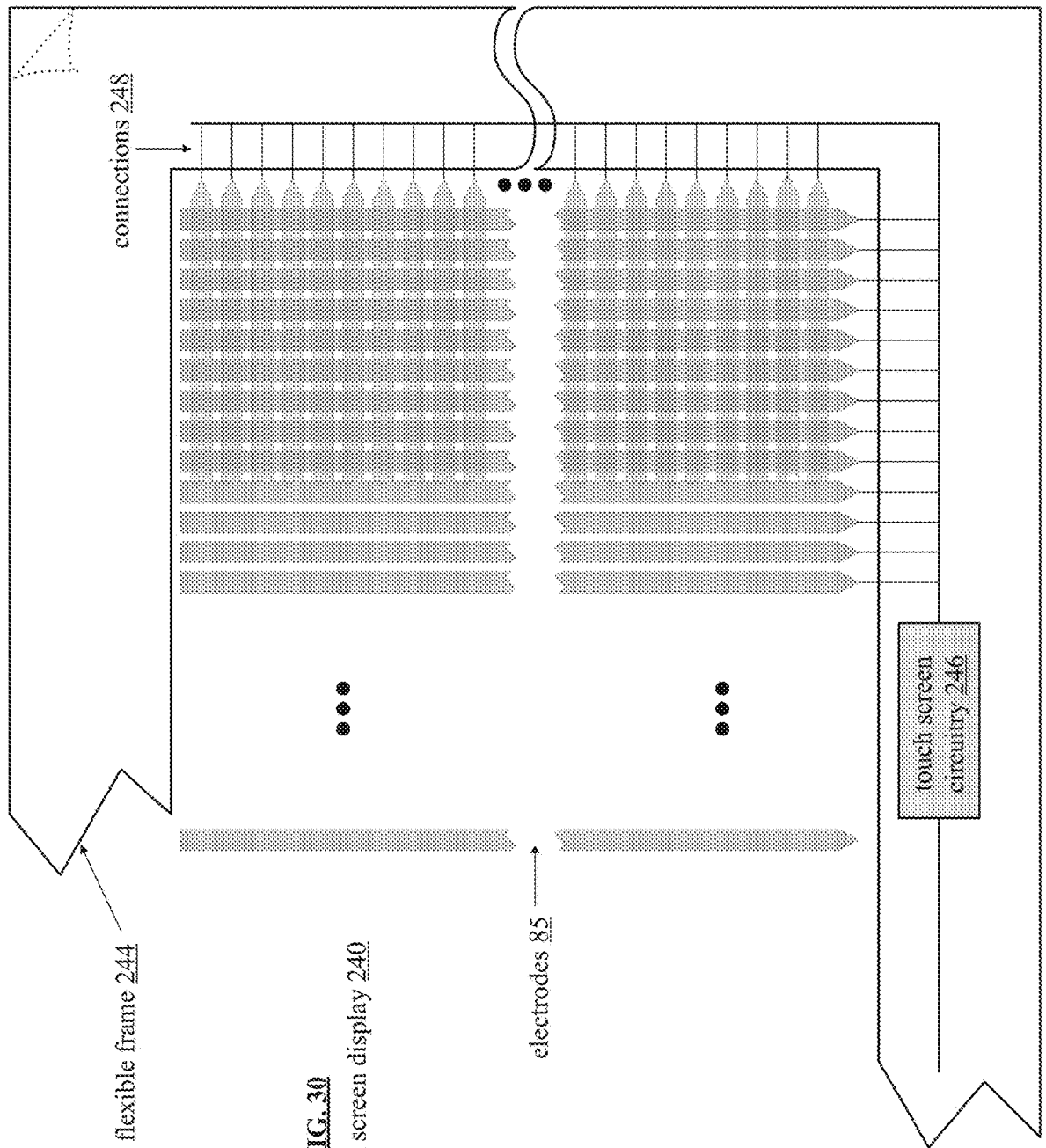

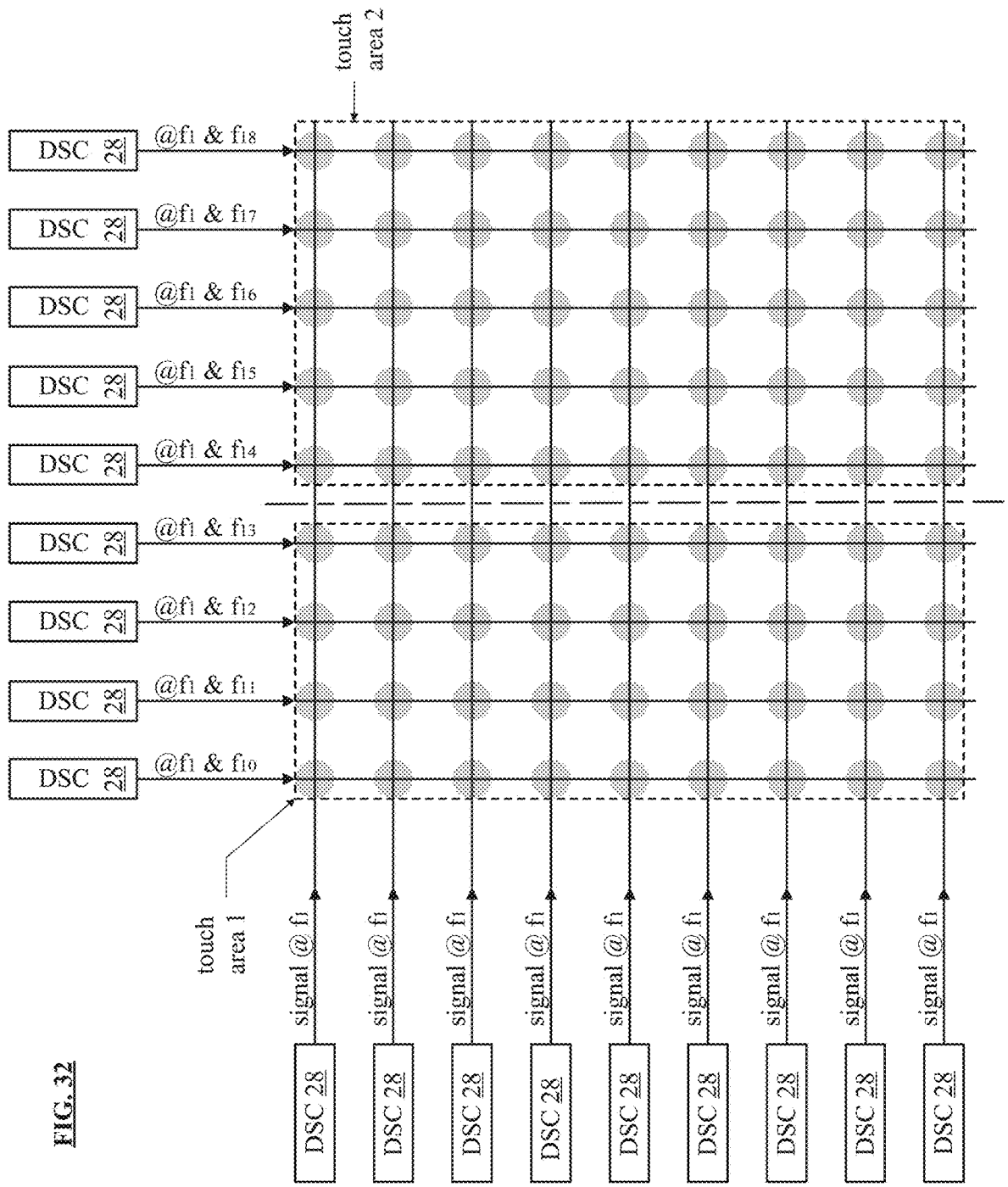

rollable/flexible touch screen display having at least a first touch area and a second touch area rollable/flexible touch screen display having a continuous touch area

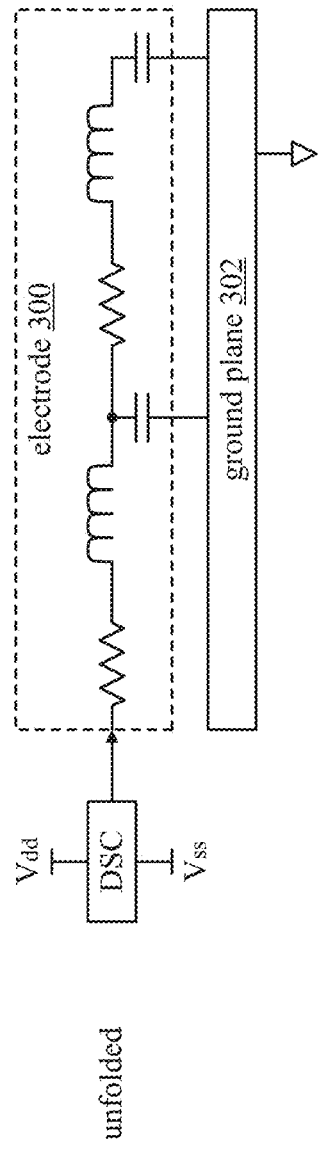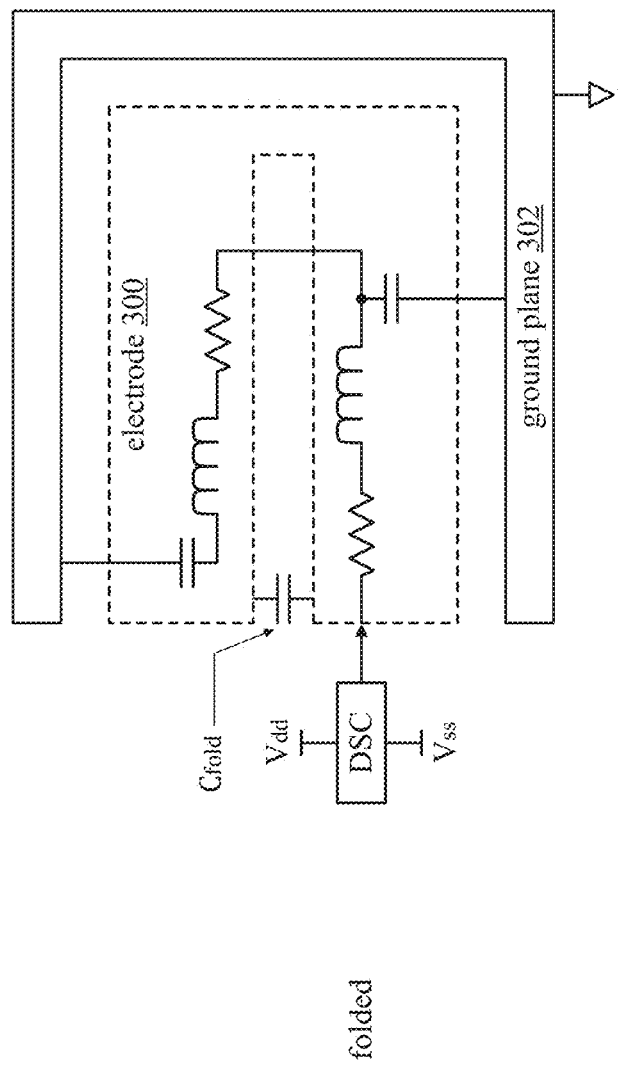
FIG. 34
FIG. 35

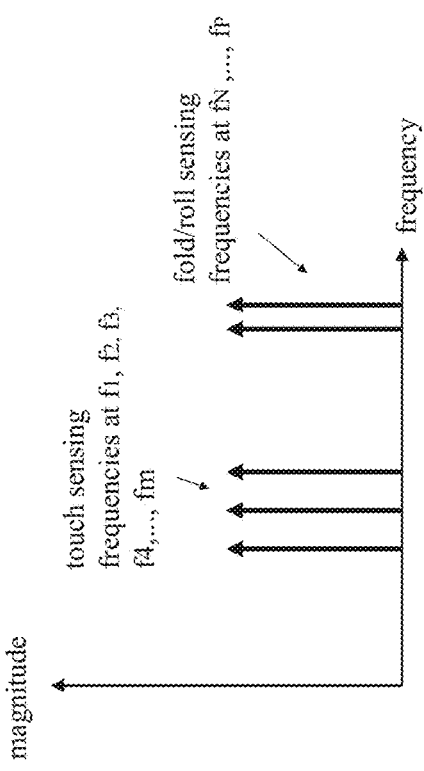
FIG. 46A
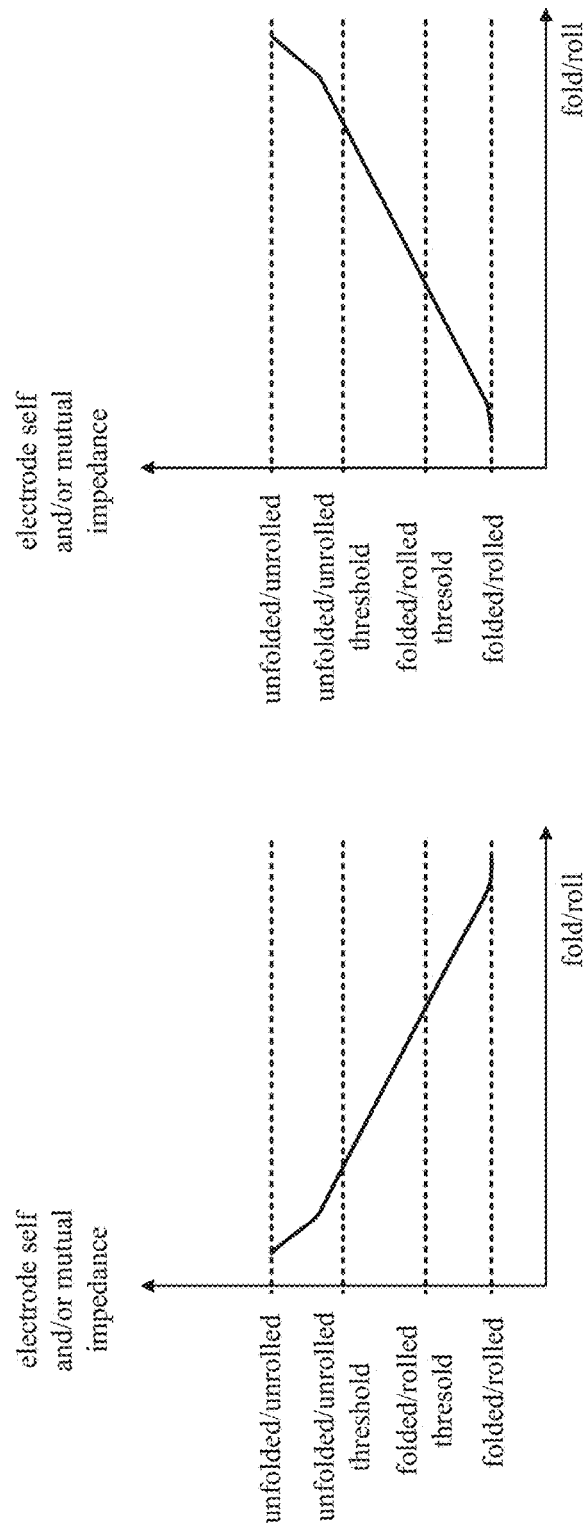
FIG. 46B
FIG. 46C folding touch screen with second (backside) display touch sensors of touch area 1 function to sense touches to second display no touch $it = cv$
$c = Q/v$ series $Ct = C1*C2/(C1+C2)$
parallel $Ct = C1 + C2$ $i2Cm\_0 > i2Cm\_1$, v is constant, t is constant, thus $Cm\_0 < Cm\_1$ touch

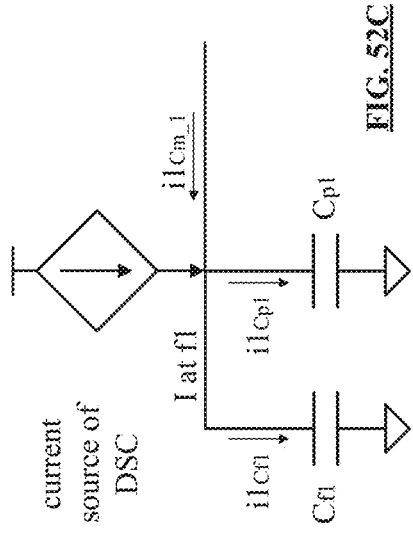
FIG. 52C
FIG. 53
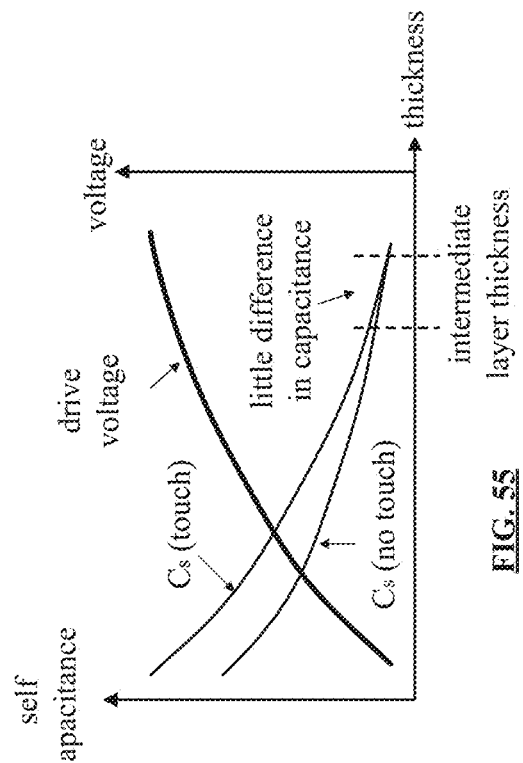
FIG. 54
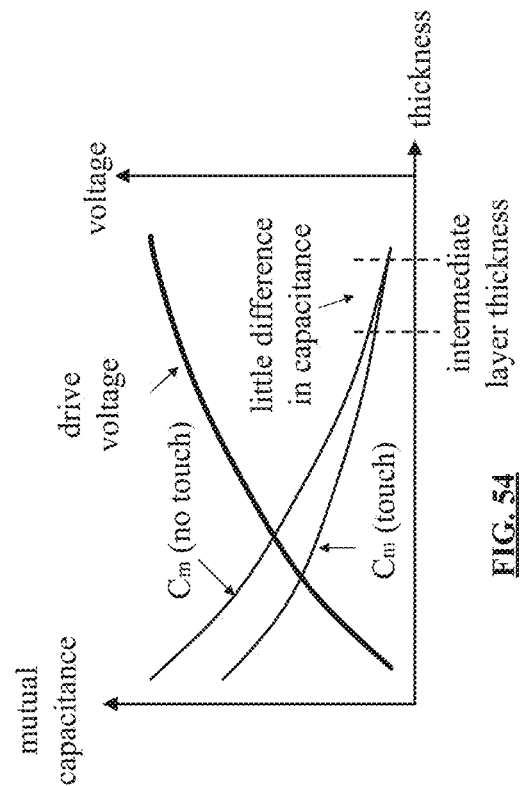
FIG. 55

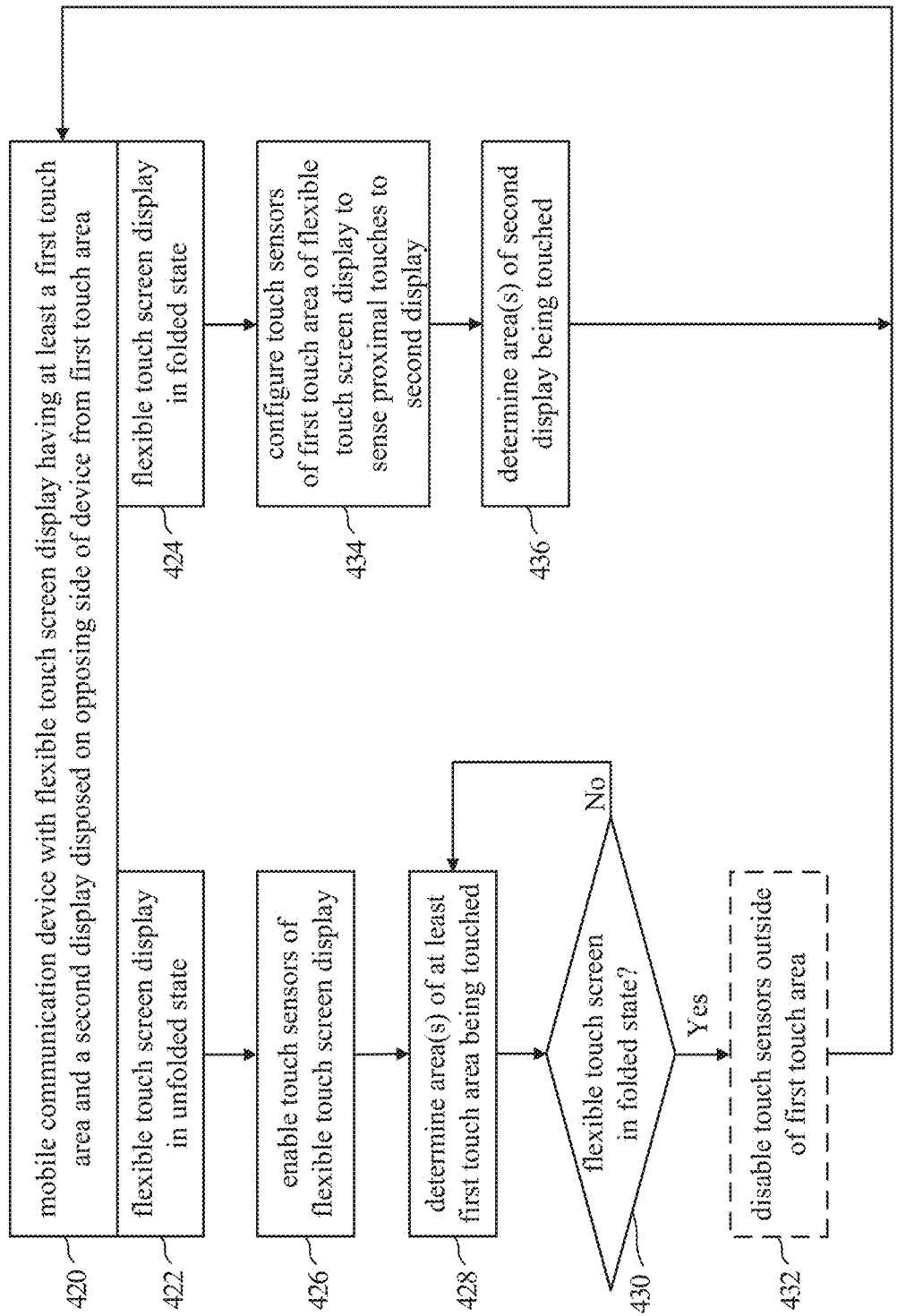

TOUCH SENSING IN A DEVICE HAVING A FLEXIBLE/FOLDABLE TOUCH SCREEN DISPLAY

CROSS-REFERENCE TO RELATED APPLICATIONS

The present U.S. Utility patent application claims priority pursuant to 35 U.S.C. § 120 as a continuation of U.S. Utility application Ser. No. 17/444,417, entitled "TOUCH SENSING IN A FLEXIBLE/FOLDABLE TOUCH SCREEN DISPLAY," filed Aug. 4, 2021, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to touch screen displays, and more particularly to flexible touch screen displays.

Description of Related Art

Sensors are used in a wide variety of applications ranging from in-home automation to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is an electrode, a capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, an e-reader, a personal computer (PC), a workstation, a video game device, a server, a television, etc. The computing device processes the sensor signals for a variety of applications. For example, the computing device processes the sensor signals to determine a touch on a touch screen.

BRIEF DESCRIPTION OF THE SEVERAL VIEWS OF THE DRAWING(S)

FIG. 1A is a diagram of an embodiment of a device having three separate touch screen displays.

FIG. 1B is a diagram of an embodiment of a device having a folding touch screen display and a separate touch screen display.

FIG. 1C is a diagram of another embodiment of a device having a folding touch screen and a separate touch screen display.

FIG. 1D is a diagram of another embodiment of a device having a folding touch screen and a separate touch screen display.

FIG. 9F is a schematic block diagram of an example of sub-pixel electrodes coupled together to form column electrodes of a touch screen sensor.

FIG. 10A is a cross section schematic block diagram of an example of self-capacitance with no-touch on a flexible touch screen display.

FIG. 10B is a cross section schematic block diagram of an example of self-capacitance with a touch on a flexible touch screen display.

FIG. 11 is a cross section schematic block diagram of an example of self-capacitance and mutual capacitance with no-touch on a flexible touch screen display.

FIG. 12 is a cross section schematic block diagram of an example of self-capacitance and mutual capacitance with a touch on a flexible touch screen display.

FIG. 13 is an example graph that plots condition verses capacitance for an electrode of a flexible touch screen display.

FIG. 14 is an example graph that plots impedance verses frequency for an electrode of a flexible touch screen display.

FIG. 15 is a time domain example graph that plots magnitude verses time for an analog reference signal.

FIG. 16 is a frequency domain example graph that plots magnitude verses frequency for an analog reference signal.

FIG. 17 is a schematic block diagram of an example of a first drive-sense circuit coupled to a first electrode and a second drive-sense circuit coupled to a second electrode without a touch proximal to the electrodes.

FIG. 18 is a schematic block diagram of an example of a first drive-sense circuit coupled to a first electrode and a second drive-sense circuit coupled to a second electrode with a finger touch proximal to the electrodes.

FIG. 29A is a schematic block diagram of an embodiment of a rollable touch screen display.

FIG. 30 is a schematic block diagram of an embodiment of touch screen circuitry of a rollable touch screen display.

FIG. 32 is a schematic block diagram of an example of frequency dividing for reference signals for drive-sense circuits of a flexible touch screen display.

FIG. 34 is a diagram illustrating an equivalent circuit of an electrode in an unfolded position in accordance with embodiments of the present disclosure.

FIG. 35 is a diagram illustrating the equivalent circuit of FIG. 34 with the electrode in a folded position in accordance with embodiments of the present disclosure.

FIG. 46A is a graph illustrating touch sensing frequencies and fold/roll sensing frequencies in accordance with embodiments of the present disclosure.

FIG. 46B is a graph illustrating an example of electrode self and/or mutual impedance versus fold/roll position in accordance with embodiments of the present disclosure.

FIG. 46C is a graph illustrating another example of electrode self and/or mutual impedance versus fold/roll position in accordance with embodiments of the present disclosure.

FIG. 52C is a schematic block diagram of an electrical equivalent circuit of a drive-sense circuit coupled to an electrode with a finger touch.

FIG. 53 is an example graph that plots finger capacitance verses device thickness for the example of FIG. 50A.

FIG. 54 is an example graph that plots mutual capacitance verses device thickness and drive voltage verses device thickness for the example of FIG. 50A.

FIG. 55 is an example graph that plots self-capacitance verses device thickness and drive voltage verses device thickness for the example of FIG. 50A.

FIG. 56 is a flow chart illustrating operation of the mobile communication device of the example of FIG. 50A.

DETAILED DESCRIPTION OF THE INVENTION

Figure 1F:
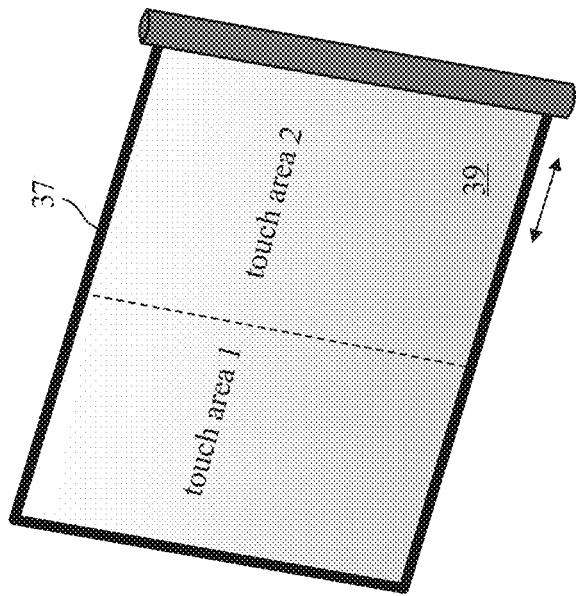
FIG. 1F is a diagram of an embodiment of a device having a rollable touch screen display.

Emerging display technologies have led to displays with improved image quality, brightness, and power efficiency. For example, Active Matrix Organic Light Emitting Diode (AMOLED) displays are quickly gaining market share due to advantages over prior technologies such as LCD and plasma displays. AMOLED displays have few size restrictions and operate on the same fundamental principles of an OLED display. As compared to Passive Matrix OLED (PMOLED) displays, AMOLED displays are presently more expensive to manufacture, but offer greater energy efficient and are amenable to larger screen sizes than PMOLED displays. As compared to typical LCD displays (which require back lighting), AMOLED displays can be thinner and more flexible, have faster response times and higher refresh rates and contrast ratios, and consume less power when darker colors are displayed.

When used in devices such as mobile communication devices and tablets, AMOLED displays offer better display quality, improved battery life, and lighter weight. Foldable or flexible AMOLED displays commonly have substrates manufactured from very flexible metallic foils or plastics and are durable. Further, their use in mobile devices can reduce breakage, which is a major cause of repair or return. In addition, reduced power consumption means that manufacturers can offer better image qualities without unduly affecting battery life. Although the examples of the present disclosure are primarily described in conjunction with an AMOLED display(s), various other display technologies may be employed such as those noted below.

As used herein, a flexible touch screen display refers to a touch screen display that can be deformed or have its shape altered by an external force applied by a user, a mechanical process, or a manufacturing process. As further used herein, the terms "folding" and "foldable" may include terms referring to deforming the shape of a flexible touch screen display, including bending or rotating the display along a folding line or folding axis. The terms "rolling" and "rollable" refer to a state in which a flexible touch screen display is rolled or capable of being rolled. Rolling can be determined, for example, by bending of a display more than a predetermined angle over a predetermined area. A degree of folding or rolling can be determined by sensing a radius of curvature (R) at a folding area or folding/rolling axis. In addition, a state in which a flexible touch screen display has a substantially circular or oval cross section may be considered as rolled or rolling regardless of a radius of curvature.

Definitions for various deformation states are provided as examples, and deformation may be defined differently according to a type, size, or other characteristic of a display. In an example, if a flexible touch screen display or displays can be bent or deformed to such an extent that different surfaces are in contact or close proximity to each other, the state in which the surfaces are in contact or close proximity through bending may be defined as folded or folding. In addition, a state in which a front surface of a flexible touch screen display is in contact or close proximity to a back surface through bending may be defined as rolled or rolling. Further, the terms "flexible touch screen display", "flexible display", "folding touch screen display" and "folding display" may be used interchangeably herein for convenience of description.

FIGS. 1A-1E are diagrams illustrating embodiments of devices having various combinations and arrangements of touch screen displays. Examples of touch screen sensing and control circuitry incorporated in the devices are described in various of the figures that follow including, for example, FIGS. 5A and 5B. The devices may include, for example, mobile communication devices such as smart phones, tablet devices, personal video devices, handheld devices such as remote controllers, gaming devices, and the like. The concepts described herein can also be applied to devices such as wearables, virtual/augmented reality headsets, electronic signs, billboards, smart cards, etc.

Referring now to FIG. 1A, a diagram of an embodiment of a device 11 having three separate touch screen displays is shown. In this example, the device 11 has a first touch screen display 17 (touch area 1), a second touch screen display (touch area 2), and an opposing or backside touch screen display (such as described with reference to FIG. 1D) providing an additional touch area 3 on a back surface of the device 11. The backside touch screen display can be activated for use when the device 11 is in a folded or substantially folded state such that touch area 1 and touch area 2 are concealed and not readily accessible to a user. Alternatively, all three touch screen displays can be enabled at the same time.

FIG. 1B is a diagram of an embodiment of a device 13 having a folding touch screen display and a separate touch screen display. In this example, the device 13 includes a flexible/folding touch screen display 21 having a touch area 1 and a touch area 2 that are delineated by a folding axis 23. The device 13 further includes a backside touch screen display (such as described with reference to FIG. 1D) providing an additional touch area 3 on a back surface of the device 13. The backside touch screen display can be activated for use, for example, when the device 13 is in a folded or substantially folded state such that touch area 1 and touch area 2 are not readily accessible to a user. Alternatively, both touch screen displays can be enabled at the same time.

FIG. 1C is a diagram of another embodiment of a device 15 having a folding touch screen display and a separate touch screen display. In this example, which is similar to the embodiment of FIG. 1B with the displays arranged in a differing orientation, the device 15 includes a flexible/folding touch screen display 25 having a touch area 1 and a touch area 2 that are delineated by a folding axis 27. The device 15 further includes a backside touch screen display (such as described with reference to FIG. 1D) providing an additional touch area 3 on a back surface of the device 15. The backside touch screen display can be activated for use, for example, when the device 15 is in a folded or substantially folded state such that touch area 1 and touch area 2 are not readily accessible to a user.

FIG. 1D is a diagram of another embodiment of a device 11, 13 or 15 having a folding touch screen display (not shown) and a separate touch screen display 29. In this example, the touch screen display 29 is disposed on a back surface of the device 11, 13 or 15 and provides an additional touch area 3. The touch screen display 29 can be either a flexible display or a non-flexible display and may be of the same or similar construction to a front side flexible display of the device or manufactured using a different type of display technology. With reference to device 13 of FIG. 1B for example, the touch screen display 21 can be an AMOLED display and the backside touch screen display 29 can be a touch-enabled PMOLED or LCD display. In another example, both of the touch screen display 21 and backside touch screen display 29 are AMOLED displays. The backside touch screen display can be a full display that covers most or all of the backside of a device, or a partial display that covers only a portion (e.g., half, or less) of the backside of the device.

Figure 1E:
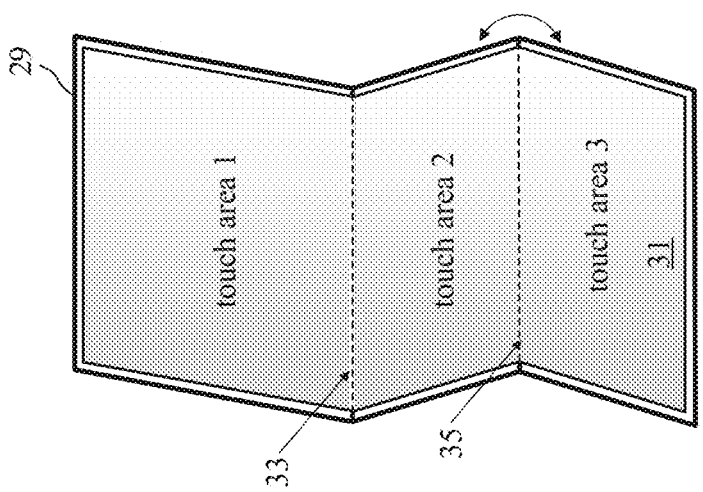
FIG. 1E is a diagram of an embodiment of a device having a folding touch screen display with three touch areas.

FIG. 1E is a diagram of an embodiment of a device 29 having a folding touch screen display 31 with three touch areas: touch area 1, touch area 2 and touch area 3. In this example, touch area 1 and touch area 2 are delineated by a first folding axis 33 and touch area 2 and touch area 3 are delineated by a second folding axis 35. In operation, the folding touch screen display 31 can be folded along the first folding axis 33 such that only touch area 3 is visible to a user. In this example, the device 29 can be configured to sense the folding and, in response, disable touch sense functionality in touch areas 1 and 2.

In another example, the folding touch screen display 31 can be folded along folding axis 35 such that only touch area 1 is viewable. In yet another example, the folding touch screen display 31 can be folded along the first folding axis 33 such that touch area 1 is visible on one side of the folded device and touch areas 2 and 3 are visible on the opposing side of the device. In accordance with the disclosure, determining whether a device/folding touch screen display is in a folded or unfolded state can be achieved in variety of ways, examples of which are described below.

FIG. 1F is a diagram of an embodiment of a device 37 having a rollable touch screen display 39. The rollable touch screen display 39 of this example is rollable between a fully extended position (as shown), a partially rolled position (i.e., only a portion of touch area 2 or touch area 1 is viewable), or a fully rolled position. Further examples and operation of a rollable touch screen display are described in greater detail with reference to FIGS. 29A-33B. In the foregoing examples, any of the touch areas shown in FIGS. 1A-1E are configurable to display images while simultaneously sensing a touch(es).

Figure 2:
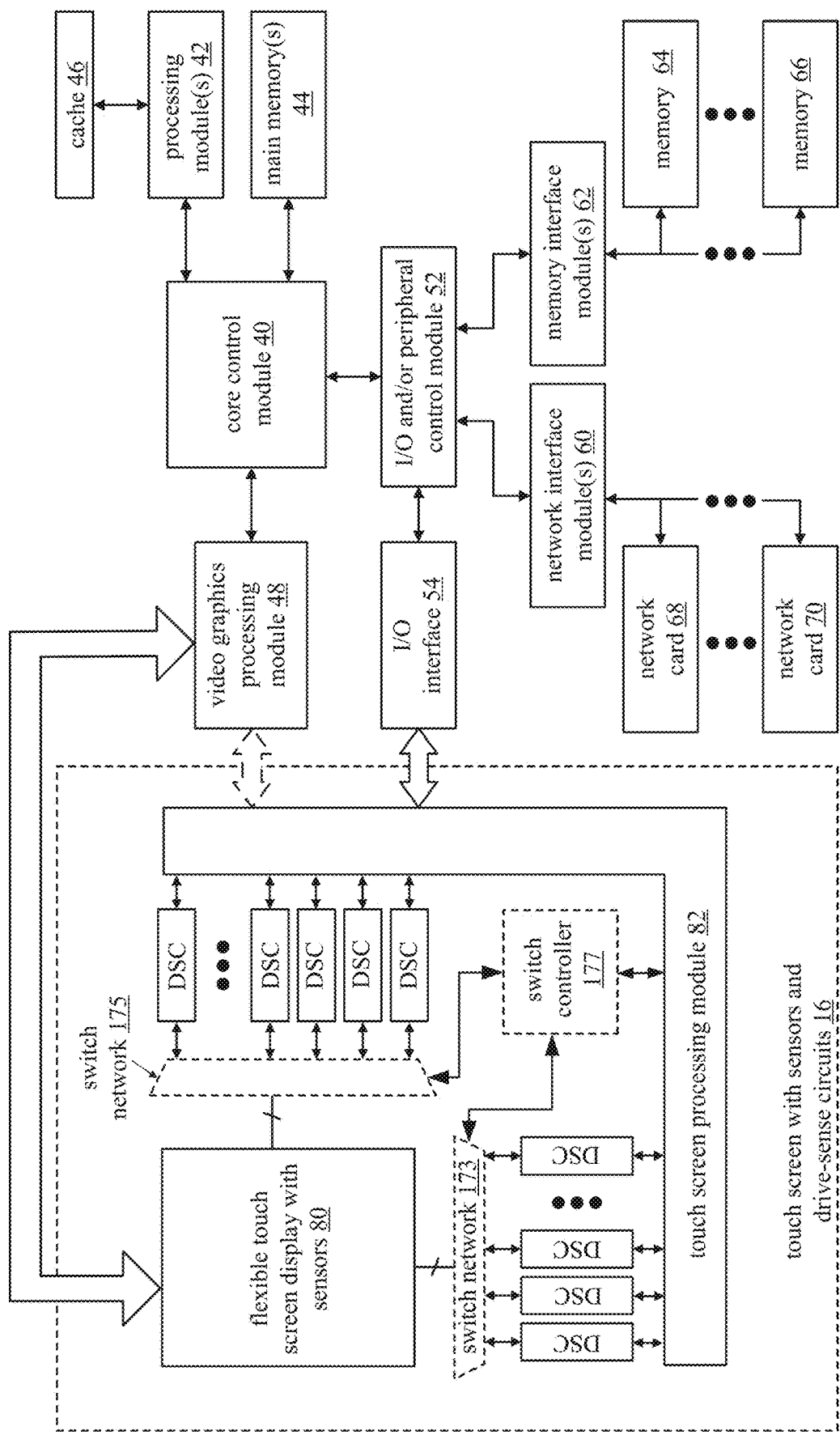
FIG. 2 is a schematic block diagram of an embodiment of a computing device including a flexible touch screen display.

FIG. 2 is a schematic block diagram of an embodiment of a computing device 14 including a flexible touch screen display. The computing device 14 includes a touch screen 16, a core control module 40, one or more processing modules 42, one or more main memories 44, cache memory 46, a video graphics processing module 48, an Input-Output (I/O) peripheral control module 52, one or more network interface modules 60, one or more memory interface modules 62, and one or more input/output interface modules (not separately illustrated). A processing module 42 is described in greater detail below and, in an alternative embodiment, has a direct connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch screen 16 includes a flexible touch screen display with sensors 80, a plurality of drive-sense circuits (DSCs), one or more switch networks 173 and 175, a switch controller 177, and a touch screen processing module 82. In general, the sensors (e.g., electrodes, capacitor sensing cells, capacitor sensors, inductive sensors, etc.) detect a proximal touch of the screen. In the illustrated embodiment, switch controller 177 selects particular sensors to be coupled to particular drive-sense circuits (DSCs) to adjust a touch resolution, sometimes referred to herein as "touch granularity" or simply "granularity," of all or part of the flexible touch screen display 80. Switch controller 177 can receive information from any or all of the processing modules and use that information as a basis for selecting sensors/DSC coupling arrangements. Switch controller 177 then transmits control signals to the switch network(s) causing the switch networks to selectively couple the selected sensors to the selected drive-sense circuits. For example, when one or more fingers touches the screen, capacitance of sensors proximal to the touch(es) are affected (e.g., impedance changes). The drive-sense circuits (DSCs) coupled to the affected sensors detect the change and provide a representation of the change to the touch screen processing module 82, which may be a separate processing module or integrated into the processing module 42. By changing the coupling of sensors to DSCs, a touch resolution of the touch screen display can be changed. By using different coupling arrangements in different areas of the touch screen display, multiple different touch screen resolutions can be realized concurrently in those different areas.

The touch screen processing module 82 processes the representative signals from the drive-sense circuits (DSCs) to determine the location of the touch(es). This information is inputted to the processing module 42 for processing as an input. For example, a touch represents a selection of a button on screen, a scroll function, a zoom in-out function, etc.

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieved from memory 64-66 are the data and/or operational instructions requested by the processing module or will the instructions most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and one or more external networks via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) via an input interface module(s) (not separately illustrated) and the I/O and/or peripheral control module 52. An input device includes a keypad, a keyboard, control switches, a touchpad, a microphone, a camera, etc. An input interface module can include a software driver and a hardware connector for coupling an input device to the I/O and/or peripheral control module 52. In an embodiment, an input interface module is in accordance with one or more Universal Serial Bus (USB) protocols.

The core control module 40 coordinates data communications between the processing module(s) 42 and output device(s) via an output interface module(s) (not separately illustrated) and the I/O and/or peripheral control module 52. An output device can include a speaker, etc. An output interface module includes a software driver and a hardware connector for coupling an output device to the I/O and/or peripheral control module 52. In an embodiment, an output interface module is in accordance with one or more audio codec protocols.

The processing module 42 communicates directly with a video graphics processing module 48 to display data on the flexible touch screen display with sensors 80 (alternatively referred to herein as "flexible touch screen display 80" or "display 80"). In an example, the flexible touch screen display 80 includes an organic light emitting diode (OLED) display, such as an active-matrix OLED (AMOLED) or passive-matrix OLED (PMOLED) display, having a flexible substrate. Other types of displays that can be constructed in a flexible manner may be utilized in other embodiments. The display has a resolution, an aspect ratio, and other features that affect the quality of the display. The video graphics processing module 48 receives data from the processing module 42, processes the data to produce rendered data in accordance with the characteristics of the display, and provides the rendered data to the flexible touch screen display 80. In various embodiments, touch screen processing module 82 can receive touch-related image information, rate of motion information, content meta-data and/or other video content-related information from the video graphics processing module 48.

Figure 3:
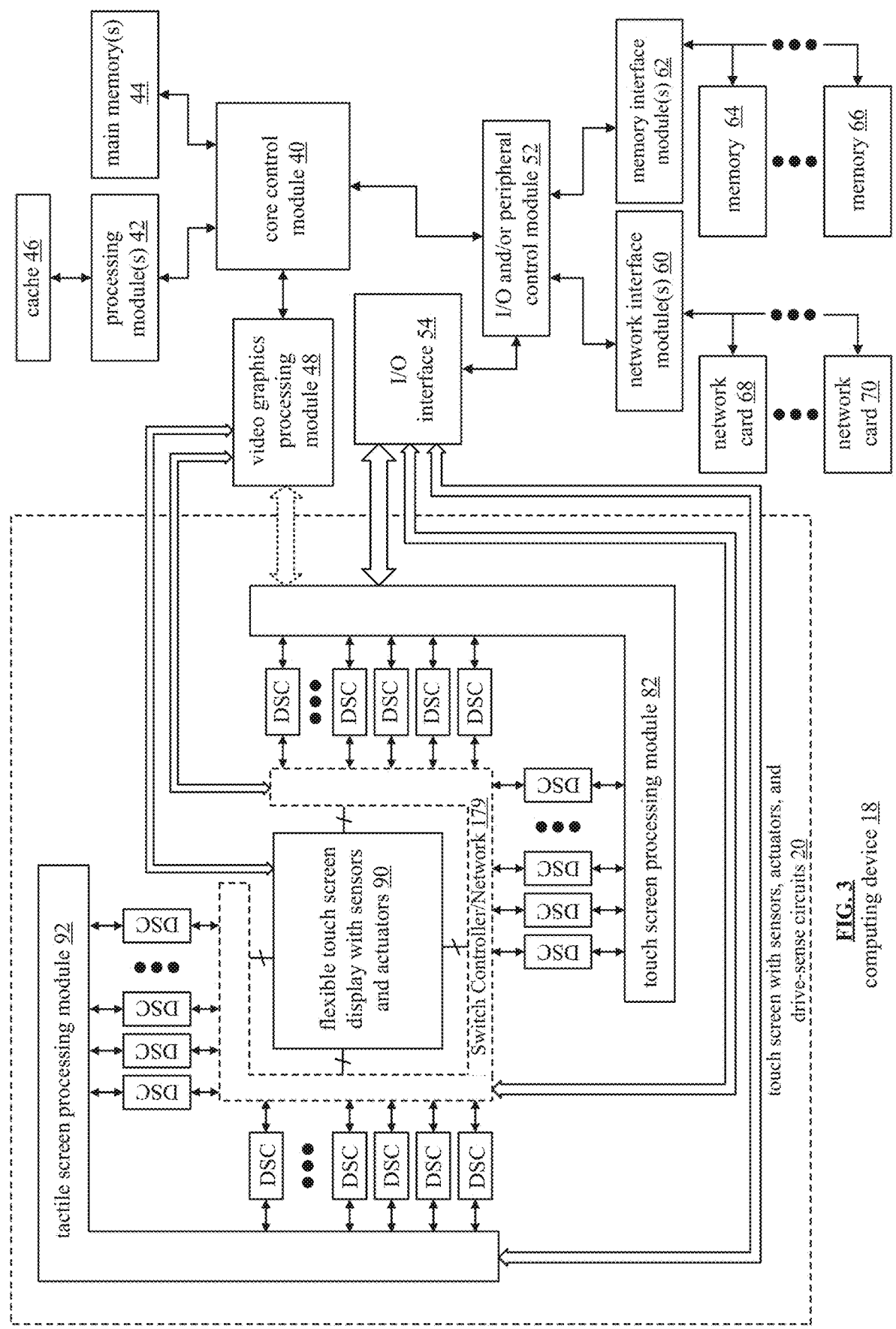
FIG. 3 is a schematic block diagram of another embodiment of a computing device including a flexible touch screen display.

FIG. 3 is a schematic block diagram of another embodiment of a computing device 18 including a flexible touch screen display. The computing 18 includes a core control module 40, one or more processing modules 42, one or more main memories 44, cache memory 46, a video graphics processing module 48, a touch screen 20 (with sensors, actuators, and drive-sense circuits), an Input-Output (I/O) peripheral control module 52, an I/O Interface 54, one or more network interface modules 60, and one or more memory interface modules 62. The touch screen 20 includes a flexible touch screen display with a plurality of sensors and actuators (alternatively referred to herein "flexible touch screen display 90" or "display 90"), a plurality of drive-sense circuits (DSC), a touch screen processing module 82, a switch controller/network 179, and a tactile screen processing module 92.

Computing device 18 operates similarly to computing device 14 of FIG. 2 with the addition of a tactile aspect to the screen 20 as an output device. The tactile portion of the touch screen 20 includes the plurality of actuators (e.g., piezoelectric transducers to create vibrations, solenoids to create movement, etc.) to provide a tactile feel to the touch screen 20. To do so, the processing module creates tactile data, which is provided to the appropriate drive-sense circuits via the tactile screen processing module 92, which may be a stand-alone processing module or integrated into processing module 42. The drive-sense circuits convert the tactile data into drive-actuate signals and provides them to the appropriate actuators to create the desired tactile feel on the touch screen 20.

Similar to the combination of switch network 173, switch network 175, and switch controller 177 illustrated as separate devices in FIG. 2, the switch controller/network 179 controls the coupling of sensors to drive-sense circuits (DSCs) to adjust the touch resolution of flexible touch screen display 90. FIG. 3 also illustrates data connections via I/O interface 54 and video graphics processing module 48 through which switch controller/network 179 can receive experience (e.g., touch the screen to obtain information, command actions to be initiated remotely, provide process initiation, termination, and control, be entertained, etc.). For example, the display 80 is incorporated in a device such as described with reference to FIGS. 1A-1E and is foldable along one or more folding axis 23.

There are a variety of other devices that can include a flexible touch screen display, including those mentioned above. In another example, a store provides interactive displays for customers to find certain products, to obtain coupons, to enter contests, etc. In a further example, a vending machine includes a flexible touch screen display used to select and/or pay for an item. Another example of a device having a flexible touch screen display is an Automated Teller Machine (ATM). As yet another example, an automobile includes a flexible touch screen display for entertainment media control, navigation, climate control, etc.

In various implementations, the flexible touch screen display 80 can include a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but the table is not an exhaustive list.

| Resolution | Width (lines) | Height (lines) | pixel aspect ratio | screen aspect ratio | screen size (inches) |
| --- | --- | --- | --- | --- | --- |
| HD (high definition) | 1280 | 720 | 1:1 | 16:9 | 32, 40, 43, 50, 55, 60, 65, 70, 75, and/or >80 |
| Full HD | 1920 | 1080 | 1:1 | 16:9 | 32, 40, 43, 50, 55, 60, 65, 70, 75, and/or >80 |
| HD | 960 | 720 | 4:3 | 16:9 | 32, 40, 43, 50, 55, 60, 65, 70, 75, and/or >80 |
| HD | 1440 | 1080 | 4:3 | 16:9 | 32, 40, 43, 50, 55, 60, 65, 70, 75, and/or >80 |
| HD | 1280 | 1080 | 3:2 | 16:9 | 32, 40, 43, 50, 55, 60, 65, 70, 75, and/or >80 |
| QHD (quad HD) | 2560 | 1440 | 1:1 | 16:9 | 32, 40, 43, 50, 55, 60, 65, 70, 75, and/or >80 |
| UHD (Ultra HD) or 4K | 3840 | 2160 | 1:1 | 16:9 | 32, 40, 43, 50, 55, 60, 65, 70, 75, and/or >80 |
| 8K | 7680 | 4320 | 1:1 | 16:9 | 32, 40, 43, 50, 55, 60, 65, 70, 75, and/or >80 |
| HD and above | 1280->=7680 | 720->=4320 | 1:1, 2:3, etc. | 2:3 | 50, 55, 60, 65, 70, 75, and/or >80 | information used to determine an arrangement of sensors and DSCs to use for realizing a target resolution of all, or part, of the flexible touch screen display 90. The information provided to switch controller/network 179 can include, but is not limited to, information identifying a characteristics of a program interacting with flexible touch screen display 90, a display location of particular objects, characteristics of a data frame being rendered on flexible touch screen display 90, and the like. Although not specifically illustrated, any illustrated processing module can provide data to switch controller/network 179, either directly or indirectly.

Figure 4A:
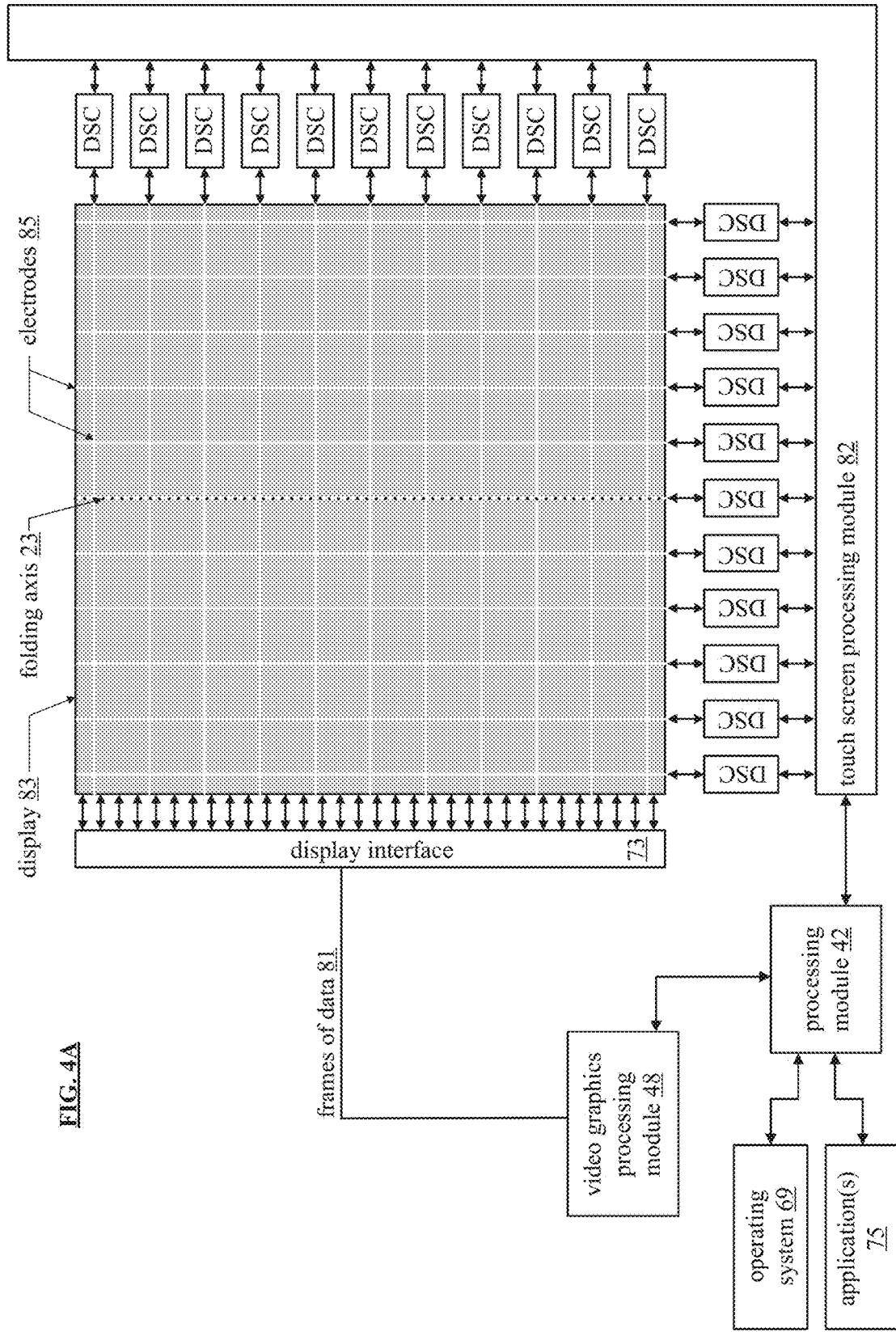
FIG. 4A is a schematic block diagram of an embodiment of a flexible touch screen display with sensors.

FIG. 4A is a schematic block diagram of an embodiment of a flexible touch screen display 80 that includes a plurality of drive-sense circuits (DSCs), a touch screen processing module 82, a display 83, and a plurality of electrodes 85. The flexible touch screen display 80 is coupled to a processing module 42, a video graphics processing module 48, and a display interface 73, which are components of a computing device (e.g., 14-18), an interactive display, a communication device, or other device that includes a touch screen display. The display 80 functions to provide users with an interactive In other implementations, display 83 can be a smaller display, such as those included in handheld devices such as remote controls, smart phones, foldable tablets, rollable screens, wearable devices, such as those intended to be worn on a user's wrist or other appendage, and the like.

The display 83 is one of a variety of types of displays that is operable to render frames of data into visible images. For example, the display is one or more of: an active matrix organic light emitting diode (AMOLED) display, a passive matrix organic light emitting diode (PMOLED) display, a quantum dot (QLED) display, a light emitting diode (LED) display, a microLED display, a phosphorescent OLED (PHOLED) display, a top-emitting OLED display (having a substrate that is either opaque or reflective), an electroluminescent conductive polymer OLED display, an electroluminescent display (ELD), a plasma display panel (PDP), a liquid crystal display (LCD), an LCD high performance addressing (HPA) display, an LCD thin film transistor (TFT) display, a surface conductive electron emitter (SED) display, a field emission display (FED), a laser TV display, a carbon nanotubes display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns. As will be discussed in greater detail with reference to one or more of FIGS. 9A-12, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide (ITO), Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system 69 and one or more user applications 75. The user application 75 includes, but is not limited to, a video playback application, a spreadsheet application, a word processing application, a computer aided drawing application, a photo display application, an image processing application, a database application, etc. While executing an application 75, the processing module generates data for display (e.g., video data, image data, text data, etc.). The processing module 42 sends the data to the video graphics processing module 48, which converts the data into frames of video 81.

The video graphics processing module 48 sends the frames of video 81 (e.g., frames of a video file, refresh rate for a word processing document, a series of images, etc.) to the display interface 73. The display interface 73 provides the frames of video to the display 83, which renders the frames of video into visible images.

While the display 83 is rendering the frames of video into visible images, the drive-sense circuits (DSC) provide sensor signals to the electrodes 85. When the screen is touched, capacitance of the electrodes 85 proximal to the touch (i.e., directly, or close by) is changed. The DSCs detect the capacitance change for effected electrodes and provide the detected change to the touch screen processing module 82.

The touch screen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 4B:
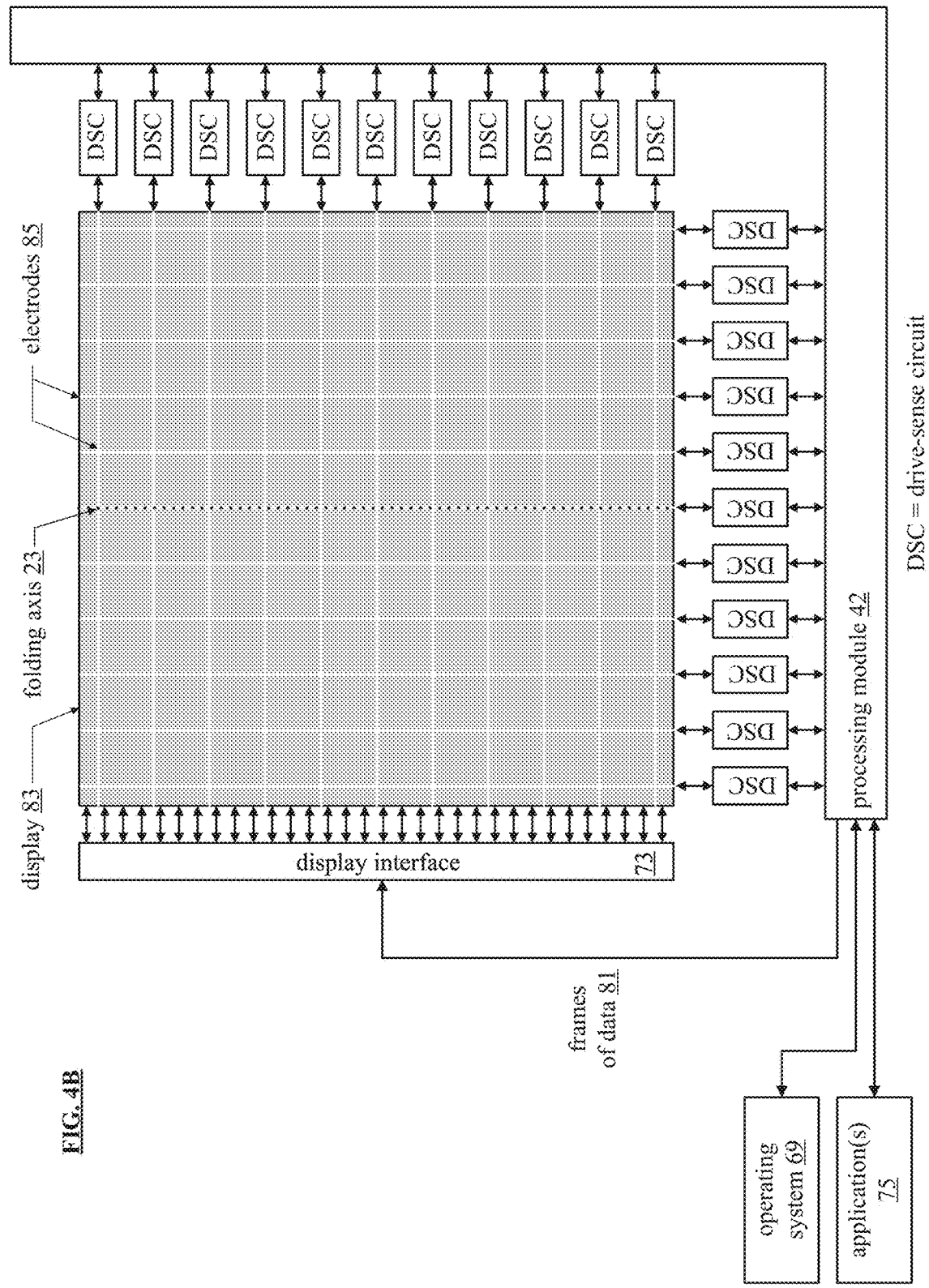
FIG. 4B is a schematic block diagram of another embodiment of a flexible touch screen display with sensors.

FIG. 4B is a schematic block diagram of another embodiment of a flexible touch screen display 80 that includes a plurality of drive-sense circuits (DSCs), the processing module 42, a display 83, and a plurality of electrodes 85. The processing module 42 of this embodiment is executing an operating system 69 and one or more user applications 75 to produce frames of data 81. The processing module 42 provides the frames of data 81 to the display interface 73. The flexible touch screen display 80 operates similarly to the flexible touch screen display 80 of FIG. 4 with the above noted differences.

Figure 5A:
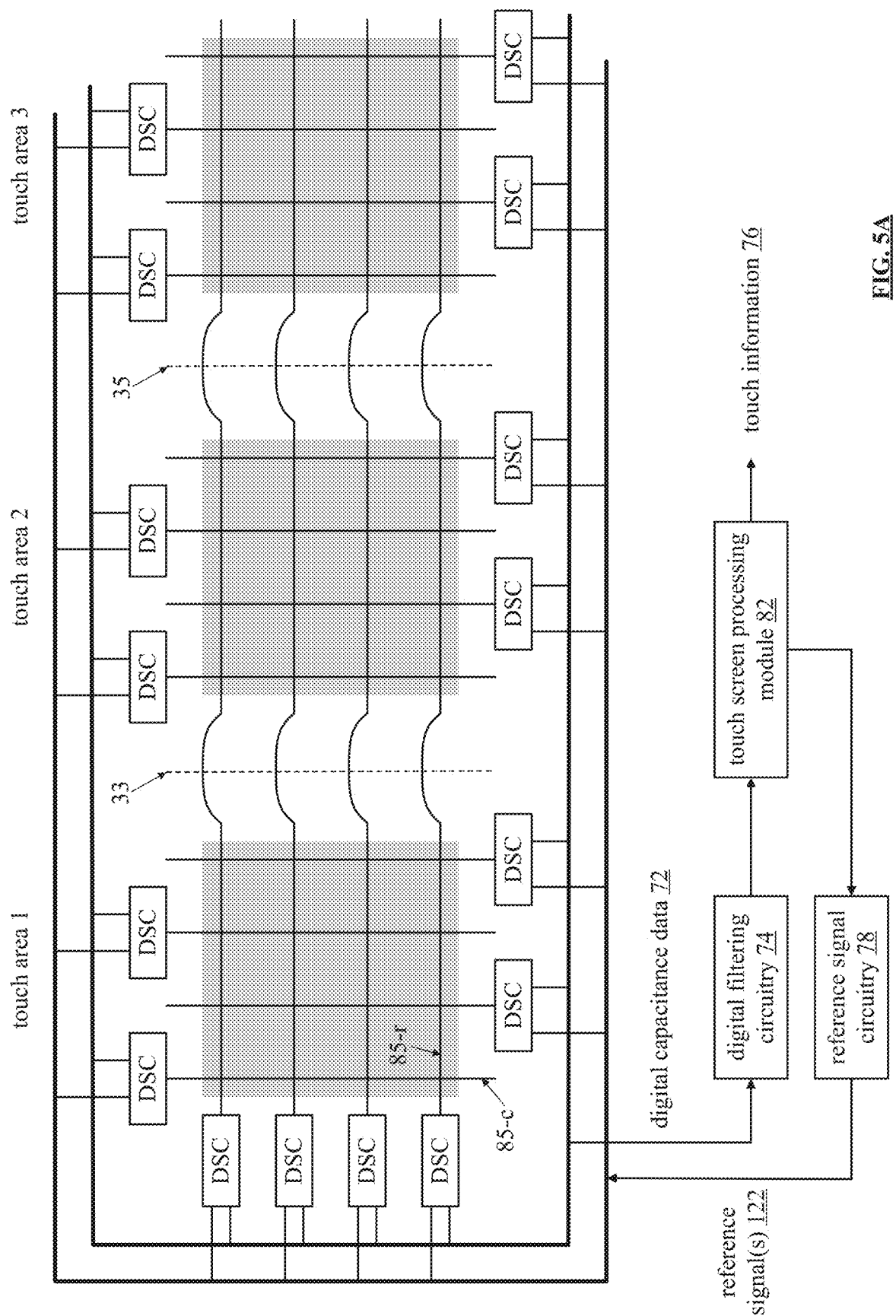
FIG. 5A is a schematic block diagram of an embodiment of touch screen circuitry in a flexible/foldable touch screen display.

FIG. 5A is a schematic block diagram of an embodiment of touch screen circuitry in a flexible/foldable touch screen display 80 or 90. The touch screen circuitry includes a plurality of drive-sense circuits (DSCs) coupled to a plurality of row electrodes 85-r and a plurality of column electrodes 85-c, digital filtering circuitry 74, reference signal circuitry 78, and touch screen processing module 82. The touch screen circuitry of this example can be incorporated, for example, in any of the devices of FIGS. 1A-3.

In the illustrated embodiment, a flexible touch screen display 80 or 90 is configurable to display images in a first touch area 1, a second touch area 2, and a third touch area 3. The first touch area 1 is configured to rotate with respect to the second touch area 2 along a folding axis 33. The second touch area 2 is configured to rotate with respect to the third touch area 3 along a folding axis 35.

A first plurality of touch sensitive column electrodes 85-c are integrated into the first touch area 1 of the flexible display, a second plurality of column electrodes 85-c are integrated into the second touch area 2 of the flexible display, a third plurality of column electrodes 85-c are integrated into the third touch area 3 of the flexible display, and a plurality of row electrodes 85-r are integrated into and extend across the first touch area 1, the second touch area 2, and the third touch area 3. The plurality of DSCs are operable, when enabled, to drive sensor signals on the plurality of row electrodes 85-r and the first, second and third pluralities of column electrodes 85-c. To generate the sensor signals, the DSCs utilize reference signal(s) 122 produced by the reference signal circuitry 78, an example of which is described in greater detail with reference to FIG. 15. In this example, the plurality of DSCs and the reference signal circuitry 78 may be selectively enabled/disabled by control signals generated by the touch screen processing module 82.

As detailed elsewhere herein, each of the sensor signals generated by the DSCs includes a drive signal component and a receive signal component, wherein a DSC of the plurality of DSCs generates the drive signal component and interprets the receive signal component to produce a representation of an impedance on an electrode coupled to the DSC. For example, the plurality of DSCs generate digital capacitance data 72 based on the sensor signals. The digital capacitance data 72 generally includes self-capacitance information, mutual capacitance information, and/or change in capacitance information indicative of the location of touches/proximal touches on the flexible display. In addition to indicating touches, the digital capacitance data 72 can be utilized to detect a folding and/or rolling state of the flexible display as described more fully below.

The digital filtering circuitry 74 operates to filter the digital capacitance data 72 and provide the filtered data to the touch screen processing module 82. The touch screen processing module 82 senses, based on the sensor signals (i.e., based on the filtered digital capacitance 72 in this example), an electrical characteristic of at least one row electrode 85-r and at least one column electrode 85-c of the first plurality of column electrodes, the second plurality of column electrodes, or the third plurality of column electrodes and determines, based on the electrical characteristic, a proximal touch to at least one of the first touch area 1, the second touch area 2, or the third touch area 3. The touch screen processing module 82 further generates corresponding touch information 76 for use by other processing circuitry of the flexible display/device. In various examples described herein, the touch screen processing module 82 can be further configured to utilize information derived from the sensor signals (e.g., changes to the impedance of one or more electrodes) to sense one or more of a folding or rolling state of the flexible display, a change in a folding/rolling location, a rate of change in folding/rolling, a change in a degree of folding/rolling, a change in a folding/rolling direction, a duration of folding/rolling, and a change in a folding angle or rolling radius.

Figure 5B:
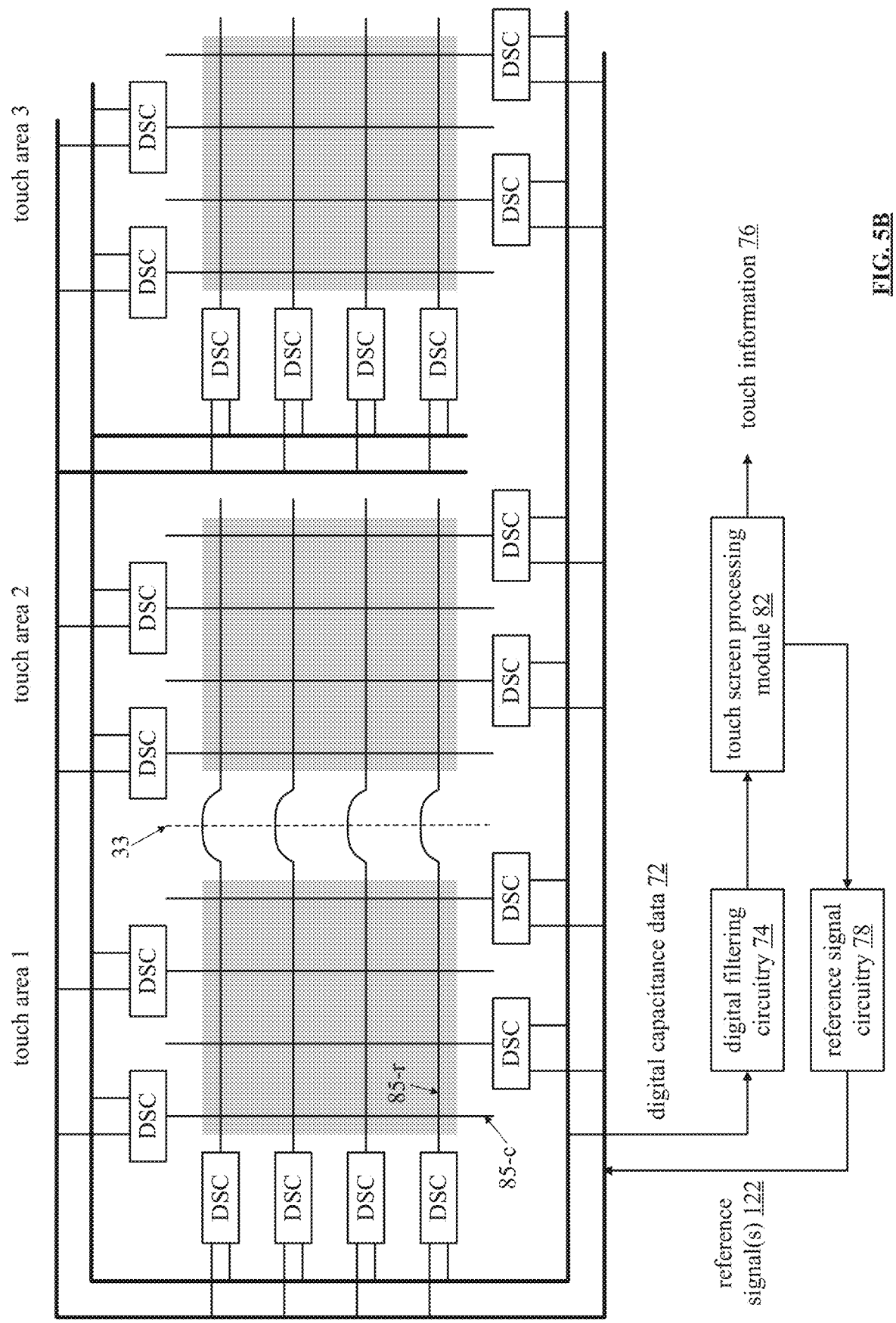
FIG. 5B is a schematic block diagram of another embodiment of touch screen circuitry in a flexible/foldable touch screen display.

The touch areas 1-3 of the embodiments of FIGS. 5A and 5B are not necessarily located on the same surface of a device or in a single flexible display. In an example, the third touch area 3 corresponds to touch area 3 of the backside display of FIG. 1D (which may also be a flexible display). In another example, a flexible display provides touch area 1 and touch area 2 on a front/foldable surface of a device and is bent around an edge of the device such that touch area 3 is on a backside surface. In yet another example, one or more of the touch areas is located on an edge or side surface of a device.

Referring now to FIG. 5B, a schematic block diagram of another embodiment of touch screen circuitry in a flexible/foldable touch screen display 80 or 90 is illustrated. The touch screen circuitry operates in a similar manner to that of FIG. 5A and includes a plurality of drive-sense circuits (DSCs) coupled to a plurality of row electrodes 85-r and a plurality of column electrodes 85-c, digital filtering circuitry 74, reference signal circuitry 78, and touch screen processing module 82. The touch screen circuitry of this example can be incorporated, for example, in any of the devices of FIGS. 1A-3.

In the illustrated embodiment, one or more touch screen displays (e.g., flexible touch screen displays 80 or 90) are configurable to display images in a first touch area 1, a second touch area 2, and a third touch area 3. The first touch area 1 is configured to rotate with respect to the second touch area 2 along a folding axis 33.

A first plurality of touch sensitive column electrodes 85-c are integrated into the first touch area 1 of the flexible display, a second plurality of column electrodes 85-c are integrated into the second touch area 2 of the flexible display, a third plurality of column electrodes 85-c are integrated into the third touch area 3 of the flexible display, and a first plurality of row electrodes 85-r are integrated into and extend across the first touch area 1 and the second touch area 2. In contrast to the embodiment of FIG. 5A, a second plurality of row electrodes 85-r are integrated into the third touch area 3 and are coupled to a different plurality of DSCs than the first plurality of row electrodes 85-r. In a further example (not separately illustrated), each of the touch areas 1-3 is configured to utilize a separate plurality of column electrodes, a separate plurality of row electrodes, and a separate plurality of DSCs. In still further examples, the touch screen processing circuitry may service a greater or lesser number of touch areas. The DSCs of these examples operate as described above with reference to FIG. 5A.

As described more fully below (e.g., with reference to FIGS. 9A-9J), the row electrodes and column electrodes of the embodiments of FIGS. 5A and 5B may be constructed in various manners. In an example, the electrodes can be "in-cell" touch sensors formed of conductive pads of a flexible display(s). In another example, the electrodes can be "on-cell" touch sensors or line electrodes. In general, the row electrodes and the line electrodes are separated by a dielectric layer and arranged in a crossing pattern.

Figure 6:
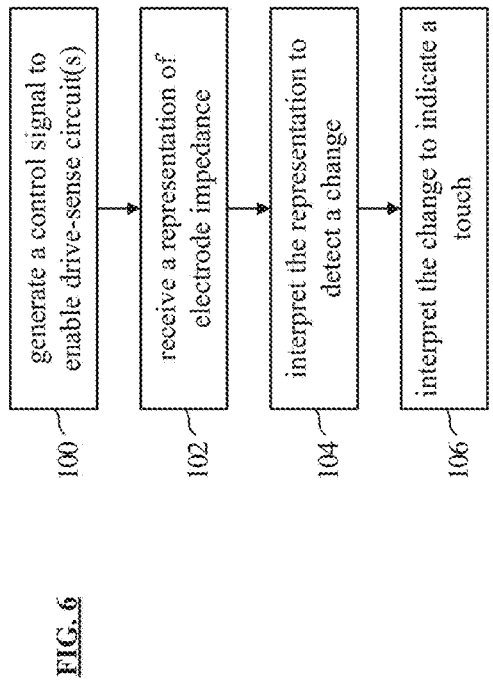
FIG. 6 is a logic diagram of an embodiment of a method for sensing a touch on a flexible touch screen display.

FIG. 6 is a logic diagram of an embodiment of a method for sensing a touch on a flexible touch screen display that is executed by one or more processing modules (e.g., 42, 82, and/or 48 of the previous figures). The method begins at step 100 where the processing module generates a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method continues at step 102 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method continues at step 104 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode. As another example, a decrease in mutual capacitance (e.g., the capacitance between a row electrode and a column electrode) is also indicative of a touch near the electrodes. The processing module does this for each representation of the impedance of the electrode it receives. Note that the representation of the impedance is a digital value, an analog signal, an impedance value, and/or any other analog or digital way of representing a sensor's impedance.

The method continues at step 106 where the processing module interprets the change in the impedance to indicate a touch of the touch screen display in an area corresponding to the electrode. For each change in impedance detected, the processing module indicates a touch. Further processing may be done to determine if the touch is a desired touch or an undesired touch. Examples of generating capacitive images will be discussed in greater detail with reference to one or more of FIGS. 25-29.

Figure 7:
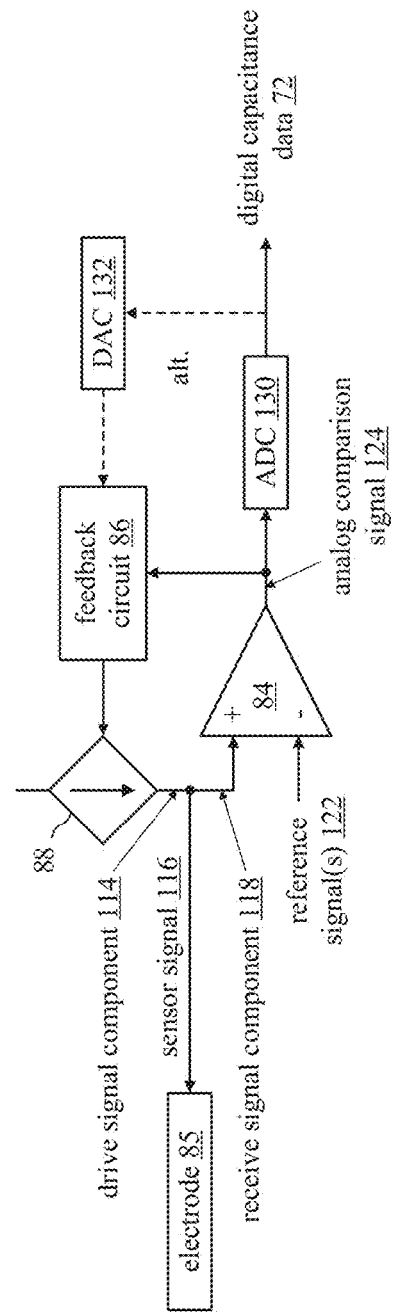
FIG. 7 is a schematic block diagram of an embodiment of a drive-sense circuit.

FIG. 7 is a schematic block diagram of an embodiment of a drive-sense circuit 28 that includes a comparator 84, a feedback circuit 86, a signal source circuit 88, and an analog to digital converter 130. The comparator 84 (which may be implemented, for example, by an operational amplifier) and the analog to digital converter (ADC) 130 convert a sensor signal 116 into digital capacitance data 72. The feedback circuit 86 and the signal source circuit 88 generate a drive signal component 114 from the analog comparison signal 124 at the output of comparator 84. In another example, a digital to analog converter (DAC) 132 converts the digital capacitance data 72 into an analog signal that is used by the feedback circuit 86 and signal source circuit 88 to generate the drive signal component 114.

As an example, in which the DAC 132 is utilized, the comparator 84 and ADC 130 function to keep the sensor signal 116 substantially constant (e.g., substantially matching a reference signal 122) by generating the digital capacitance data 72 to correspond to changes in a receive signal component 118 of the sensor signal. The feedback circuit 86 and signal source circuit 88 function to generate a drive signal component 114 of the sensor signal based on the digital capacitance data 72 to substantially compensate for changes in the receive signal component 118 such that the sensor signal 116 remains substantially constant.

In an example, the drive signal 116 is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the comparator 84 and ADC 130 adjust the digital capacitance data 72 based on the receive signal component 118, which is indicative of the impedance of the electrode and change thereof. The feedback circuit 86 and signal source circuit 88 adjust the regulated current based on the changes to the digital capacitance data 72.

As another example, the drive signal 116 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the comparator 84 and ADC 130 adjust the digital capacitance data 72 based on the receive signal component 118, which is indicative of the impedance of the electrode and change thereof. The feedback circuit 86 and signal source circuit 88 adjust the regulated voltage based on the changes to the digital capacitance data 72.

In a further example of operation, the comparator 84 compares the sensor signal 116 to an analog reference signal 122 to produce an analog comparison signal 124. The analog reference signal 122 includes a DC component and an oscillating component. As such, the sensor signal 116 will have a substantially matching DC component and oscillating component. An example of an analog reference signal 122 is described in greater detail with reference to FIG. 15.

The ADC 130 converts the analog comparison signal 124 into the digital capacitance data 72. The ADC 130 may be implemented in a variety of ways. For example, the ADC 130 is one of: a flash ADC, a successive approximation ADC, a ramp-compare ADC, a Wilkinson ADC, an integrating ADC, a delta encoded ADC, and/or a sigma-delta ADC. The DAC 132 may be a sigma-delta DAC, a pulse width modulator DAC, a binary weighted DAC, a successive approximation DAC, and/or a thermometer-coded DAC.

The DAC 132 and feedback circuit 86 convert the digital capacitance data 72 into an analog feedback signal. The signal source circuit 88 (e.g., a dependent current source, a linear regulator, a DC-DC power supply, etc.) generates a regulated source signal (e.g., a regulated current signal or a regulated voltage signal) based on the analog feedback signal from the feedback circuit 86. Although not separately illustrated, a driver circuit can be provided at the output of the signal source circuit 88 to increase the power of the output of the signal source circuit 88 to produce the drive signal component 114.

Figure 8A:
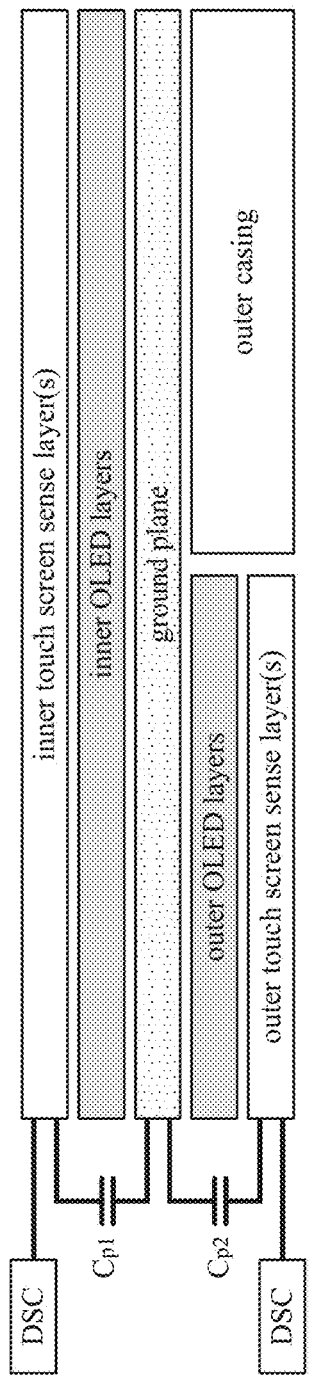
FIG. 8A is a cross section schematic block diagram of an example of self-capacitance in an unfolded flexible touch screen display.

FIG. 8A is a cross section schematic block diagram of an example of self-capacitance in an unfolded flexible touch screen display. As described more fully below, changes in the self-capacitance values of various layers of the flexible touch screen display that result from folding and unfolding of the display can be sensed by drive-sense circuits and utilized to determine a folded/unfolded state of the display.

In this example, generalized layers are illustrated for device (e.g., such as shown in FIGS. 1B-1D) having a flexible touch screen display and a second (e.g., backside) touch screen display. The layers of the flexible touch screen display include inner touch screen sense layer(s), inner OLED layers, and a shared ground plane. The layers of the second touch screen display include outer touch screen sense layer(s), outer OLED layers, and the shared ground plane. The displays of the device are supported by an outer casing in this example.

The inner touch screen sense layer(s) and the outer touch screen sense layer(s) include electrodes, such as the row and column electrodes 85 described herein. These electrodes are coupled to drive-sense circuits (DSCs) to configured to sense proximal touches to the displays and, in certain embodiments, the folded/unfolded state of the flexible touch screen display. In the illustrated embodiment, the self-capacitance of an electrode of the inner touch screen sense layer(s) in an unfolded state is represented as a parasitic capacitance $C_{p1}$, and the self-capacitance an electrode of the outer touch screen sense layer(s) in an unfolded state is represented as a parasitic capacitance $C_{p2}$.

Figure 8B:
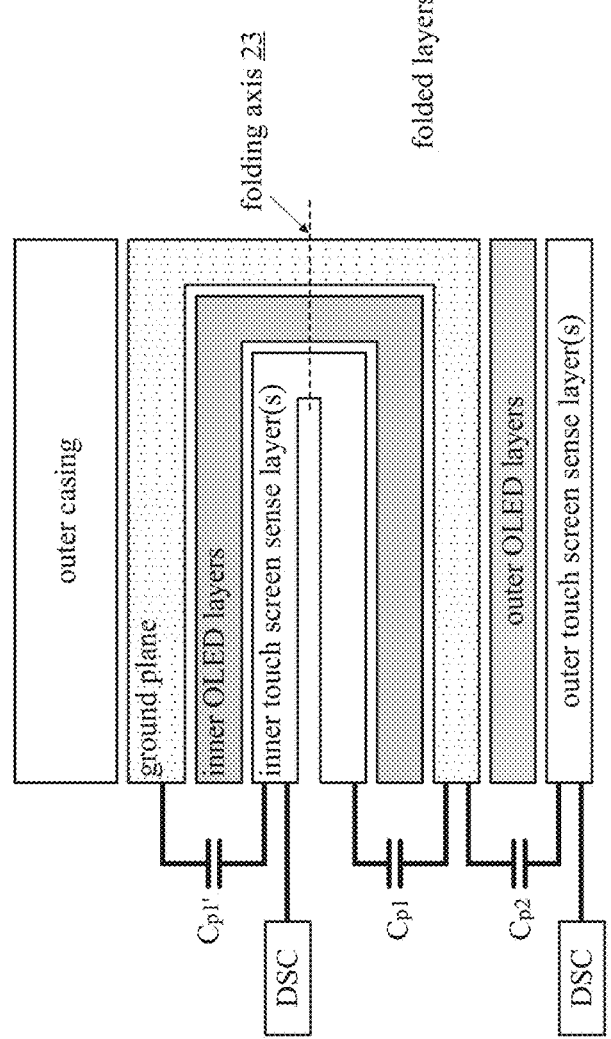
FIG. 8B is a cross section schematic block diagram of an example of self-capacitance in a folded flexible touch screen display.

FIG. 8B is a cross section schematic block diagram of an example of self-capacitance in a folded flexible touch screen display. In this example, the layers of FIG. 8A are folded along a folding axis 23. In the folded state, the self-capacitance of the electrode of the inner touch screen sense layer(s) is $C_{p1}+C_{p1'}$, with $C_{p1'}$ representing a change in the self-capacitance. In an example, the self-capacitance of the inner touch screen sense layer(s) increases when the flexible touch screen display is in a folded state. As described more fully in conjunction with FIGS. 34-49, the change is self-capacitance can be sensed and utilized to determine a folded/unfolded state of the flexible touch screen display, a change in a degree of folding, etc. In this example, the self-capacitance $C_{p2}$ of the outer touch screen sense layer(s) remains unchanged.

Figure 9A:
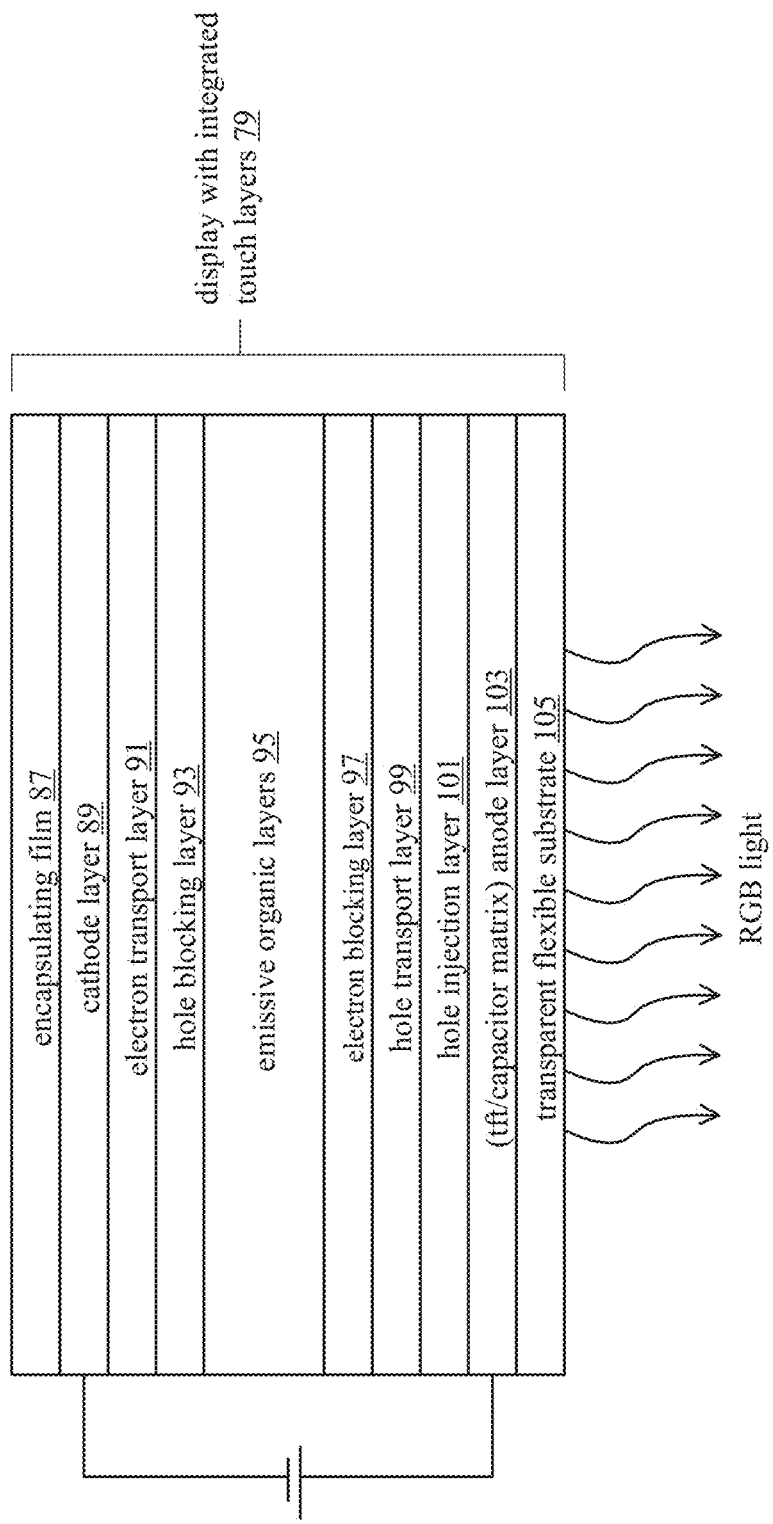
FIG. 9A is a cross section schematic block diagram of an example of a flexible touch screen display with in-cell touch sensors.

FIG. 9A is a cross section schematic block diagram of an example of a flexible touch screen display 79 with integrated in-cell touch sensors/layers. In particular, an example of an Active Matrix Organic Light Emitting Diode (AMOLED) display with integrated touch layers is shown. In general, the main component of an AMOLED display is a matrix of OLED emitters formed in the emissive organic layers 95, which include organic (i.e., carbon-based) materials that emit light/luminescence when a current is applied. The emissive organic layers 95 are sandwiched between a cathode (which injects electrons) and an anode (which removes electrons). The AMOLED display further includes a thin-film transistor (TFT) array, which functions as a series of switches to control the current flowing to each individual (sub-)pixel. The TFT array also includes storage capacitors which allow for larger displays. In an example, an AMOLED display consists of a storage capacitor and two TFTs at each sub-pixel—one to start and stop the charging of storage capacitors and the other to provide a steady voltage or current to the pixel. An example of a sub-pixel including this arrangement is described more fully with reference to FIG. 9D. An example of a flexible touch screen display with on-cell electrodes is described with reference to FIG. 9J.

Referring more specifically to the example of FIG. 9A, the display 79 with integrated touch layers includes an encapsulating film 87 that provides oxygen and moisture protection, a cathode layer 89, an electron transport layer 91, a hole blocking layer 93, emissive organic layers 95, an electron blocking layer 97, a hole transport layer 99, a hole injection layer 101, an anode layer(s) 103 including a TFT/capacitor matrix, and a transparent flexible substrate 105 through which RGB light generated by the emissive organic layer(s) 95 is emitted.

In this example, an electrode 85 may be formed of a variety of materials of the cathode layer 89 and/or anode layer 103, including without limitation a conductive oxide such as indium tin oxide (ITO), indium zinc oxide (IZO), zinc oxide (ZnO), indium oxide ($In_2O_3$), indium gallium oxide (IGO), aluminum zinc oxide (AZO), polycrystalline silicon (poly-Si), amorphous silicon (a-Si), etc., and may include multiple layers.

The plurality of pixels (e.g., 1440×1080) of the flexible touch screen display 79 are defined by the deposition of organic materials in a continuous, discrete "dot" pattern in the emissive organic layers 95. In an example, each pixel includes three sub-pixels: a sub-pixel having a chemical composition that emits red light when stimulated, a sub-pixel having a chemical composition that emits green light when stimulated, and a sub-pixel having a chemical composition that emits blue light when stimulated. The varying brightness of the three sub-pixel colors (red, green, and blue), collectively produce a single color to the human eye. For example, a blue shirt has a 12% red component, a 20% green component, and 55% blue component. In other examples, a pixel may have a differing number of sub-pixels and/or sub-pixel(s) that emit a color other than red, green, and blue (e.g., yellow or white sub-pixels). Note also that the encapsulating layer 87 may further include a polarizing layer(s).

The in-cell touch sense functionality uses the existing layers of the display layers 79 to provide capacitance-based sensors. For instance, one or more of the transparent cathode layer 89 and the transparent anode layer 103 are used to provide row electrodes and column electrodes. Various examples of creating row and column electrodes from one or more of the transparent cathode layer 89 and the transparent anode layer 103 are discussed in various of the subsequent figures.

Figure 9B:
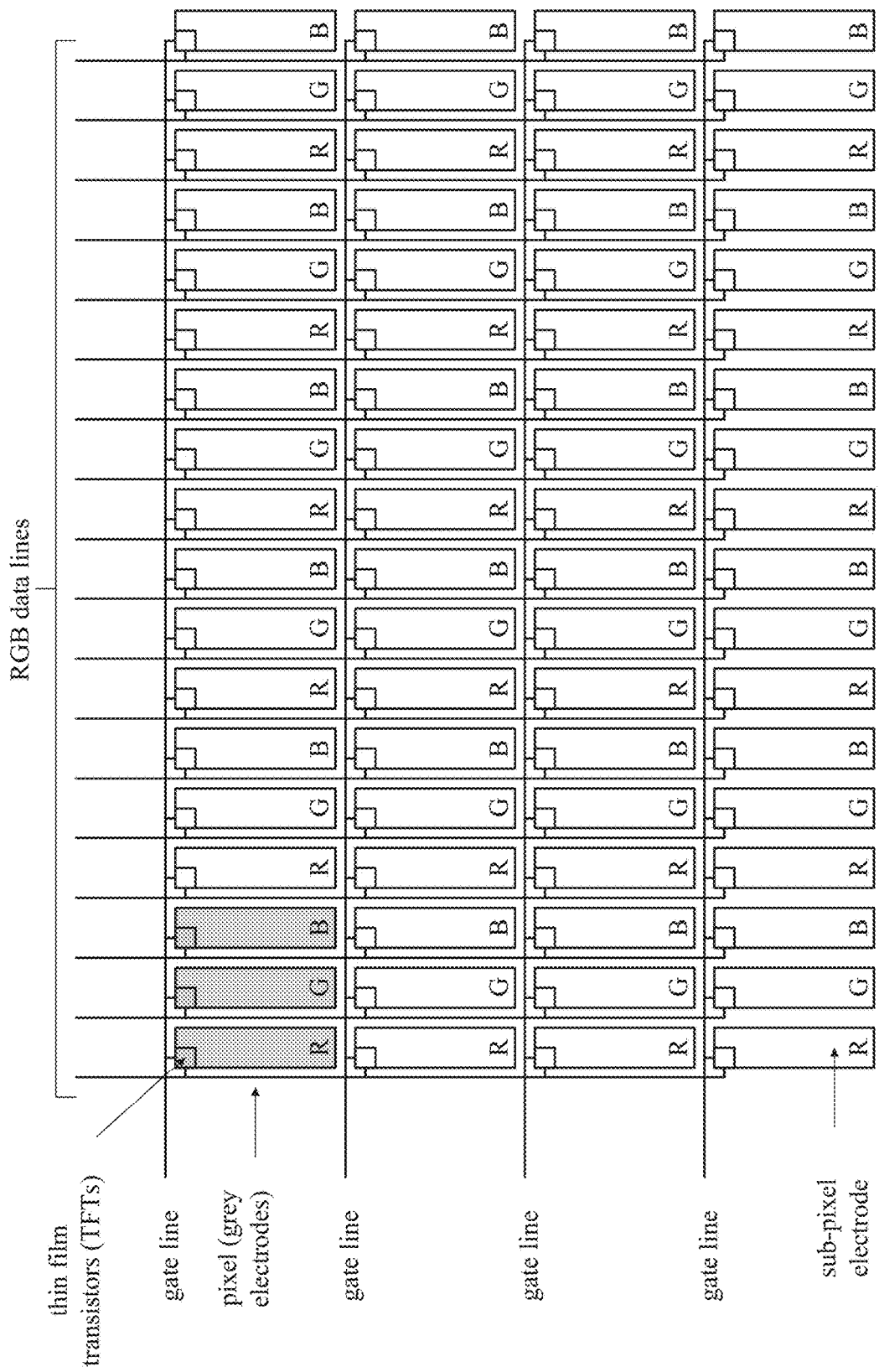
FIG. 9B is a schematic block diagram of an example of a sub-pixel electrodes formed on transparent electrode layer.

FIG. 9B is a schematic block diagram of an example of sub-pixel electrodes formed on a transparent cathode layer 89. In this example, one or more thin film transistors (TFTs) of an active matrix portion of the anode layer 103 are represented by a square overlaying the respective sub-pixel electrodes. An example of such TFTs is described more fully with reference to FIG. 9D. Three sub-pixels (R-red, G-green, and B-blue) form a pixel. The gates of the TFTs associated with a row of sub-pixels are coupled to a common gate line. In this example, each of the four rows has its own gate line. The drains (or sources) of the TFTs associated with a column of sub-electrodes are coupled to a common R, B, or G data line.

In an example of operation, one gate line is activated at a time and RGB data for each pixel of the corresponding row is placed on the RGB data lines. At the next time interval, another gate line is activated and the RGB data for the pixels of that row is placed on the RGB data lines. For 1080 rows and a refresh rate of 60 Hz, each row is activated for about 15 microseconds each time it is activated, which is 60 times per second. When the sub-pixels of a row are not activated, storage capacitors of the active matrix hold at least some of the charge to maintain the organic emitters of the AMOLED of this example in a desired state between refreshes, thereby enabling larger displays.

Figure 9D:
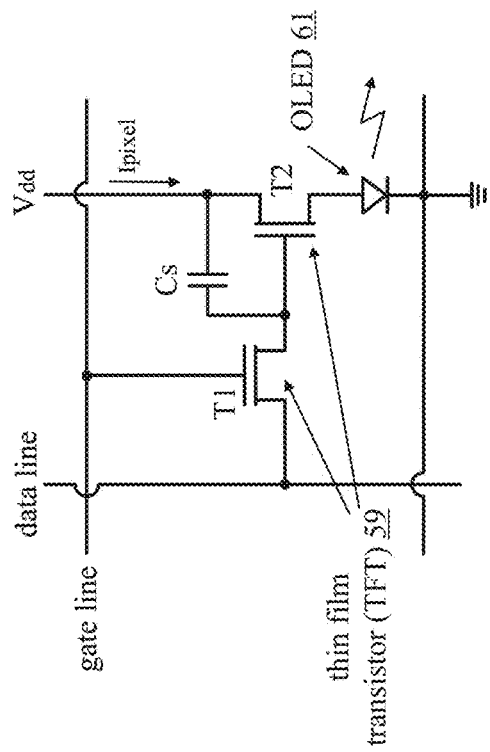
FIG. 9D is a circuit diagram of an example of thin film transistors of an active matrix for controlling a (sub-)pixel.
Figure 9C:
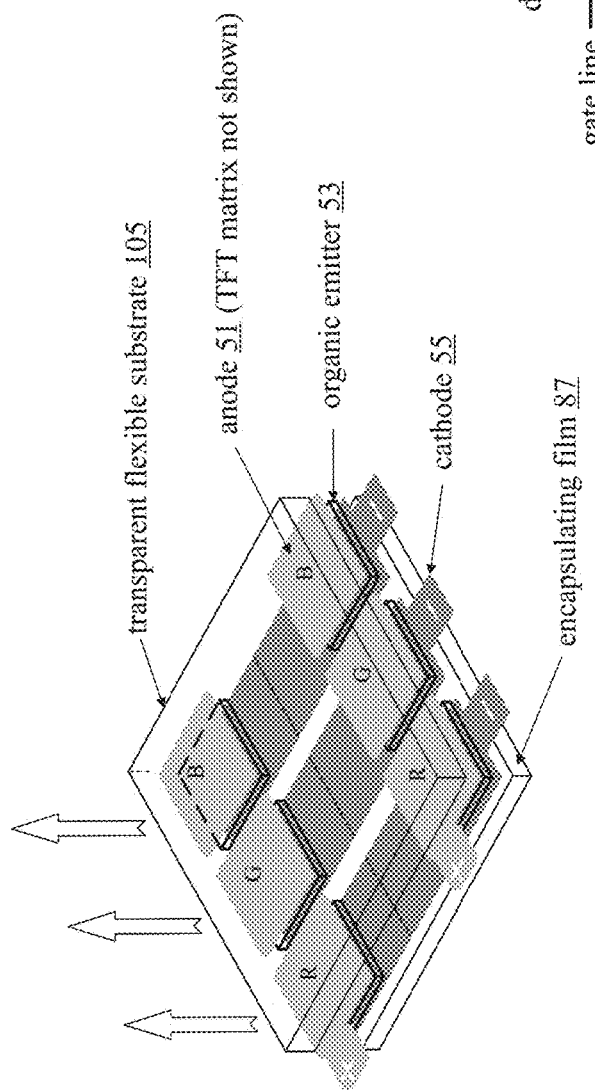
FIG. 9C is a schematic block diagram of an example of pixels having three sub-pixels.

FIG. 9C is a simplified schematic block diagram of an example of two pixels, each having three sub-pixels (R-red, G-green, and B-blue). With reference to FIG. 9A, in the illustrated example the anode 51 electrode of a sub-pixel is formed in the transparent or near transparent anode layer 103 and the cathode 55 of a sub-pixel is formed in the transparent or near transparent cathode layer 89. Each sub-pixel includes an organic emitter 53 formed (e.g., via a deposition process) in emissive organic layers 95.

As illustrated, each sub-pixel anode 51 is a discrete electrode coupled to a supply voltage. Each cathode 55 is associated with a pair of sub-pixels in this example, although various other arrangements are possible. For example, each cathode 55 may be a discrete sub-pixel cathode for an individual sub-pixel such as illustrated in FIG. 9B. In another example, each cathode 55 services a larger number of sub-pixels. Each cathode 55 is coupled to a common voltage reference (e.g., ground, which may be a common ground plane or a segmented common ground plane (e.g., separate ground planes coupled together to form a common ground plane)).

FIG. 9D is a circuit diagram of an example of thin film transistors (TFT) 59 of an active matrix for controlling a sub-pixel. In this example, a portion of an active matrix array of an AMOLED display is illustrated, including a sub-pixel OLED 61, a switching transistor T1, a driving transistor T2, and a storage capacitor Cs. The thin film transistors 59 and the storage capacitor Cs are formed in the anode layer 103 of FIG. 9A and operate to control a current Ipixel through the OLED 61 to selectively trigger luminescence. Each sub-pixel of an AMOLED display is coupled to a corresponding structure of the active matrix.

In the illustrated example, the gate of the switching transistor T1 is coupled to a gate line, the drain/source is coupled to a data line of the RGB data lines, and the source/drain is coupled to the gate of the driving transistor T2. When each of the gate line and data line is asserted (i.e., to turn on the OLED 61), the switching transistor T1 is in an active mode. In turn, the driving transistor T2 is turned on and the storage capacitor Cs is charging. Continuing with this example, the driving transistor T2 provides a voltage across the OLED 61 at a level need to create a substantially constant current to the OLED 61. As a specific example, for a red (R) sub-pixel, the thin film transistors T1 and T2 are activated by the signal on a corresponding gate line and the electric field created by the red sub-pixel electrodes is dependent on a corresponding Red data signal. It is noted that various other arrangements of the components of the active matrix array of an AMOLED display may be utilized without departing from the spirit of the disclosure. In addition, the gate lines and data lines are transparent or positioned between the sub-pixel electrodes (anode and/or cathode) such that they are hidden from human sight.

Figure 9E:
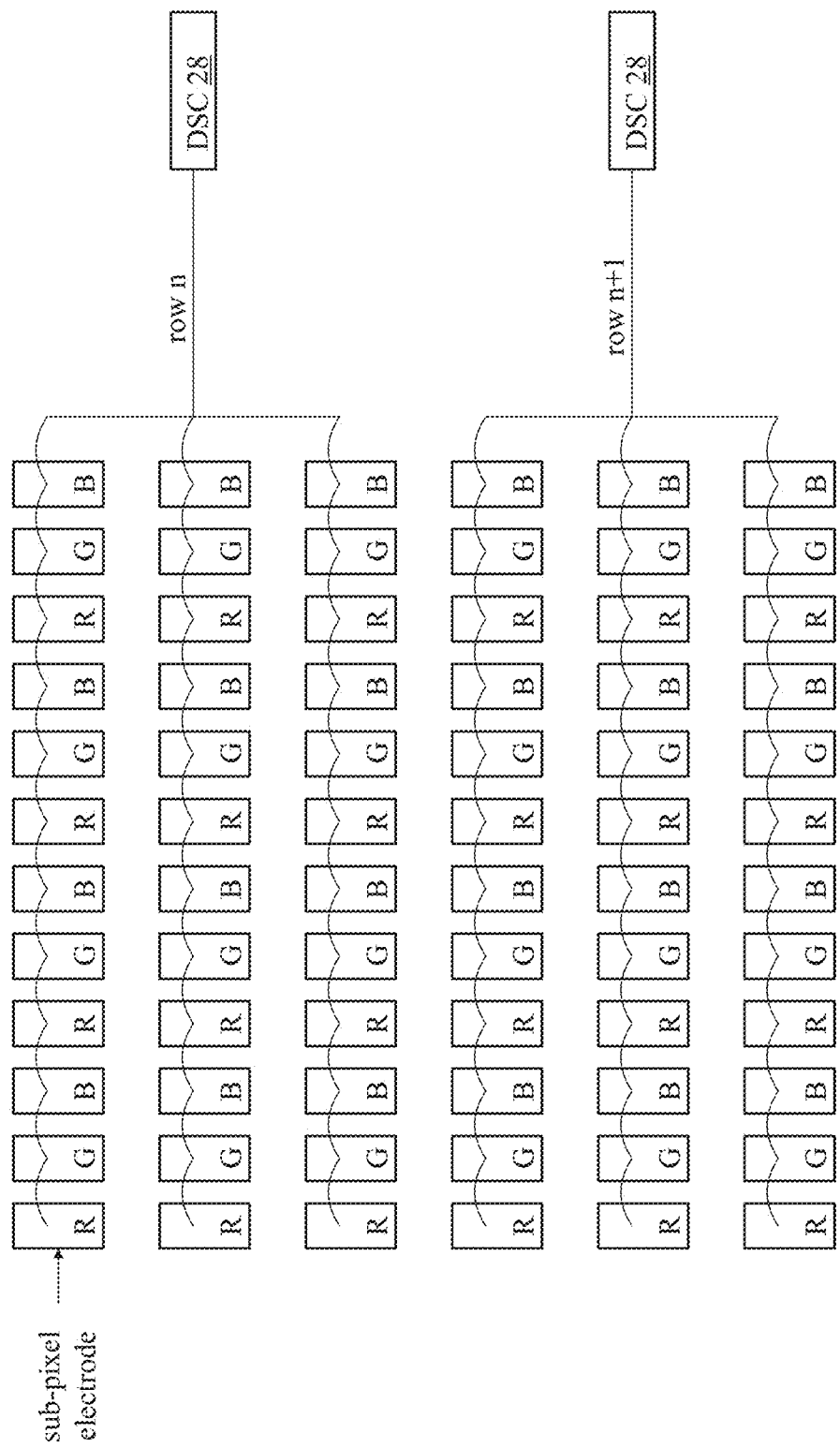
FIG. 9E is a schematic block diagram of an example of sub-pixel electrodes coupled together to form row electrodes of a touch screen sensor.

FIG. 9E is a schematic block diagram of an example of sub-pixel electrodes of the cathode layer 89 or anode layer 103 coupled together to form row electrodes of a flexible touch screen sensor. In this example, three rows of sub-pixel electrodes are coupled together by conductors (e.g., wires, metal traces, vias, etc.) to form one row electrode, which is coupled to a drive-sense circuit (DSC) 28. More or less rows of sub-pixel electrodes may be coupled together to form a row electrode.

FIG. 9F is a schematic block diagram of an example of sub-pixel electrodes of the cathode layer 89 or anode layer 103 coupled together to form column electrodes of a flexible touch screen sensor. In this example, nine columns of sub-pixel electrodes are coupled together by conductors (e.g., wires, metal traces, vias, etc.) to form one column electrode, which is coupled to a drive-sense circuit (DSC) 28. More or less columns of sub-pixel electrodes may be coupled together to form a column electrode.

With respect to FIGS. 9E and 9F, the row electrodes may be formed on one of the cathode layer 89 or anode layer 103 and the column electrodes are formed on the other. In this instance, differential signaling is used for display functionality of sub-pixel electrodes and a common mode voltage is used for touch sensing on the row and column electrodes. This allows for concurrent display and touch sensing operations with negligible adverse effect on display operation.

Figure 9G:
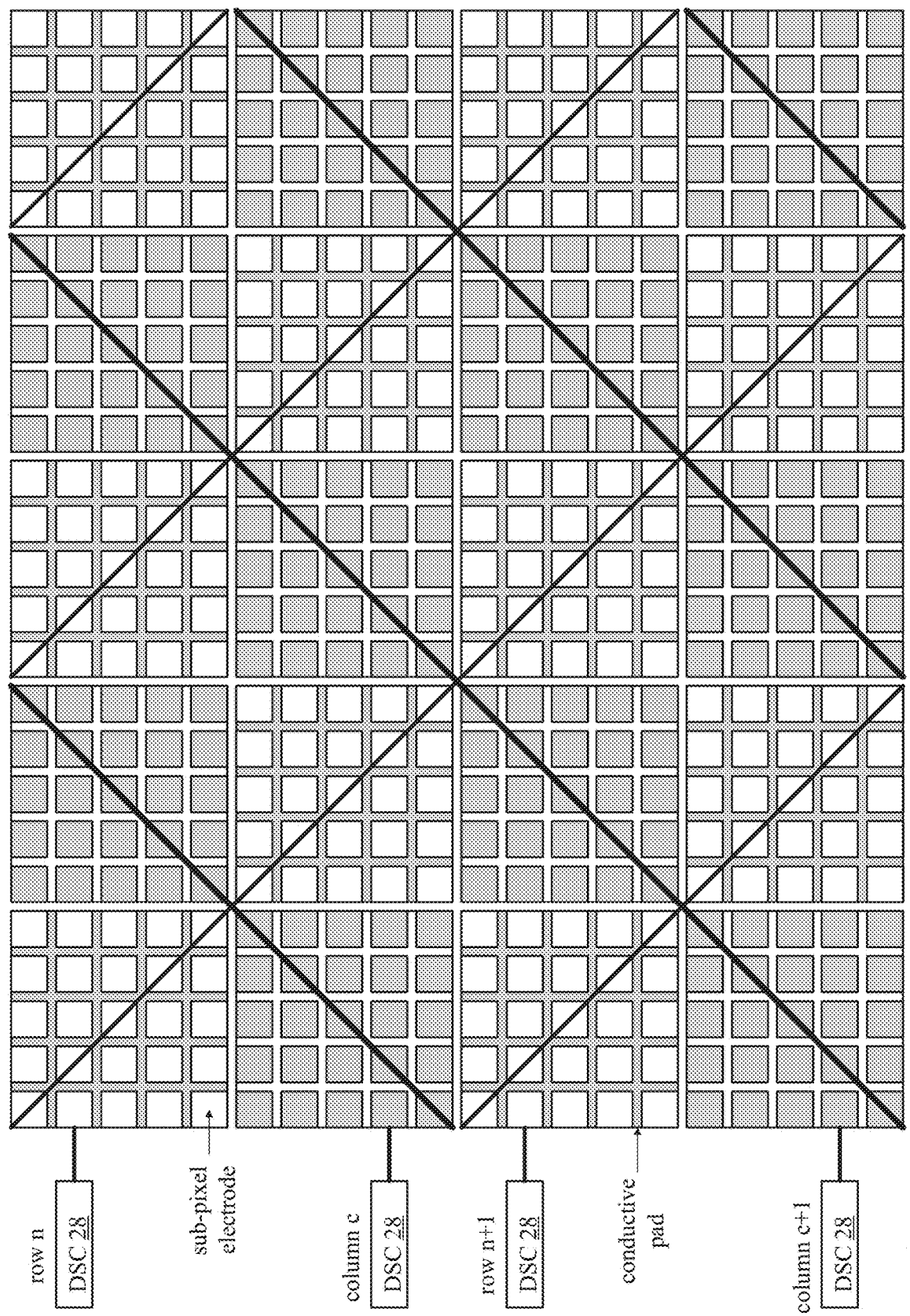
FIG. 9G is a schematic block diagram of an example of sub-pixel electrodes coupled together to form row electrodes and column electrodes of a touch screen sensor.

FIG. 9G is a schematic block diagram of an example of sub-pixel electrodes coupled together to form row electrodes and column electrodes of a flexible touch screen sensor on one of the (transparent) cathode layer 89 or anode layer 103. In this example, 5×5 sub-pixel electrodes are coupled together to form a square (or diamond, depending on orientation), or other geometric shape. The 5×5 squares are then cross coupled together to form a row electrode or a column electrode.

Continuing with this example, white sub-pixel sub-electrodes with a grey background are grouped to form a row electrode for touch sensing and the grey sub-pixels with the white background are grouped to form a column electrode. Each row electrode and column electrode is coupled to a drive-sense circuit (DSC) 28. As shown, the row and column electrodes for touch sensing are diagonal. Note that the geometric shape of the row and column electrodes may be of a different configuration (e.g., zig-zag pattern, lines, etc.) and that the number of sub-pixel electrodes per square (or other shape) may include more or less than 25. Each such square (or other shape) is referred to herein as a conductive pad.

Figure 9H:
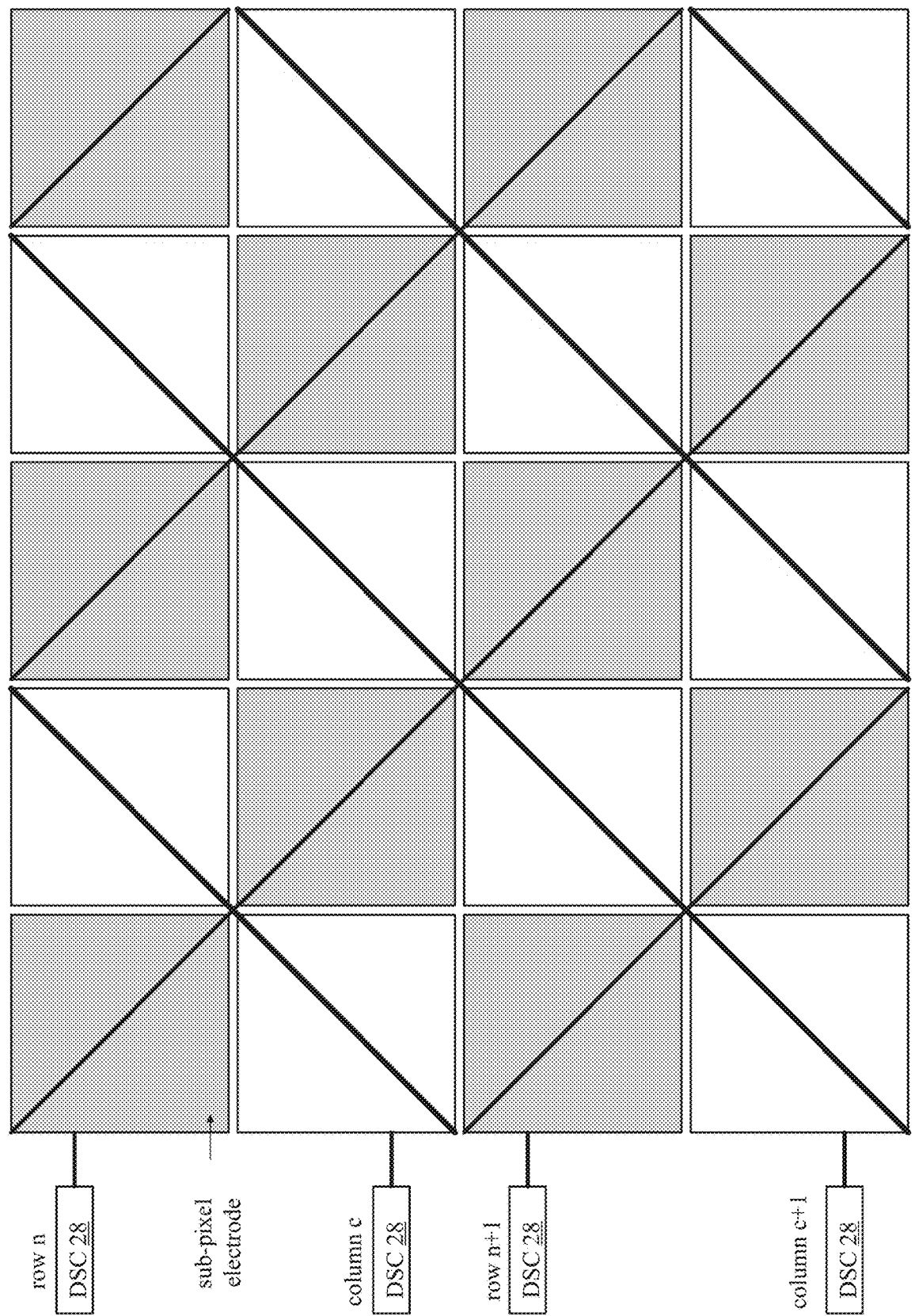
FIG. 9H is a schematic block diagram of an example of a segmented common ground plane forming row electrodes and column electrodes of a touch screen sensor.

FIG. 9H is a schematic block diagram of an example of a segmented common ground plane forming row electrodes and column electrodes of a flexible touch screen sensor on the cathode layer 89. In this instance, each square (or other shape) corresponds to a segment of a common ground plane that services a group of sub-pixel electrodes on the anode layer 103. The squares (or other shape) are coupled together to form row electrodes and column electrodes. The white segmented common ground planes are coupled together to form column electrodes and the grey segmented common ground planes are coupled together to form row electrodes. By implementing the touch screen row and column electrodes in the common ground plane, display and touch sense functionalities may be concurrently executed with negligible adverse effects on the display functionality.

Figure 9I:
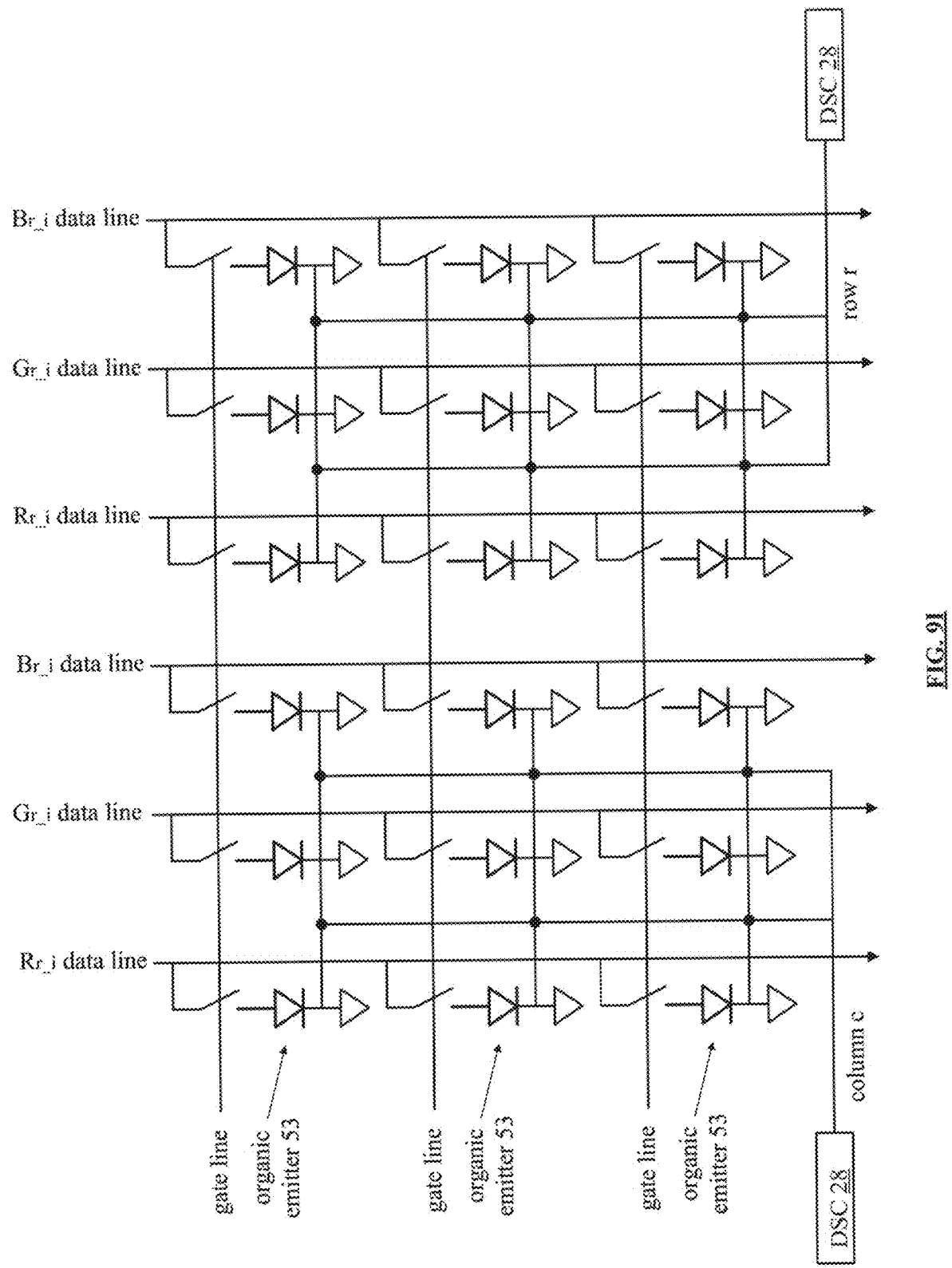
FIG. 9I is a schematic block diagram of another example of sub-pixel electrodes coupled together to form row and column electrodes of a touch screen sensor.

FIG. 9I is a schematic block diagram of another example of sub-pixel electrodes coupled together to form row and column electrodes of a flexible touch screen sensor. In this example, a sub-pixel is represented as organic emitter 53 formed in the emissive organic layers 95. The thin film transistors are represented as switches. In this example, 3×3 sub-pixel electrodes on the cathode layer 89 are coupled together to form a portion of a row electrode for touch sensing or a column electrode for touch sensing. With each of the drive-sense circuits 28 injecting a common signal for self-capacitance sensing, the common signal has negligible adverse effects on the display operation of the sub-pixels.

Figure 9J:
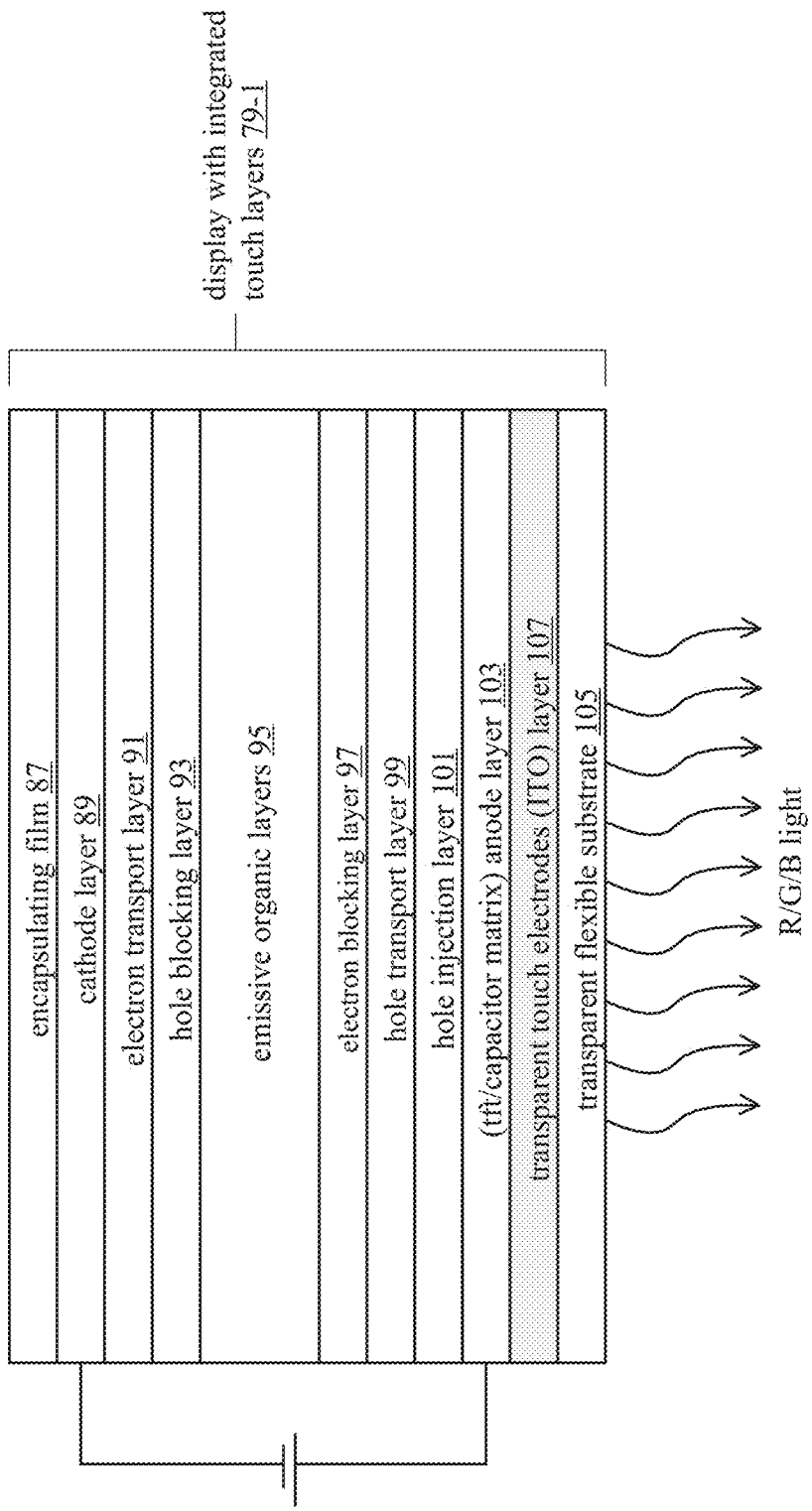
FIG. 9J is a cross section schematic block diagram of an example of a touch screen display with on-cell touch sensors.

FIG. 9J is a cross section schematic block diagram of an example of a touch screen display 79-1 with on-cell touch sensors, which includes an encapsulating film 87, a cathode layer 89, an electron transport layer 91, a hole blocking layer 93, emissive organic layer(s) 95, an electron blocking layer 97, a hole transport layer 99, a hole injection layer 101, an anode layer(s) 103 including a TFT/capacitor matrix, a transparent flexible substrate 105 through which RGB light generated by the emissive organic layer(s) 95 is emitted, and a transparent touch electrodes (ITO) layer 107.

The layers 87-105 and the display with integrated touch sensing layers 79-1 function as described with reference to FIG. 9A for generating a display. A difference lies in how on-cell touch sensing of this embodiment is configured in comparison to the in-cell touch sensing of FIG. 9A. In particular, this embodiment includes an extra transparent touch electrodes (ITO) layer 107 to provide, or assist, with capacitive-based touch sensing. For example, the extra transparent touch electrodes (ITO) layer 107 includes row and column electrodes that can be configured in a similar manner to the electrodes shown in FIG. 9H. As another example, the transparent touch electrodes (ITO) layer 107 includes row electrodes or column electrodes and another one of the cathode layer 89 or anode layer 103 includes the other electrodes (e.g., column electrodes if the extra transparent layer includes row electrodes).

FIG. 10A is a cross section schematic block diagram of a flexible touch screen display 80 without a touch of a finger or a pen. The cross section is taken parallel to a column electrode 85-c and a perpendicular to a row electrode 85-r. The column electrode 85-c is positioned between two dielectric layers 140 and 142. Alternatively, the column electrode 85-c is in the second dielectric layer 142. The row electrode 85-r is positioned in the second dielectric layer 142. Alternatively, the row electrode 85-r is positioned between the dielectric layer 142 and the display substrate 144. As another alternative, the row and column electrodes are in the same layer. In one or more embodiments, the row and column electrodes are formed as discussed in one or more of FIGS. 9A-9J.

Each electrode 85 has a self-capacitance, which corresponds to a parasitic capacitance created by the electrode with respect to other conductors in the display (e.g., ground, conductive layer(s), and/or one or more other electrodes). For example, row electrode 85-r has a parasitic capacitance $C_{p2}$ and column electrode 85-c has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the flexible touch screen display 80 includes a plurality of layers 140-144. Each illustrated layer may itself include one or more layers. For example, dielectric layer 140 includes a surface protective encapsulating film, a glass protective film, one or more reflector layers, one or more polarizing layers, and/or one or more pressure sensitive adhesive (PSA) layers. As another example, the second dielectric layer 142 includes a flexible glass cover, a polyester (PET) film, a support plate (glass or plastic) to support, or embed, one or more of the electrodes 85-c and 85-r, a base plate (glass, plastic, or PET), and one or more PSA layers. As yet another example, the flexible display substrate 144 includes one or more OLED layers, a flexible glass substrate, and/or one or more PSA layers.

FIG. 10B is a cross section schematic block diagram of a flexible touch screen display 80, which is the same as in FIG. 10A. This figure further includes a finger touch, which changes the self-capacitance of the electrodes. In essence, a finger touch creates a parallel capacitance with the parasitic self-capacitances. For example, the self-capacitance of the column electrode 85-c is $C_{p1}$ (parasitic capacitance)+$C_{f1}$ (finger capacitance) and the self-capacitance of the row electrode 85-r is $C_{p2}$+$C_{f2}$. As such, the finger capacitance increases the self-capacitance of the electrodes, which decreases the impedance for a given frequency. The change in impedance of the self-capacitance is detectable by a corresponding drive-sense circuit and is subsequently processed to indicate a screen touch.

FIG. 11 is a cross section schematic block diagram of a flexible touch screen display 80, which is the same as in FIG. 10A. This figure further includes a mutual capacitance (Cm_0) between the electrodes when a touch is not present.

FIG. 12 is a cross section schematic block diagram of a flexible touch screen display 80, which is the same as in FIG. 10A. This figure further includes a mutual capacitance (Cm_1) between the electrodes when a touch is present. In this example, the finger capacitance is effectively in series with the mutual capacitance, which decreases the capacitance of the mutual capacitance. As the capacitance decreases for a given frequency, the impedance increases. The change in impedance of the mutual capacitance is detectable by a corresponding drive-sense circuit and is subsequently processed to indicate a screen touch. Note that, depending on the various properties (e.g., thicknesses, dielectric constants, electrode sizes, electrode spacing, etc.) of the touch screen display, the parasitic capacitances, the mutual capacitances, and/or the finger capacitance are in the range of a few pico-Farads to tens of nano-Farads. In equation form, the capacitance (C) equals:

$C = \epsilon \frac{A}{d}$ where $A$ is plate area, $\epsilon$ is the dielectric constant(s), and $d$ is the distance between the plates.

FIG. 13 is an example graph that plots condition verses capacitance for an electrode of a flexible touch screen display. As shown, the mutual capacitance decreases with a touch and the self-capacitance increases with a touch. Note that the mutual capacitance and self-capacitance for a no-touch condition are shown to be about the same. This is done merely for ease of illustration. In practice, the mutual capacitance and self-capacitance may or may not be about the same capacitance based on the various properties of the touch screen display discussed above.

FIG. 14 is an example graph that plots impedance verses frequency for an electrode of a flexible touch screen display. Since the impedance of an electrode is primarily based on its capacitance (self and/or mutual), as the frequency increases for a fixed capacitance, the impedance decreases based on ½πfC, where f is the frequency and C is the capacitance.

FIG. 15 is a time domain example graph that plots magnitude verses time for an analog reference signal 122. As discussed with reference to FIG. 7, the analog reference signal 122 (e.g., a current signal or a voltage signal) is inputted to a comparator and is compared to the sensor signal 116. The feedback loop of the drive-sense circuit 28 functions to keep the senor signal 116 substantially matching the analog reference signal 122. As such, the sensor signal 116 will have a similar waveform to that of the analog reference signal 122.

In an example, the analog reference signal 122 includes a DC component 121 and/or one or more oscillating components 123. The DC component 121 is a DC voltage in the range of a few hundred milli-volts to tens of volts or more. The oscillating component 123 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 123 may vary so that it can be tuned to the impedance of the sensor and/or to be off-set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

FIG. 16 is a frequency domain example graph that plots magnitude verses frequency for an analog reference signal 122. As shown, the analog reference signal 122 includes the DC component 121 at DC (e.g., 0 Hz or near 0 Hz), a first oscillating component 123-1 at a first frequency (f1), and a second oscillating component 123-2 at a second frequency (f2). In an example, the DC component is used to measure resistance of an electrode (if desired), the first oscillating component 123-1 is used to measure the impedance of self-capacitance, and the second oscillating component 123-2 is used to measure the impedance of mutual capacitance. Note that the second frequency may be greater than the first frequency.

FIG. 17 is a schematic block diagram of an example of a first drive-sense circuit 28-1 coupled to a first electrode 85-c and a second drive-sense circuit 28-2 coupled to a second electrode 85-r without a touch proximal to the electrodes. Each of the drive-sense circuits include a comparator (comp), an analog to digital converter (ADC) 130, a digital to analog converter (DAC) 132, a signal source circuit 133, and a driver. The functionality of this embodiment of a drive-sense circuit was described with reference to FIG. 7. For additional embodiments of a drive-sense circuit see pending patent application entitled, "Drive Sense Circuit with Drive-Sense Line" having a filing date of Aug. 26, 2019, and an application Ser. No. 16/113,3799.

As an example, a first reference signal 122-1 (e.g., analog, or digital) is provided to the first drive-sense circuit 28-1 and a second reference signal 122-2 (e.g., analog or digital) is provided to the second drive-sense circuit 28-2. The first reference signal includes a DC component and/or an oscillating at frequency f1. The second reference signal includes a DC component and/or two oscillating components: the first at frequency f1 and the second at frequency f2.

The first drive-sense circuit 28-1 generates a sensor signal 116 based on the reference signal 122-1 and provides the sensor signal to the column electrode 85-c. The second drive-sense circuit generates another sensor signal 116 based on the reference signal 122-2 and provides the sensor signal to the column electrode.

In response to the sensor signals being applied to the electrodes, the first drive-sense circuit 28-1 generates a first sensed signal 120-1, which includes a component at frequency $f_1$ and a component a frequency $f_2$. The component at frequency $f_1$ corresponds to the self-capacitance of the column electrode 85-c and the component a frequency $f_2$ corresponds to the mutual capacitance between the row and column electrodes 85-*c* and 85-*r*. The self-capacitance is expressed as $1/(2\pi f1 Cp1)$ and the mutual capacitance is expressed as $1/(2\pi f2 Cm\_0)$.

Also, in response to the sensor signals being applied to the electrodes, the second drive-sense circuit 28-1 generates a second sensed signal 120-2, which includes a component at frequency $f_1$ and a component a frequency $f_2$. The component at frequency $f_1$ corresponds to a shielded self-capacitance of the row electrode 85-*r* and the component a frequency $f_2$ corresponds to an unshielded self-capacitance of the row electrode 85-*r*. The shielded self-capacitance of the row electrode is expressed as $1/(2\pi f1 Cp2)$ and the unshielded self-capacitance of the row electrode is expressed as $1/(2\pi f2 Cp2)$.

With each active drive-sense circuit using the same frequency for self-capacitance (e.g., $f_1$), the row and column electrodes are at the same potential, which substantially eliminates cross-coupling between the electrodes. This provides a shielded (i.e., low noise) self-capacitance measurement for the active drive-sense circuits. In this example, with the second drive-sense circuit transmitting the second frequency component, it has a second frequency component in its sensed signal but is primarily based on the row electrode's self-capacitance with some cross coupling from other electrodes carrying signals at different frequencies. The cross coupling of signals at other frequencies injects unwanted noise into this self-capacitance measurement and hence it is referred to as unshielded.

FIG. 18 is a schematic block diagram of an example of a first drive-sense circuit 28-1 coupled to a first electrode 85-*c* and a second drive-sense circuit 28-2 coupled to a second electrode 85-*r* with a finger touch proximal to the electrodes. This example is similar to the one of FIG. 17 with the difference being a finger touch proximal to the electrodes (e.g., a touch that shadows the intersection of the electrodes or is physically close to the intersection of the electrodes). With the finger touch, the self-capacitance and the mutual capacitance of the electrodes are changed.

In this example, the impedance of the self-capacitance at f1 of the column electrode 85-*c* now includes the effect of the finger capacitance. As such, the impedance of the self-capacitance of the column electrode equals $1/(2\pi f1*(Cp1+Cf1))$, which is included in the sensed signal 120-1. The second frequency component at f2 corresponds to the impedance of the mutual capacitance at f2, which includes the effect of the finger capacitance. As such, the impedance of the mutual capacitance equals $1/(2\pi f2 Cm\_1)$, where $C_{m\_1}=(C_{m\_0}*Cf1)/(C_{m\_0}+Cf1)$.

Continuing with this example, the first frequency component at f1 of the second sensed signal 120-2 corresponds to the impedance of the shielded self-capacitance of the row electrode 85-*r* at f1, which is affected by the finger capacitance. As such, the impedance of the capacitance of the row electrode 85-*r* equals $1/(2\pi f1*(Cp2+Cf2))$. The second frequency component at f2 of the second sensed signal 120-2 corresponds to the impedance of the unshielded self-capacitance at f2, which includes the effect of the finger capacitance and is equal to $1/(2\pi f2*(Cp2+Cf2))$.

Figure 19:
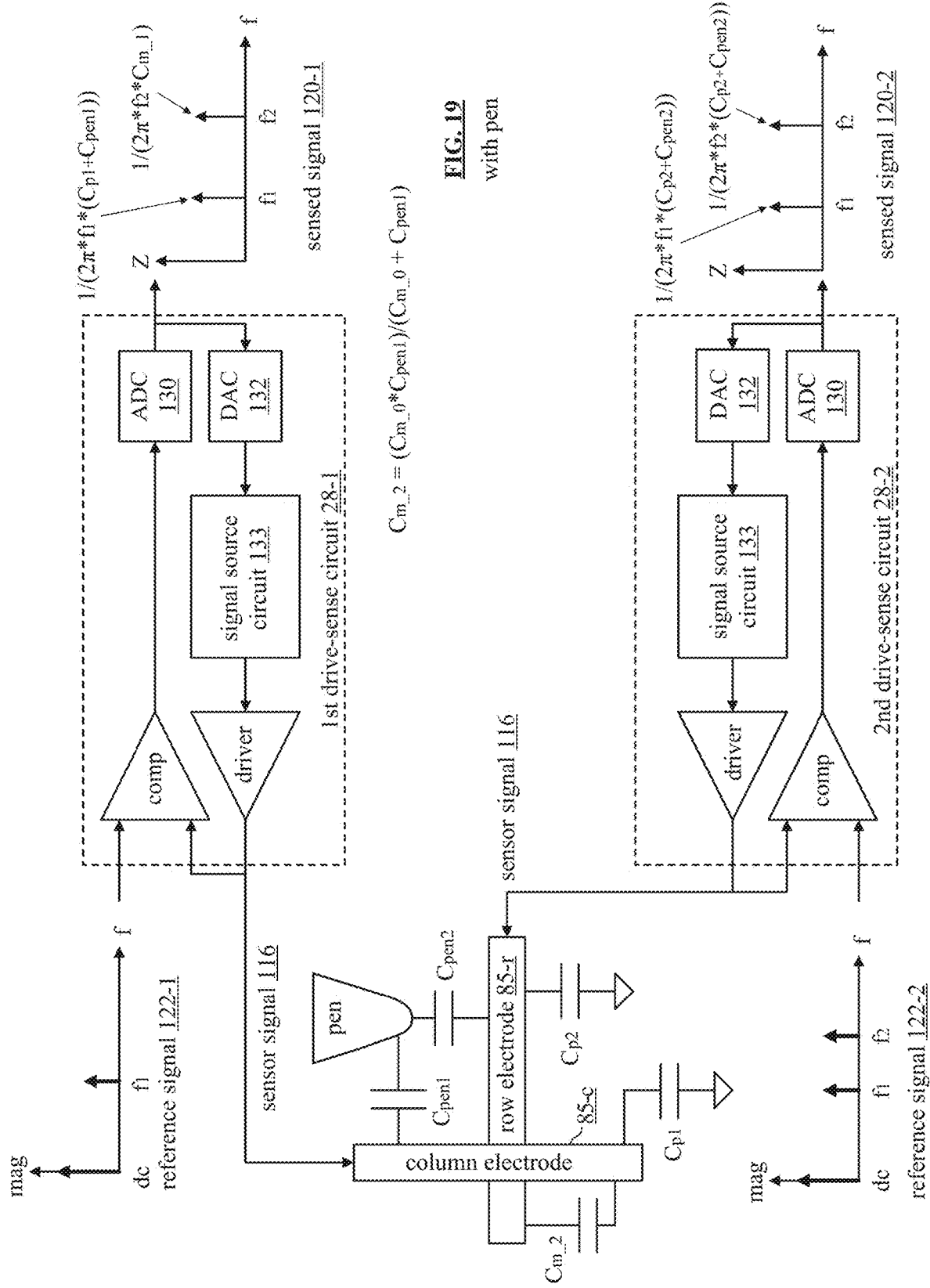
FIG. 19 is a schematic block diagram of an example of a first drive-sense circuit coupled to a first electrode and a second drive-sense circuit coupled to a second electrode with a pen touch proximal to the electrodes.

FIG. 19 is a schematic block diagram of an example of a first drive-sense circuit 28-1 coupled to a first electrode 85-*c* and a second drive-sense circuit 28-2 coupled to a second electrode 85-*r* with a pen touch proximal to the electrodes. This example is similar to the one of FIG. 17 with the difference being a pen touch proximal to the electrodes (e.g., a touch that shadows the intersection of the electrodes or is physically close to the intersection of the electrodes). With the pen touch, the self-capacitance and the mutual capacitance of the electrodes are changed based on the capacitance of the pen Cpen1 and $C_{pen2}$.

In this example, the impedance of the self-capacitance at f1 of the column electrode 85-*c* now includes the effect of the pen's capacitance. As such, the impedance of the self-capacitance of the column electrode equals $1/(2\pi f1*(Cp1+Cpen1))$, which is included in the sensed signal 120-1. The second frequency component at f2 corresponds to the impedance of the mutual capacitance at f2, which includes the effect of the pen capacitance. As such, the impedance of the mutual capacitance equals $1/(2\pi f2 Cm\_2)$, where $C_{m\_2}=(C_{m\_0}*C_{pen1})/(C_{m\_0}+C_{pen1})$.

Continuing with this example, the first frequency component at f1 of the second sensed signal 120-2 corresponds to the impedance of the shielded self-capacitance of the row electrode 85-*r* at f1, which is affected by the pen capacitance. As such, the impedance of the shielded self-capacitance of the row electrode 85-*r* equals $1/(2\pi f1*(Cp2+Cpen2))$. The second frequency component at f2 of the second sensed signal 120-2 corresponds to the impedance of the unshielded self-capacitance at f2, which includes the effect of the pen capacitance and is equal to $1/(2\pi f2*(Cp2+Cpen2))$. Note that the pen capacitance is represented as two capacitances, but may be one capacitance value or a plurality of distributed capacitance values.

Figure 20:
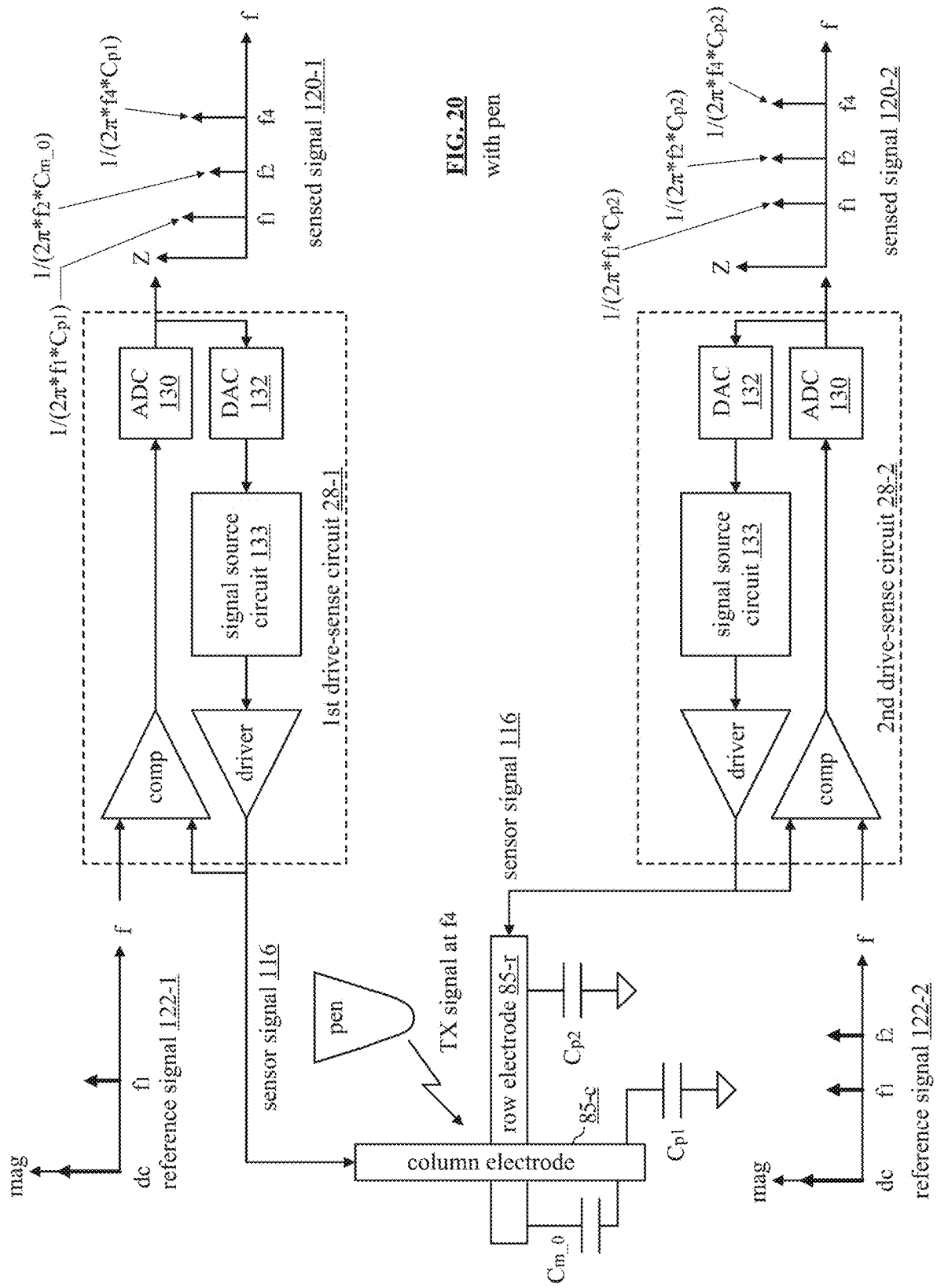
FIG. 20 is a schematic block diagram of another example of a first drive-sense circuit coupled to a first electrode and a second drive-sense circuit coupled to a second electrode with a pen touch proximal to the electrodes.

FIG. 20 is a schematic block diagram of an example of a first drive-sense circuit 28-1 coupled to a first electrode 85-*c* and a second drive-sense circuit 28-2 coupled to a second electrode 85-*r* with a pen proximal to the electrodes. Each of the drive-sense circuits include a comparator, an analog to digital converter (ADC) 130, a digital to analog converter (DAC) 132, a signal source circuit 133, and a driver. The functionality of this embodiment of a drive-sense circuit was described with reference to FIG. 7. The pen is operable to transmit a signal at a frequency of f4, which affects the self and mutual capacitances of the electrodes 85.

In this example, a first reference signal 122-1 is provided to the first drive-sense circuit 28-1. The first reference signal includes a DC component and/or an oscillating component at frequency f1. The first oscillating component at f1 is used to sense impedance of the self-capacitance of the column electrode 85-*c*. The first drive-sense circuit 28-1 generates a first sensed signal 120-1 that includes three frequency dependent components. The first frequency component at f1 corresponds to the impedance of the self-capacitance at f1, which equals $1/(2\pi f1 Cp1)$. The second frequency component at f2 corresponds to the impedance of the mutual capacitance at f2, which equals $1/(2\pi f2 Cm\_0)$. The third frequency component at f4 corresponds to the signal transmitted by the pen.

Continuing with this example, a second reference signal 122-2 is provided to the second drive-sense circuit 28-2. The second analog reference signal includes a DC component and/or two oscillating components: the first at frequency f1 and the second at frequency f2. The first oscillating component at f1 is used to sense impedance of the shielded self-capacitance of the row electrode 85-*r* and the second oscillating component at f2 is used to sense the unshielded self-capacitance of the row electrode 85-*r*. The second drive-sense circuit 28-2 generates a second sensed signal 120-2 that includes three frequency dependent components. The first frequency component at f1 corresponds to the impedance of the shielded self-capacitance at f1, which equals $1/(2\pi f1 Cp2)$. The second frequency component at f2 corresponds to the impedance of the unshielded self-capacitance at f2, which equals $1/(2\pi f2Cp2)$. The third frequency component at f4 corresponds to signal transmitted by the pen.

As a further example, the pen transmits a sinusoidal signal having a frequency of $f_4$. When the pen is near the surface of the touch screen, electromagnetic properties of the signal increase the voltage on (or current in) the electrodes proximal to the touch of the pen. Since impedance is equal to voltage/current and as a specific example, when the voltage increases for a constant current, the impedance increases. As another specific example, when the current increases for a constant voltage, the impedance increases. The increase in impedance is detectable and is used as an indication of a touch.

Figure 21:
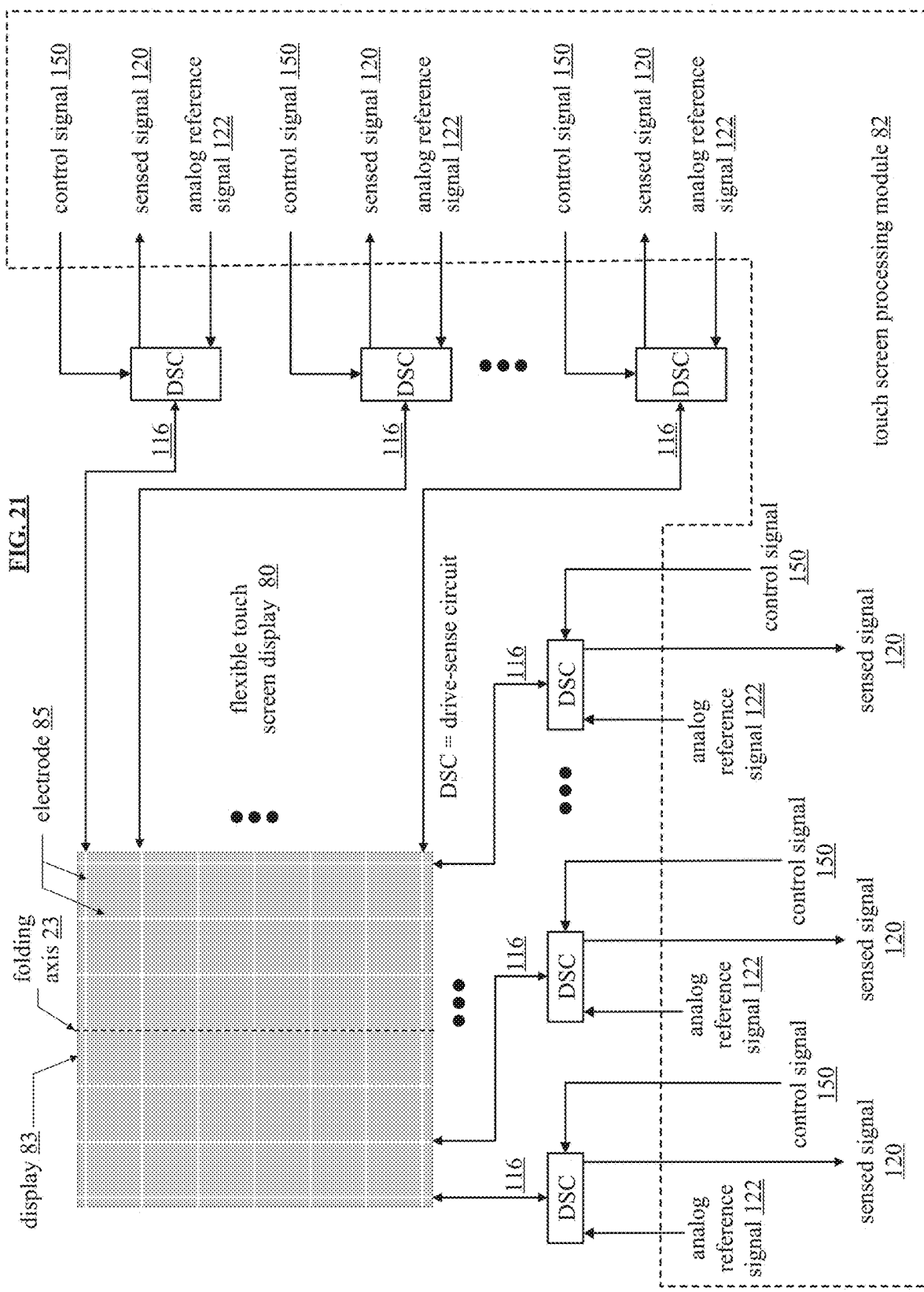
FIG. 21 is a schematic block diagram of another embodiment of a flexible touch screen display.

FIG. 21 is a schematic block diagram of another embodiment of a flexible touch screen display 80 that includes the display 83 having a folding axis 23, the electrodes 85, a plurality of drive-sense circuits (DSC), and the touch screen processing module 82, which function as previously discussed. In addition, the touch screen processing module 82 generates a plurality of control signals 150 to enable the drive-sense circuits (DSC) to monitor the sensor signals 120 on the electrodes 85. For example, the processing module 82 provides an individual control signal 150 to each of the drive-sense circuits to individually enable or disable the drive-sense circuits. In an embodiment, the control signal 150 closes a switch to provide power to the drive-sense circuit. In another embodiment, the control signal 150 enables one or more components of the drive-sense circuit.

The processing module 82 further provides analog reference signals 122 to the drive-sense circuits. In an embodiment, each drive-sense circuit receives a unique analog reference signal. In another embodiment, a first group of drive-sense circuits receive a first analog reference signal, and a second group of drive-sense circuits receive a second analog reference signal. In yet another embodiment, the drive-sense circuits receive the same analog reference signal. Note that the processing module 82 uses a combination of analog reference signals with control signals to ensure that different frequencies are used for oscillating components of the analog reference signal.

The drive-sense circuits provide sensor signals 116 to the electrodes. The impedances of the electrodes affect the sensed signal, which the drive-sense circuits sense via the received signal component and generate the sensed signal 120 therefrom. The sensed signals 120 are essentially representations of the impedances of the electrodes, which are provided to the touch screen processing module 82.

The processing module 82 interprets the sensed signals 120 (e.g., the representations of impedances of the electrodes) to detect a change in the impedance of one or more electrodes. For example, a finger touch increases the self-capacitance of an electrode, thereby decreasing its impedance at a given frequency. As another example, a finger touch decreases the mutual capacitance of an electrode, thereby increasing its impedance at a given frequency. The processing module 82 then interprets the change in the impedance of one or more electrodes to indicate one or more touches of the touch screen display 80.

Figure 22:
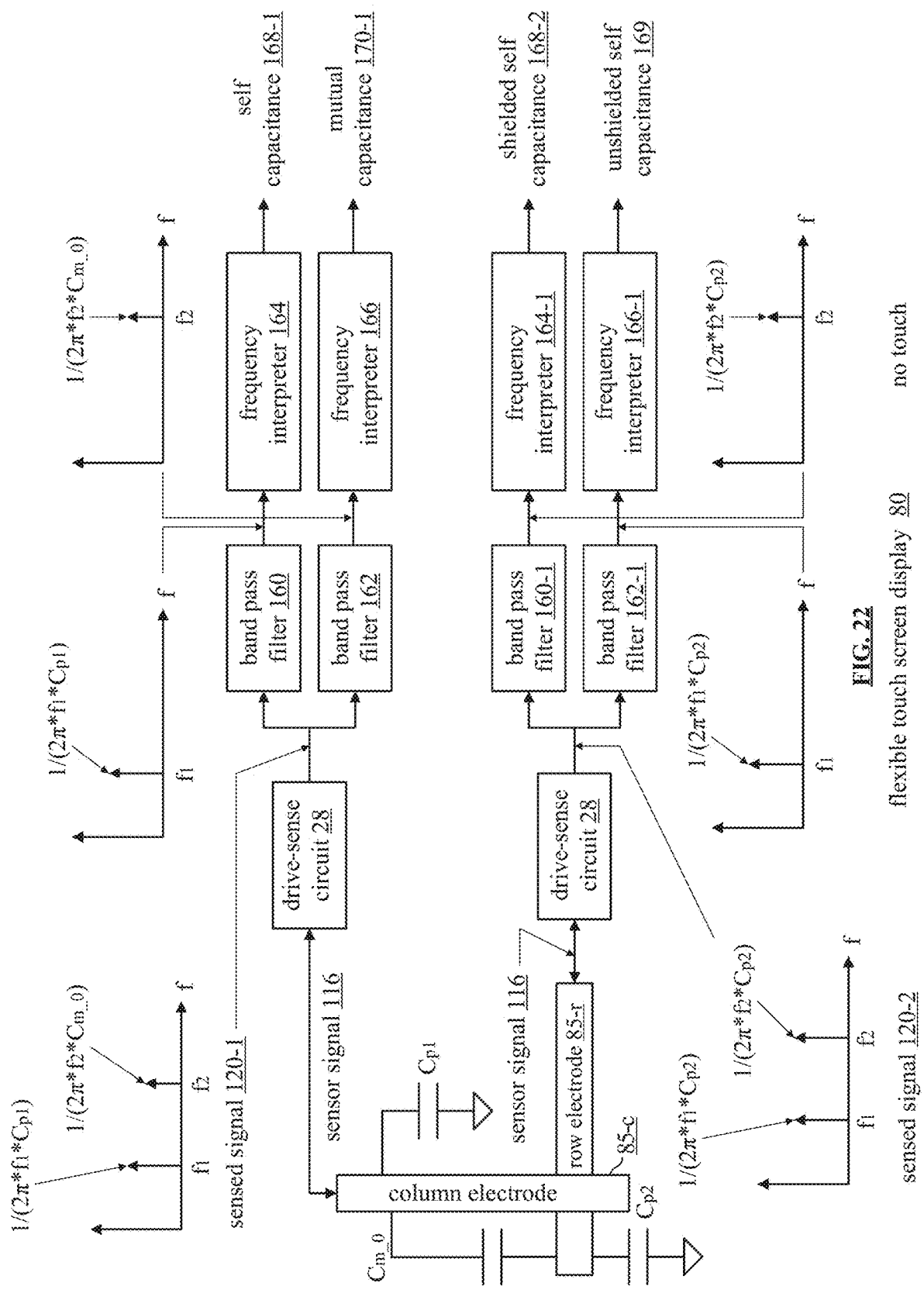
FIG. 22 is a schematic block diagram of a touchless example of a few drive-sense circuits and a portion of the touch screen processing module of a flexible touch screen display.

FIG. 22 is a schematic block diagram of a touchless example of a few drive-sense circuits 28 and a portion of the touch screen processing module 82 of a touch screen display 80. The portion of the processing module 82 includes band pass filters 160, 162, 160-1, and 162-1, frequency interpreters 164 and 164-1, and 166 and 166-1. As previously discussed, a first drive-sense circuit 28 is coupled to column electrode 85c and a second drive-sense circuit 28 is coupled to a row electrode 85r.

The drive-sense circuits provide sensor signals 116 to their respective electrodes 85 and produce therefrom respective sensed signals 120. The first sensed signal 120-1 includes a first frequency component at $f_1$ that corresponds to the self-capacitance of the column electrode 85c and a second frequency component at $f_2$ that corresponds to the mutual capacitance of the column electrode 85c. The second sensed signal 120-2 includes a first frequency component at $f_1$ that corresponds to the shielded self-capacitance of the row electrode 85r and/or a second frequency component at $f_2$ that corresponds to the unshielded self-capacitance of the row electrode 85r. In an embodiment, the sensed signals 120 are frequency domain digital signals.

The first bandpass filter 160 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 160 passes the portion of the sensed signal 120-1 that corresponds to the self-capacitance of the column electrode 85c. In an embodiment, the sensed signal 116 is a digital signal, thus, the first bandpass filter 160 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a self-capacitance value 168-1 for the column electrode. As an example, the frequency interpreter 164 is a processing module, or portion thereof, that executes a function to convert the first bandpass filter sensed signal into the self-capacitance value 168-1, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The second bandpass filter 162 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 160 passes the portion of the sensed signal 120-1 that corresponds to the mutual capacitance of the column electrode 85c and the row electrode 85r. In an embodiment, the sensed signal 116 is a digital signal, thus, the second bandpass filter 162 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 166 receives the second bandpass filter sensed signal and interprets it to render a mutual capacitance value 170-1. As an example, the frequency interpreter 166 is a processing module, or portion thereof, that executes a function to convert the second bandpass filter sensed signal into the mutual capacitance value 170-1, which is an actual capacitance value, a relative capacitance value (e.g., in a range of 0-100), and/or a difference capacitance value (e.g., is the difference between a default capacitance value and a sensed capacitance value). As another example, the frequency interpreter 166 is a look up table where the first bandpass filter sensed signal is an index for the table.

For the row electrode 85r, the drive-sense circuit 28 produces a second sensed signal 120-2, which includes a shielded self-capacitance component and/or an unshielded self-capacitance component. The third bandpass filter 160-1 is similar to the first bandpass filter 160 and, as such passes signals in a bandpass region centered about frequency $f_1$ and attenuates signals outside of the bandpass region. In this example, the third bandpass filter 160-1 passes the portion of the second sensed signal 120-2 that corresponds to the shielded self-capacitance of the row electrode 85r.

The frequency interpreter 164-1 receives the second bandpass filter sensed signal and interprets it to render a second and shielded self-capacitance value 168-2 for the row electrode. The frequency interpreter 164-1 may be implemented similarly to the first frequency interpreter 164 or an integrated portion thereof. In an embodiment, the second self-capacitance value 168-2 is an actual capacitance value, a relative capacitance value (e.g., in a range of 0-100), or a difference capacitance value (e.g., is the difference between a default capacitance value and a sensed capacitance value).

The fourth bandpass filter 162-2, if included, is similar to the second bandpass filter 162. As such, it passes, substantially unattenuated, signals in a bandpass region centered about frequency $f_2$ and attenuates signals outside of the bandpass region. In this example, the fourth bandpass filter 162-2 passes the portion of the second sensed signal 120-2 that corresponds to the unshielded self-capacitance of the row electrode 85r.

The frequency interpreter 166-1, if included, receives the fourth bandpass filter sensed signal and interprets it to render an unshielded self-capacitance value 168-2. The frequency interpreter 166-1 may be implemented similarly to the first frequency interpreter 166 or an integrated portion thereof. In an embodiment, the unshielded self-capacitance value 169 is an actual capacitance value, a relative capacitance value (e.g., in a range of 0-100), or a difference capacitance value (e.g., is the difference between a default capacitance value and a sensed capacitance value). Note that the unshielded self-capacitance may be ignored, thus band pass filter 162-1 and frequency interpreter 166-1 may be omitted.

Figure 23:
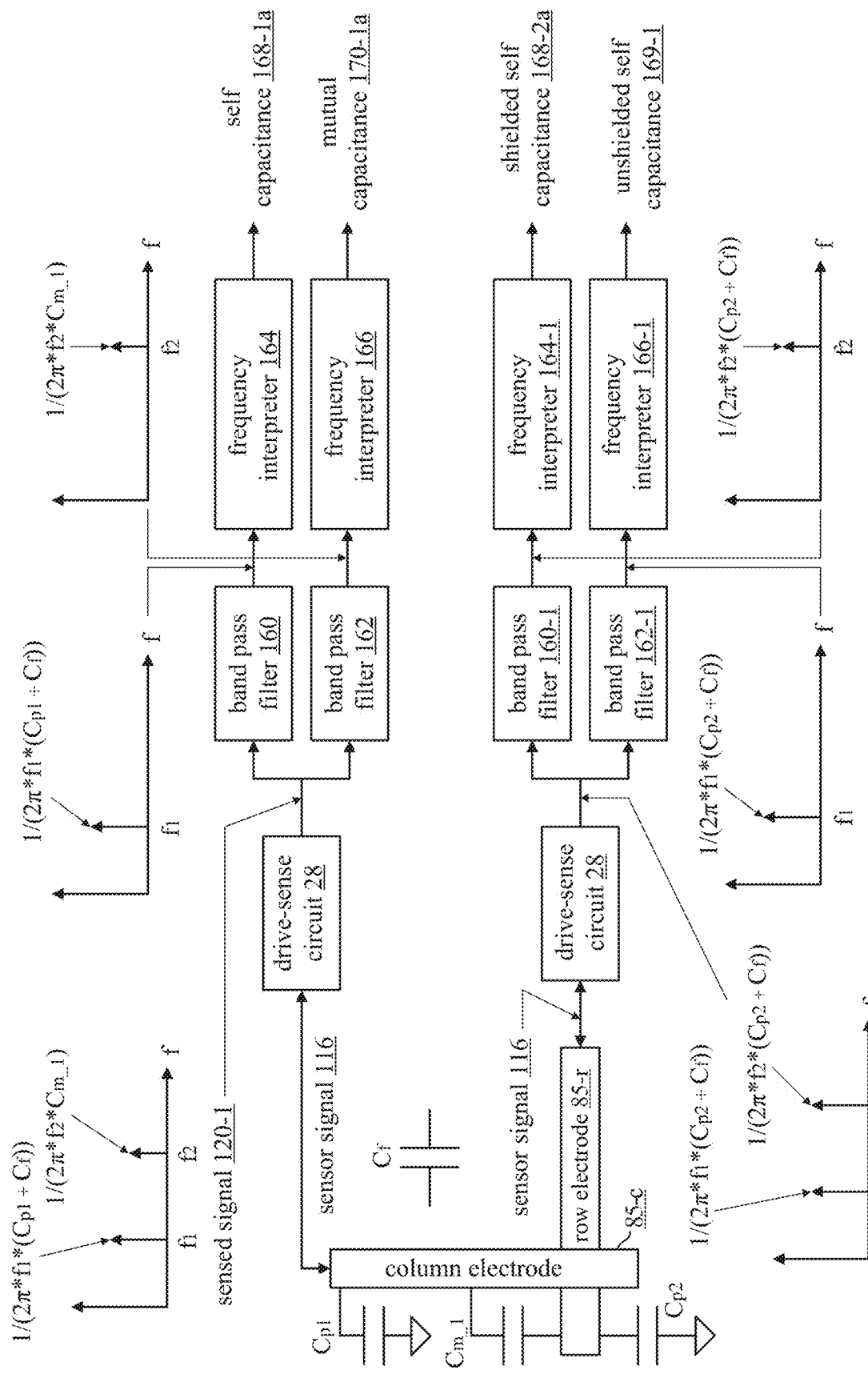
FIG. 23 is a schematic block diagram of a finger touch example of a few drive-sense circuits and a portion of the touch screen processing module of a flexible touch screen display.

FIG. 23 is a schematic block diagram of a finger touch example of a few drive-sense circuits and a portion of the touch screen processing module of a flexible touch screen display that is similar to FIG. 22, with the difference being a finger touch as represented by the finger capacitance $C_f$. In this example, the self-capacitance and mutual capacitance of each electrode is affected by the finger capacitance.

The effected self-capacitance of the column electrode 85c is processed by the first bandpass filter 160 and the frequency interpreter 164 to produce a self-capacitance value 168-1a. The mutual capacitance of the column electrode 85c and row electrode is processed by the second bandpass filter 162 and the frequency interpreter 166 to produce a mutual capacitance value 170-1a.

The effected shielded self-capacitance of the row electrode 85r is processed by the third bandpass filter 160-1 and the frequency interpreter 164-1 to produce a self-capacitance value 168-2a. The effected unshielded self-capacitance of the row electrode 85r is processed by the fourth bandpass filter 162-1 and the frequency interpreter 166-1 to produce an unshielded self-capacitance value 169-1.

Figure 24:
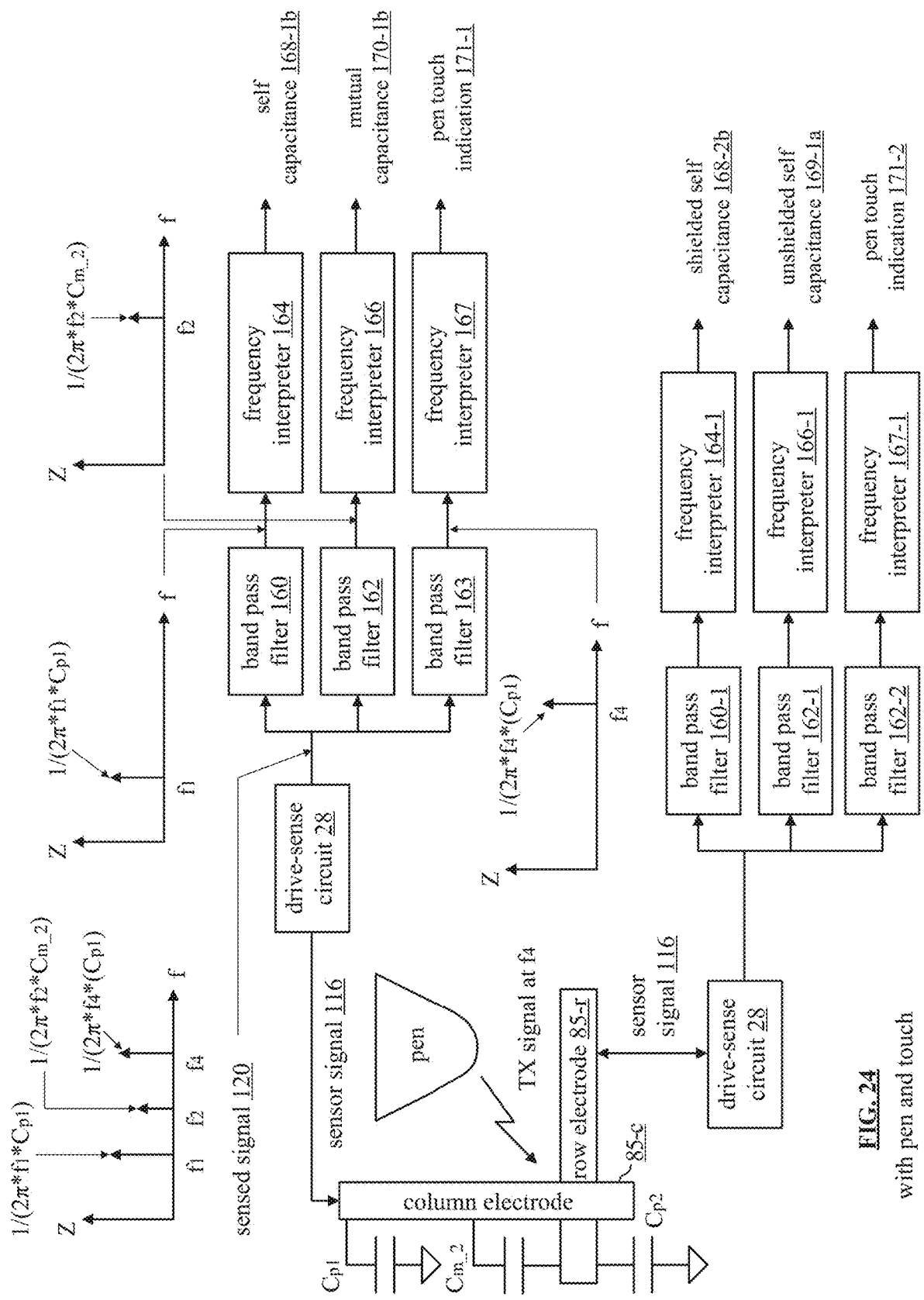
FIG. 24 is a schematic block diagram of a pen touch example of a few drive-sense circuits and a portion of the touch screen processing module of a flexible touch screen display.

FIG. 24 is a schematic block diagram of a pen touch example of a few drive-sense circuits and a portion of the touch screen processing module of a flexible touch screen display that is similar to FIG. 22, with the difference being a pen touch as represented by the pen capacitance $C_{pen}$. In this example, the self-capacitance and mutual capacitance of each electrode is affected by the pen capacitance.

The effected self-capacitance of the column electrode 85c is processed by the first bandpass filter 160 and the frequency interpreter 164 to produce a self-capacitance value 168-1b. The effected mutual capacitance of the column electrode 85c and row electrode 85r is processed by the second bandpass filter 162 and the frequency interpreter 166 to produce a mutual capacitance value 170-1b. The effected pen touch capacitance of the column electrode 85c is processed by the fifth band pass filter 163 and the frequency interpreter 167 to produce a pen touch indication 171-1.

The effected shielded self-capacitance of the row electrode 85r is processed by the third bandpass filter 160-1 and the frequency interpreter 164-1 to produce a shielded self-capacitance value 168-2b. The effected unshielded self-capacitance of the row electrode 85r is processed by the fourth bandpass filter 162-1 and the frequency interpreter 166-1 to produce an unshielded self-capacitance value 170-2a. The effected pen touch capacitance of the row electrode 85r is processed by the sixth band pass filter 167-1 and the frequency interpreter 167-1 to produce a pen touch indication 171-2.

Figure 25:
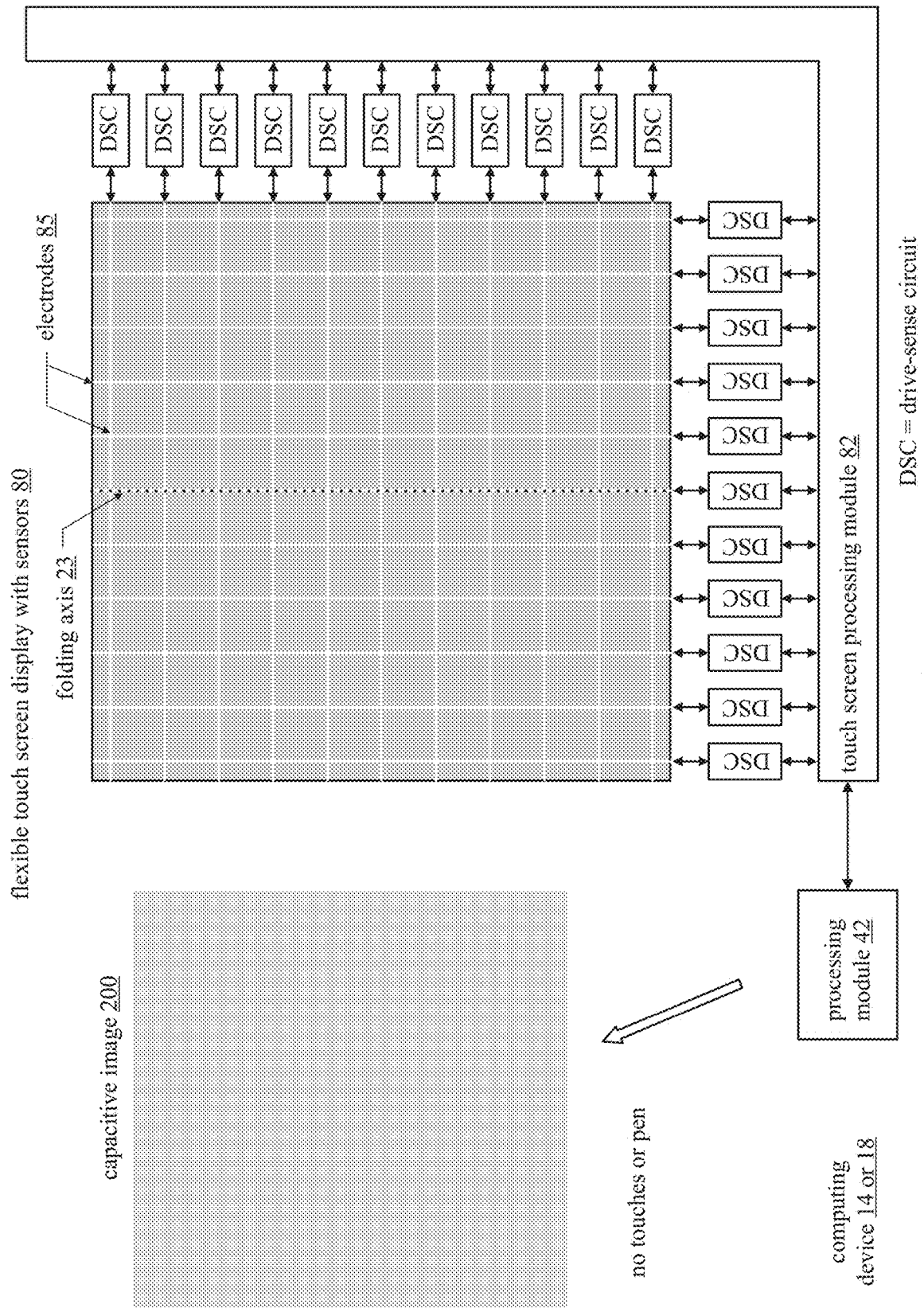
FIG. 25 is a schematic block diagram of an example of a computing device generating a capacitive image of a flexible touch screen display.

FIG. 25 is a schematic block diagram of an example of a device 11, 13, 15, 29, or 37 or a computing device 14 or 18 that includes the components of FIG. 2 and/or FIG. 3. Only the processing module 42, the touch screen processing module 82, the flexible display 80 or 90, the electrodes 85, and the drive-sense circuits (DSC) are shown.

In an example of operation, the touch screen processing module 82 receives sensed signals from the drive-sense circuits and interprets them to identify a finger or pen touch. In this example, there are no touches. The touch screen processing module 82 provides touch data (which includes location of touches, if any, based on the row and column electrodes having an impedance change due to the touch(es)) to the processing module 42.

The processing module 42 processes the touch data to produce a capacitive image 232 of the flexible display 80 or 90. In this example, there are no touches, so the capacitive image 232 is substantially uniform across the display. The refresh rate of the capacitive image ranges from a few frames of capacitive images per second to a hundred or more frames of capacitive images per second. Note that the capacitive image may be generated in a variety of ways. For example, the self-capacitance and/or mutual capacitance of each touch cell (e.g., intersection of a row electrode with a column electrode) is represented by a color. When the touch cells have substantially the same capacitance, their representative color will be substantially the same. As another example, the capacitance image is topological mapping of differences between the capacitances of the touch cells.

Figure 26:
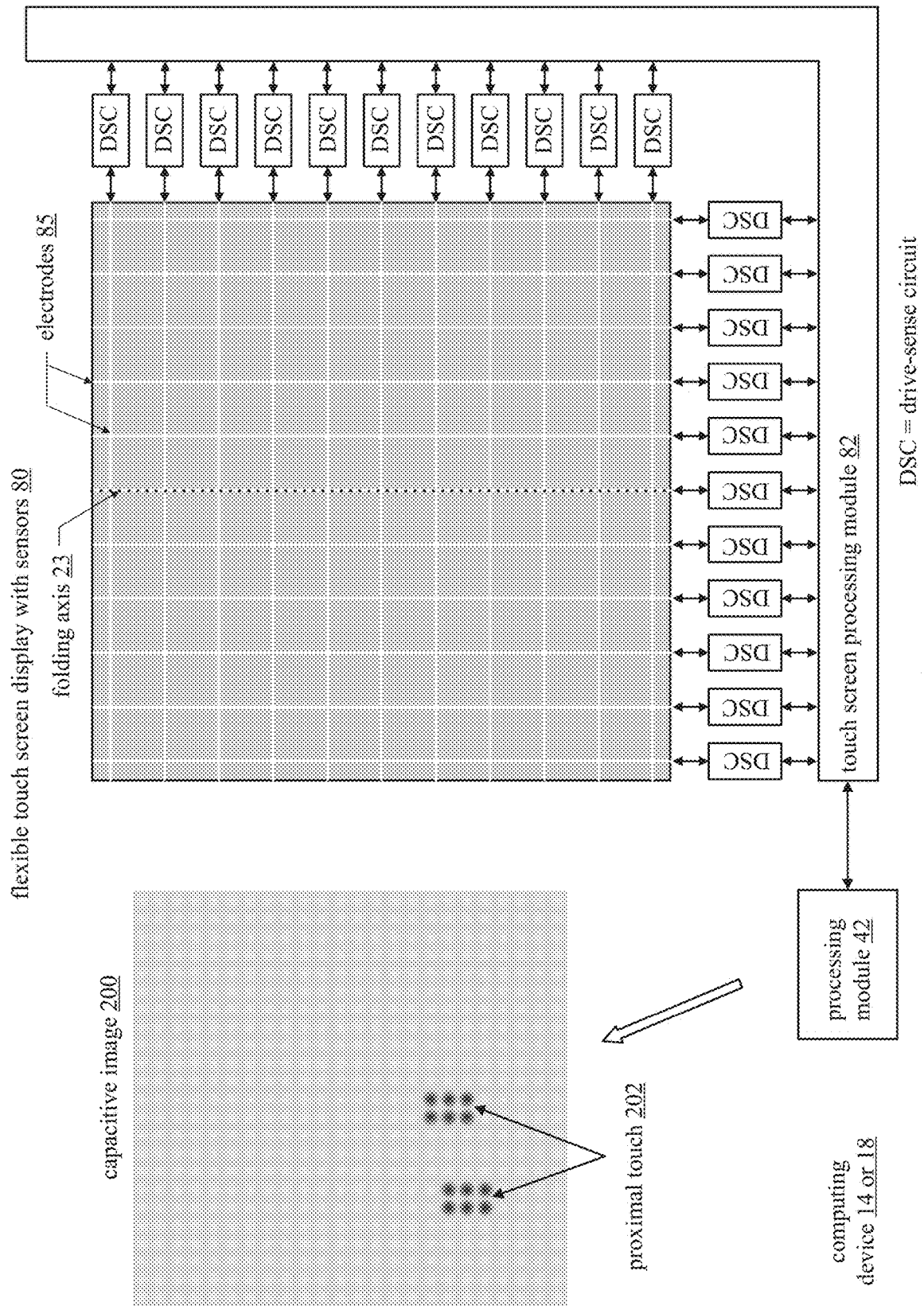
FIG. 26 is a schematic block diagram of another example of a computing device generating a capacitive image of a flexible touch screen display.

FIG. 26 is a schematic block diagram of another example of a device generating a capacitive image of a flexible touch screen display that is substantially similar to the example of FIG. 25 with the exception that the touch data includes two touches. As such, the touch data generated by the touch screen processing module 82 includes the location of two proximal touches 202 based on effected rows and columns. The processing module 42 processes the touch data to determine the x-y coordinates of the touches on the display 80 or 90 and generates the capacitive image, which includes the touches.

Figure 27:
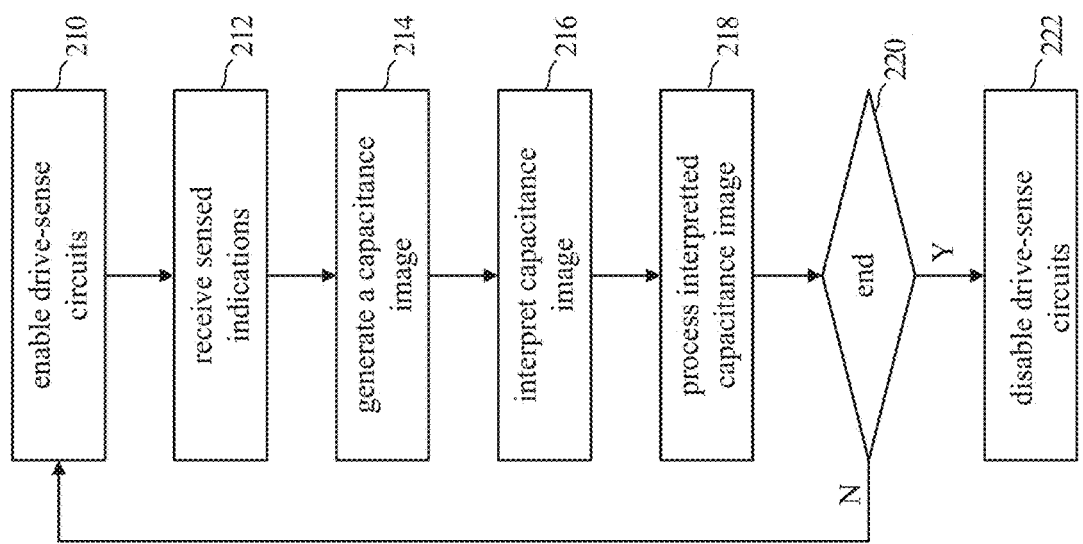
FIG. 27 is a logic diagram of an embodiment of a method for generating a capacitive image of a flexible touch screen display.

FIG. 27 is a logic diagram of an embodiment of a method for generating a capacitive image of a touch screen display that is executed by the processing module 42 and/or 82. The method begins at step 210 where the processing module enables (for continuous or periodic operation) the drive-sense circuits to provide sensor signals to the electrodes. For example, the processing module 42 and/or 82 provides an enabling control signal to the drive-sense circuits. The control signal allows power to be supplied to the drive-sense circuits, to turn-on one or more of the components of the drive-sense circuits, and/or close a switch coupling the drive-sense circuits to their respective electrodes.

The method continues at step 212 where the processing module receives, from the drive-sense circuits, sensed indications regarding (self and/or mutual) capacitance of the electrodes. The method continues at step 214 where the processing module generates a capacitive image of the display based on the sensed indications. As part of step 214, the processing module stores the capacitive image in memory. The method continues at step 216 where the processing module interprets the capacitive image to identify one or more proximal touches (e.g., actual physical contact or near physical contact) of the touch screen display.

The method continues at step 218 where the processing module processes the interpreted capacitance image to determine an appropriate action. For example, if the touch(es) corresponds to a particular part of the screen, the appropriate action is a select operation. As another example, if the touches are in a sequence, then the appropriate action is to interpret the gesture and then determine the particular action.

The method continues at step 220 where the processing module determines whether to end the capacitance image generation and interpretation. If so, the method continues to step 222 where the processing module disables the drive-sense circuits. If the capacitance image generation and interpretation is to continue, the method reverts to step 210.

Figure 28:
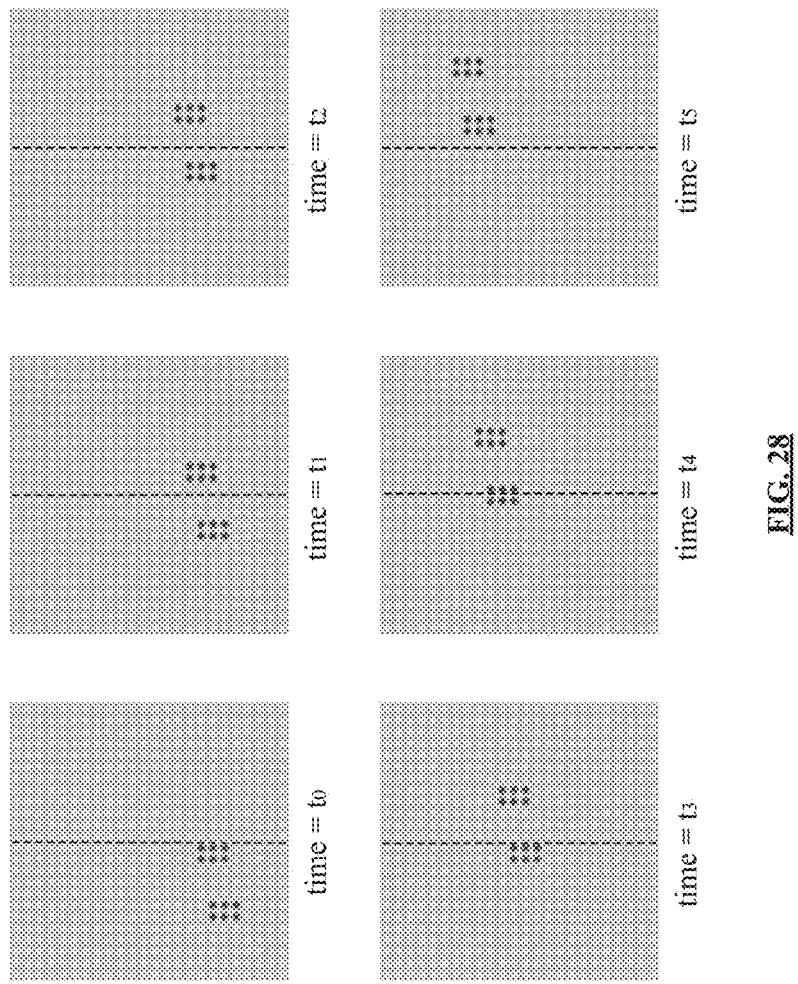
FIG. 28 is a schematic block diagram of an example of generating capacitive images over a time period.

FIG. 28 is a schematic block diagram of an example of generating capacitive images over a time period. In this example, two touches are detected at time t0 and move across and upwards through the display over times t1 through t5. The movement corresponds to a gesture or action. For instance, the action is dragging a window across and upwards through the display. In this example, the touches begin in one display area of a flexible screen, cross a folding axis, and continue in a second display area of the flexible screen.

FIG. 29A is a schematic block diagram of an embodiment of a rollable touch screen display. In the illustrated embodiment, the rollable touch screen display 240 includes a flexible display 242 having integrated electrodes 85, a flexible frame 244, touch screen circuitry 246 (including drive-sense circuits and one or more processing modules), and a base 247. The (flexible) rollable touch screen display 240 is operable to render frames of data into visible images, and may be a stand-alone display or a display incorporated in a device such as a cellular phone, a laptop, a tablet, an e-reader, a personal computer (PC), a workstation, a video game device, a television, etc.

In the illustrated embodiment, the display 242 is logically and/or electrically partitioned into a first touch area 1 and a second touch area 2. Each of the touch area 1 and the touch area 2 are configured to display images (e.g., respective portions of an image or separate images). As described more fully with reference to FIGS. 29B-33B, a processing module(s) of the touch screen circuitry 246 is operable to selectively disable column electrodes and/or row electrodes of the display 242 (and/or other display functionality) based on a rolled state of the rollable touch screen display 240.

Although two touch areas are illustrated, in further embodiments the display 242 may be partitioned into a greater or lesser number of touch areas. For example, the display 242 may include three touch areas. In addition, one or both of touch areas 1 and 2 may be further partitioned into two or more smaller touch areas (e.g., a control touch area for receiving touches that are interpreted by touch screen circuitry 246 as control commands for the rollable touch screen display 240). In another example the display 242 provides a single and/or continuous touch area that spans the entire length and width of the display (e.g., the viewable portion of the rollable touch screen display 240).

The processing module of the touch screen circuitry 246 is operable to provide touch functionality for the rollable touch screen display 240 such as described with reference to the preceding Figures. For example, the processing module can sense, based on the sensor signals from the DSCs, an electrical characteristic (e.g., self-capacitance, mutual capacitance, change in impedance/capacitance, etc.) of at least one row electrode and at least one column electrode of the first touch area or the second touch area. Based on the electrical characteristic, the processing module can determine the location of a proximal touch to at least one of the first touch area or the second touch area.

Figure 29B:
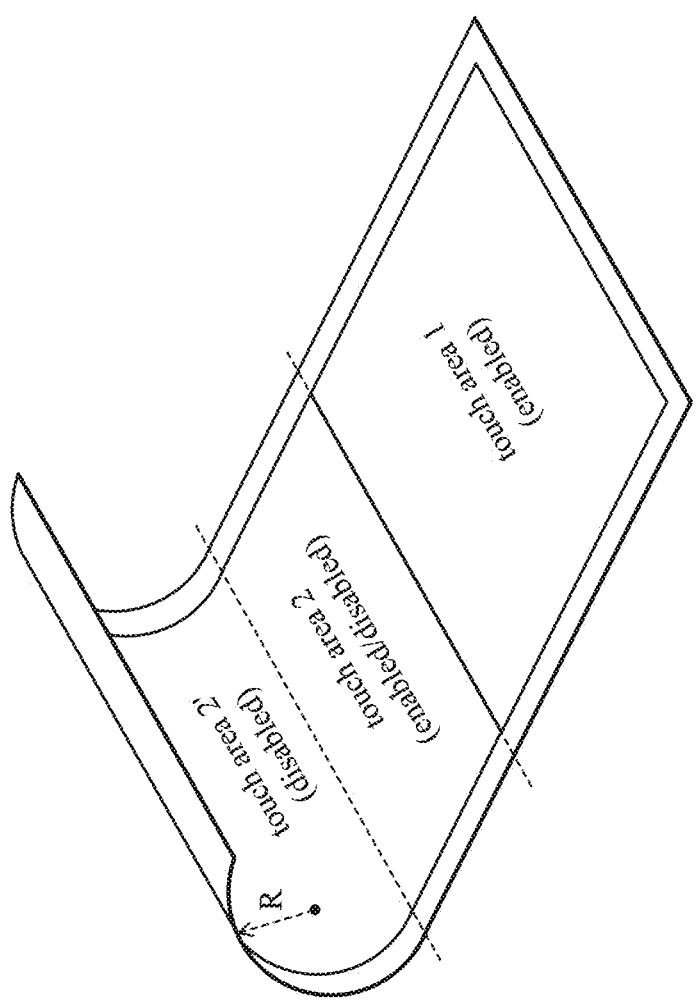
FIG. 29B is a schematic block diagram of another embodiment of a rollable touch screen display.

The processing module of the touch screen circuitry 246 is further operable to determine, based on sensor signals from the DSCs, if at least a portion of the first touch area or the second touch area of the flexible display 242 is in a rolled position or state (see, e.g., FIG. 29B). In an example, in response to determining that a portion of the first touch area is in a rolled position, the processing module generates control signals to disable a plurality of drive-sense circuits of the first touch area. In response to determining at least a portion of the second touch area is in a rolled position, the processing module generates control signals to disable a plurality of drive-sense circuits of the second touch area (e.g., all of the drive-sense circuits or only those determined to be in a rolled portion of the second touch area).

In an example, the base 247 includes a battery and/or regulated power supply. The base 247 can further include an electrical or mechanical rolling mechanism. In another example, the base includes power connections for a detachable battery. In yet another example, the rollable touch screen display 240 includes a second base or grip to assist with rolling and viewing of the display.

The flexible frame 244 at least partially encircles the display 242. In the illustrated example, the flexible frame 244 fully encircles the display 242 and the touch screen circuitry 246 can be positioned in frame to have about the same number of electrode connections on each side of it. In alternate embodiments, the flexible frame 244 encircles three sides of the display 242, two sides of the display 242, or a single side of the display 242. Such embodiments may allow, for example, multiple rollable touch screen displays to be positioned to create a larger multiple touch screen display.

In one embodiment, the rollable touch screen display 240/display 242 is a transparent display. For example, the display 242 can be transparent OLED (either active- or passive-matrix) display having only transparent components (substrate, cathode and anode) that, when turned off, are nearly as transparent as their substrate. In this example, when the display 242 is turned on, light from the organic emitters is allowed to pass through both the front and back of the display.

In the present FIG. 29A, the electrodes 85 are shown in a first arrangement (e.g., as rows) and a second arrangement (e.g., as columns). Other patterns for the electrodes may be used to detect touches to the display 242 and to determine a rolled state of rollable touch screen display 242. For example, the electrodes span only part of the way across the display and other electrodes span the remaining part of the display. As another example, the electrodes are patterned at an angle different than 90 degrees with respect to each other.

With the touch screen circuitry 246 disclosed herein, effective and efficient large touch screen displays can be practically realized. For instance, the touch screen circuitry 246 uses very low voltage signaling (e.g., 25-250 milli-volt RMS of the oscillating component of the sensor signal or power signal), which reduces power requirements and substantially reduces adverse effects of cross-coupling between the leads. For example, when the oscillating component is a sinusoidal signal at 25 milli-volt RMS and each electrode (or at least some of them) are driven by oscillating components of different frequencies, the cross-coupling is reduced and, what cross-coupled does exist, is easily filtered out. Continuing with the example, with a 25 milli-voltage signal and increased impedance of longer electrodes and tightly packed leads, the power requirement is dramatically reduced. As a specific example, for conventional touch screen circuitry operating with a power supply of 1.5 volts and the touch screen circuitry 246 operating with 25 milli-volt signaling, the power requirements are reduced by as much as 60 times.

FIG. 29B is a schematic block diagram of another embodiment of a rollable touch screen display 240, which is illustrated in a partially rolled or rolling position. As set forth above, the terms "rolling" and "rollable" refer to a state in which a flexible touch screen display is rolled or capable of being rolled. Rolling can be determined by a processing module of the display, for example, by sensing a bending of the display more than a predetermined angle over a predetermined area. A degree of folding or rolling can be determined by sensing a radius of curvature (R) at a folding area or folding/rolling axis.

Although not specifically illustrated, the rollable touch screen display 240 includes the touch screen circuitry 246 and row/column electrodes of FIG. 29A. In an example, a first plurality of column electrodes and a first plurality of row electrodes are integrated into the first touch area 1, and a second plurality of column electrodes and a second plurality of row electrodes are integrated into the second touch area 2. In this example, a first plurality of drive-sense circuits are operable, when enabled, to drive sensor signals on the first plurality of column electrodes and the first plurality of row electrodes, and a second plurality of drive-sense circuits are operable, when enabled, to drive sensor signals on the second plurality of column electrodes and the second plurality of row electrodes. In another example, a plurality of row and/or column electrodes may extend across multiple touch areas.

Similar to the example discussed with reference to FIG. 29A, a processing module of the touch screen circuitry 246 is coupled to the first and second pluralities of drive-sense circuits (DSCs). The processing module determines, based on the sensor signals (e.g., based on digital capacitance data from the DSCs), if at least a portion of the first touch area or the second touch area of the flexible display of the rollable touch screen display 240 is in a rolled position. For example, the processing module may sense a change in the impedance characteristics of one or more electrodes of the of the rollable touch screen display 242 that is indicative of a bending state, such as described with reference to FIGS. 34-49. In another example, one or more frequencies transmitted by DSCs on electrodes in a first portion of the rollable touch screen display 242 can be detected on electrodes in a second portion of the display and interpreted as a rolled position (e.g., full rolling, partial rolling, a degree of rolling, a rate of rolling, etc.). Examples of this approach are discussed more fully with reference to FIG. 32.

In response to determining that a portion of the first touch area is in a rolled position, the processing module generates control signals to disable a plurality of drive-sense circuits of the first touch area. In response to determining at least a portion of the second touch area is in a rolled position, the processing module generates control signals to disable a plurality of drive-sense circuits of the second touch area (e.g., all of the drive-sense circuits or only those determined to be in a rolled portion of the second touch area).

Using the partially rolled rollable touch screen display 240 of FIG. 29B as a specific example, touch area 1 is in an unrolled state and a portion of touch area 2 (touch area 2') is in a partially rolled state. In response to determining that touch area 2' is in a partially rolled state, a processing module of the display can be configured to take different actions. In an example, the processing module disables the column electrodes and/or row electrodes disposed in touch area 2'. In another example, the processing module disables all of the column electrodes and/or row electrodes disposed in touch area 2 (e.g., row electrodes that only service touch area 2) while the column/row electrodes disposed in touch area 1 remain enabled.

In further examples, the processing module is configured to disable touch sense functionality (e.g., DSCs) in a touch area of a rollable touch screen display upon detecting (1) any rolling of the touch area, (2) rolling of a predetermined percentage of the touch area, or (3) rolling of the touch area to a degree that the touch area is effectively unviewable to a user (e.g., by determining a rolling radius of curvature R that exceeds a predetermined threshold). In these examples, the touch area can be one of a plurality of touch areas of the rollable display, a portion of a touch area, or the entire touch screen area of rollable display. In addition to disabling touch screen functionality based on a rolled state, the display of video content can be similarly disabled in the affected portions of a rollable (or foldable) touch screen display. For example, the size of an image or video displayed on the rollable touch screen display can be scaled to fit in an unrolled portion of the display.

In yet another example, a processing module of the rollable touch screen display is configured to periodically sense an unrolling of the display or portions of the display. In this example, the processing module can be configured to enable touch sense functionality (or other functionality) of a recently unrolled portion of the display. Enabling of touch sense functionality can be performed in an opposite manner to the disabling actions described above.

FIG. 30 is a schematic block diagram that further illustrates an embodiment of a rollable touch screen display 240 having a flexible frame 244. As shown, the touch screen circuit 246 is coupled to the electrodes 85 via a plurality of connectors 248. The electrodes are arranged in rows and columns, are constructive of a transparent conductive material (e.g., ITO) and distributed throughout the display 242. The larger the touch screen display, the more electrodes are needed. For example, a flexible touch screen display includes hundreds to hundreds of thousands, or more, of electrodes.

The connections 248 and the touch screen circuitry 246 are physically located with the flexible frame 244. The more tightly packed the connectors, the thinner the bezel of the flexible frame can be. A drive-sense circuit of the touch screen circuitry 246 is coupled to an individual electrode 85. Thus, if there are 10,000 electrodes, there are 10,000 drive-sense circuits and 10,000 connections. In an embodiment, the connections 248 include traces on a multi-layer printed circuit board, where the traces are spaced at a few microns or less. As another example, the spacing between the connections is a minimum spacing needed to ensure that the insulation between the connections does not break down. In another example, the connections 248 include wires and connectors, which may be achieved by welds, crimping, soldering, male-female connectors, etc. Note that the touch screen circuitry 246 may be implemented in multiple integrated circuits that are distributed about the flexible frame 244. as discussed, the drive-sense circuits of the touch screen circuitry 246 are operable to provide and monitor sensor signals of the electrodes 85 to detect impedance and impedance changes of the electrodes 85.

Figure 31:
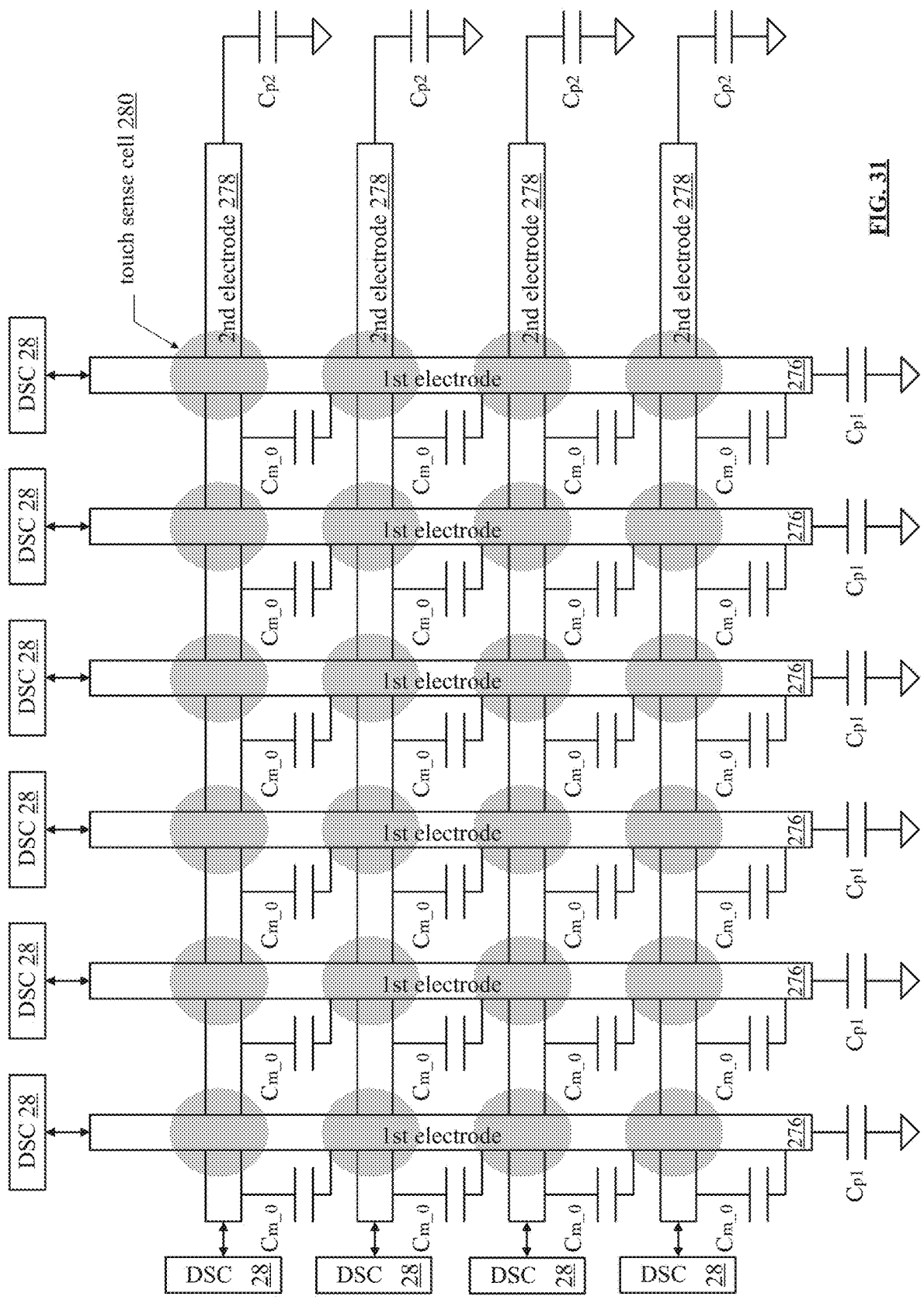
FIG. 31 is a schematic block diagram of an embodiment of a plurality of electrodes creating a plurality of touch sense cells.

FIG. 31 is a schematic block diagram of an embodiment of a plurality of electrodes creating a plurality of touch sense cells 280 within a foldable/rollable touch screen display. In this embodiment, a few second electrodes 278 are perpendicular and on a different layer of the display than a few of the first electrodes 276. For each crossing of a first electrode and a second electrode, a touch sense cell 280 is created. At each touch sense cell 280, a mutual capacitance ($C_{m\_0}$) is created between the crossing electrodes. Each electrode also includes a self-capacitance ($C_p$), which is shown as a single parasitic capacitance, but, in some instances, is a distributed R-C circuit.

A drive-sense circuit (DSC) is coupled to a corresponding one of the electrodes. The drive-sense circuits (DSC) provides sensor signals to the electrodes and determines the loading on the sensors signals of the electrodes. When no touch is present, each touch cell 280 will have a similar mutual capacitance and each electrode of a similar length will have a similar self-capacitance. When a touch is applied on or near a touch sense cell 280, the mutual capacitance of the cell will decrease (creating an increased impedance) and the self-capacitances of the electrodes creating the touch sense cell will increase (creating a decreased impedance). Between these impedance changes, the processing module can detect the location of a touch, or touches.

In another example, some of the first electrodes 276 and second electrodes 278 are incorporated within a control panel area (not separately illustrated) while other electrodes are in a display data area. The processing module, knowing which electrodes and hence which touch sense cells are part of the control panel area, can readily distinguish between touches in the control panel area and touches in the display data area.

FIG. 32 is a schematic block diagram of an example of frequency dividing for various reference signals for drive-sense circuits of a flexible touch screen display. As mentioned above, to reduce the adverse effects of cross-coupling, the drive-sense circuits use a common frequency component for self-capacitance measurements and use different frequencies components for mutual capacitance measurements. In this example, there are nine equally-spaced different frequencies f10-f18 used for mutual capacitance measurements. The frequency spacing is dependent in part on the filtering of the sensed signals. For example, the frequency spacing is in the range of 10 Hz to 10s of thousands of Hz. Note that the spacing between the frequencies does not need to be equal or that every frequency needs to be used. Further note that, for very large touch screen displays having tens to hundreds of thousands of electrodes, a frequency reuse pattern may be utilized.

In this example, a few row electrodes and a few column electrodes are shown. Each electrode is coupled to a drive-sense circuit (DSC) 28. The crossover of a row electrode with a column electrode creates a sense cell. In this example, there are nine row electrodes and nine column electrodes, creating 81 sense cells. To allow for simultaneous self-capacitance sensing and mutual capacitance sensing of the electrodes, the drive-sense circuits use different frequencies to simulate the electrodes.

For self-capacitance, all of the drive-sense circuits use the f1 frequency component. This creates near zero potential difference between the electrodes, thereby eliminating cross coupling between the electrodes. In this manner, the self-capacitance measurements made by the drive-sense circuits are effectively shielded (i.e., low noise, yielding a high signal to noise ratio).

For mutual capacitance, the column electrodes also transmit a frequency component at another frequency. For example, the first column DSC 28 transmits a signal with frequency components at f1 and at f10; the second column DSC 28 transmits a signal with frequency components at f1 and at f11; the third column DSC 28 transmits a signal with frequency components at f1 and at f12; and so on. The additional frequency components (f10-f18) allow the row DSCs 28 to determine mutual capacitance at the sense cells. With concurrent sensing of self-capacitance and mutual capacitance, multiple touches are detectable with a high degree of accuracy.

In the illustrated example, a flexible touch screen display such as the rollable touch screen display 240 of FIGS. 29A and 29B or the folding touch screens of FIGS. 1A-1C is partitioned into touch area 1 and touch area 2. Frequencies f10-f13 are utilized by the column electrodes in touch area 1 and frequencies f14-f18 are utilized by the column electrodes in touch area 2.

In addition to determining mutual capacitance between electrodes, various of the frequencies f10-f18 can be further utilized to detect a folded state or a rolled state of a flexible touch screen display (such as illustrated in FIG. 29B). For example, when the display is in a folded state or a partially rolled state, various of the column electrodes (or touch sensors) in a first portion of the display are in close physical proximity to various of the column electrodes in a second portion of the display. In such a state, and with appropriate bandpass filtering, one or more frequencies transmitted on the column electrodes in the first portion of the display can be detected by column electrodes in the second portion of the display. The touch screen processing circuitry of the display can interpret the presence of these frequencies as a folding or rolling event. For example, in a folding touch screen display the presence of a frequency transmitted by a column electrode on one side of the display is sensed by a column electrode on a far side of the display, the touch screen processing circuitry interprets this as the display being in a fully (or near fully) folded state. In response, the touch screen processing circuitry can disable all or a portion of the touch sensors (and/or other functionality) of the display.

In a more specific example in which the frequency dividing arrangement of FIG. 32 is utilized in the rollable touch screen display 240 of FIGS. 29A and 29B, when the display is in an unrolled (or unfolded) state, the frequencies f14-f18 of touch area 2 would typically not be detectable by the column electrodes of touch area 1. When the display is in a rolled or partially rolled state, however, one or more of frequencies f14-f18 can be sensed by a column electrode(s) of touch area 1. In an example, a degree of rolling can be determined based on sensing of a particular frequency utilized in one portion of the display by a particular column electrode in another portion of the display.

In order to operate in this manner, the bandpass filtering of sensor signals on a first column electrode or group of column electrodes utilized to detect a rolling or folding event can be configured to detect one or more frequencies transmitted on one or more column electrodes of a second group of column electrodes. This is analogous to the example of FIG. 24, with the pen frequency replaced by one or more frequencies of a second group of frequencies. In a further example, a dedicated frequency used to detect folding or rolling events is transmitted on one or more electrodes of the display.

Note that there are a variety of combinations for sensing and filtering based on FIG. 32. For example, only self-capacitance of the electrodes could be used to detect location of touches. As another example, the column DCSs could sense and process the mutual capacitance. As another example, the unshielded self-capacitance is processed to determine levels of interference between the electrodes (e.g., to detect a folded state or a rolled state of a flexible touch screen display).

In addition, the row and column DSCs can be configured to simultaneously transmit their associated frequencies. In another example, the frequencies used to determine mutual capacitance can be transmitted individually or in groups (e.g., for a touch area) at different times, allowing for reuse of frequencies. For example, frequencies f10-f13 can be transmitted at time 1 for touch area 1, and frequencies f10-f14 (in lieu of f14-f18) can be associated with touch area 2 and transmitted at time 2.

Figures 33A, 33B:
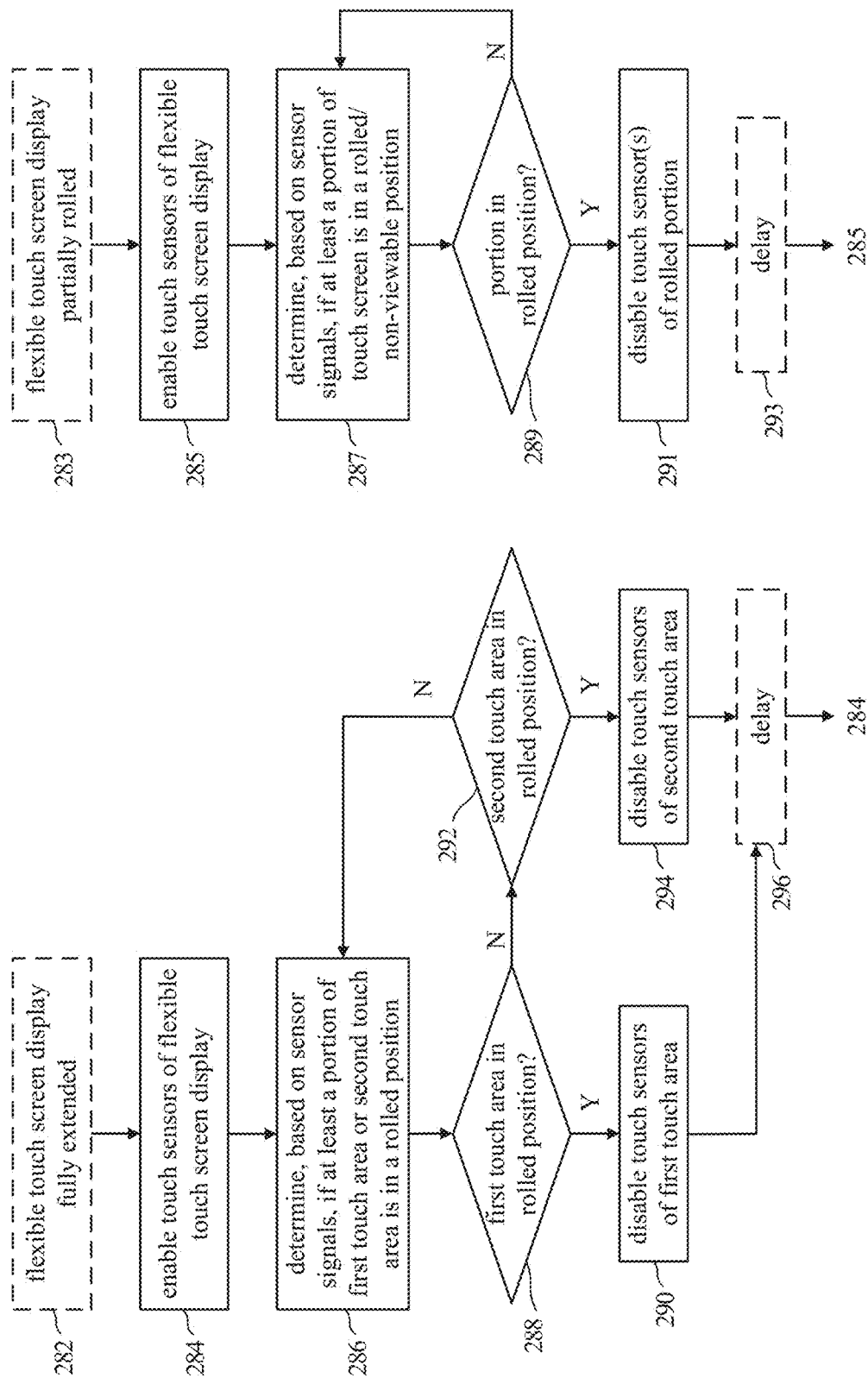
FIG. 33A is a logic diagram of an embodiment of a method for disabling touch areas in a rollable/flexible touch screen display.
FIG. 33B is a logic diagram of an embodiment of a method for enabling and disabling portions of a rollable/flexible touch screen display have a continuous touch area.

FIG. 33A is a logic diagram of an embodiment of a method for disabling touch areas in a rollable/flexible touch screen display having a first touch area and a second touch area. The method is performed by one or more processing modules of the touch screen display ("processing module"), such as the processing modules described with reference to FIGS. 2-4B. The method begins at step 282 with the flexible touch screen display in a fully extended position. At step 284, the processing module enables touch sensors of the flexible touch screen display. For example, the processing module enables all of the touch sensors of the display when the display is powered on or exits a sleep mode.

The method continues at step 286 where the processing module determines, based on sensor signals (e.g., based on capacitance data from DSCs) if at least a portion of the first touch area or the second touch area is in a rolled position. Determining a rolled position can be based on changes in the impedance characteristics of one or more electrodes of the flexible touch screen display that are indicative of a bending state, such as described with reference to FIGS. 34-49. In another example, frequency components of sensor signals can be utilized to detect a rolling/folding state, such as described with reference to FIG. 32.

If at least a portion of the first touch area is determined to be in a rolled position (step 288), the method continues at step 290 where the processing module disables some or all of the touch sensors of the first touch area. For example, the processing module disables drive-sense circuits (DSCs) coupled to the column electrodes of the rolled portion of the first touch area.

If at least a portion of the second touch area is determined to be in a rolled position (step 292), the method continues at step 294 where the processing module disables some or all of the touch sensors of the first touch area. For example, the processing module disables DSCs coupled to the column and row electrodes of the second touch area.

If neither the first touch area nor the second touch area is in a rolled position, the processing module continues to monitor the sensor signals at step 286 to identify a rolling event. Following disabling of touch sensors at either of steps 290 or 294, the method continues at step 296 where the processing module (optionally) implements a delay before enabling one or more of the sensors again at step 284 such that an unrolling event can be detected. In an example, when touch sensors are re-enabled at step 284 to detect an unrolling event, touch sensing functionality for the rolled portion(s) of the first touch area or the second touch area is disabled until the processing module determines an unrolling event.

FIG. 33B is a logic diagram of an embodiment of a method for enabling and disabling portions of a rollable/flexible touch screen display have a continuous touch area. The method is performed by one or more processing modules of the touch screen display ("processing module"), such as the processing modules described with reference to FIGS. 2-4B. The method begins at step 283 with the flexible touch screen display in a fully extended position. At step 285, the processing module enables touch sensors of the flexible touch screen display. For example, the processing module enables all of the touch sensors of the display when the display is powered on or exits a sleep mode.

The method continues at step 287 where the processing module determines, based on sensor signals (e.g., based on capacitance data from DSCs) if at least a portion of the continuous touch area is in a rolled position. Determining a rolled position can be based on changes in the impedance characteristics of one or more electrodes of the flexible touch screen display that are indicative of a bending state, such as described with reference to FIGS. 34-49. In another example, frequency components of sensor signals can be utilized to detect a rolling/folding state, such as described with reference to FIG. 32.

If at least a portion of the continuous touch area is determined to be in a rolled position (step 289), the method continues at step 291 where the processing module disables some or all of the touch sensors of the continuous area. For example, the processing module disables DSCs coupled to the column and/or row electrodes of the rolled portion of the continuous touch area.

If the continuous touch area is not in a rolled position, the processing module continues to monitor the sensor signals at step 287 to identify a rolling event. Following disabling of touch sensors at step 291, the method continues at step 293 where the processing module (optionally) implements a delay before enabling one or more of the sensors again at step 285 such that an unrolling event can be detected. In an example, when touch sensors are re-enabled at step 285 to detect an unrolling event, touch sensing functionality for the rolled portion(s) of the continuous touch area is disabled until the processing module determines an unrolling event.

FIG. 34 is a diagram illustrating an equivalent circuit of an electrode in an unfolded position in accordance with embodiments of the present disclosure. The electrode 300 may be modeled in various ways. At lower frequencies, the electrode 300 may be modeled as a single conductor with capacitance to ground plane 302. However, at higher frequencies, the electrode 300 may be modeled as a transmission line with distributed series resistance, series inductance, and shunt capacitance to the ground plane 302, as shown in FIG. 34, with a signal coupled to the electrode 300 by the DSC that propagates along the electrode 300. While the equivalent circuit of FIG. 34 is suitable for most modeling purposes, at lower frequencies, the series resistance and series inductance may be ignored.

FIG. 35 is a diagram illustrating the equivalent circuit of FIG. 34 with the electrode in a folded position in accordance with embodiments of the present disclosure. As shown, in the folded position, a capacitance $C_{fold}$ may be modeled as coupling ends of the electrode 300.

Figure 36:
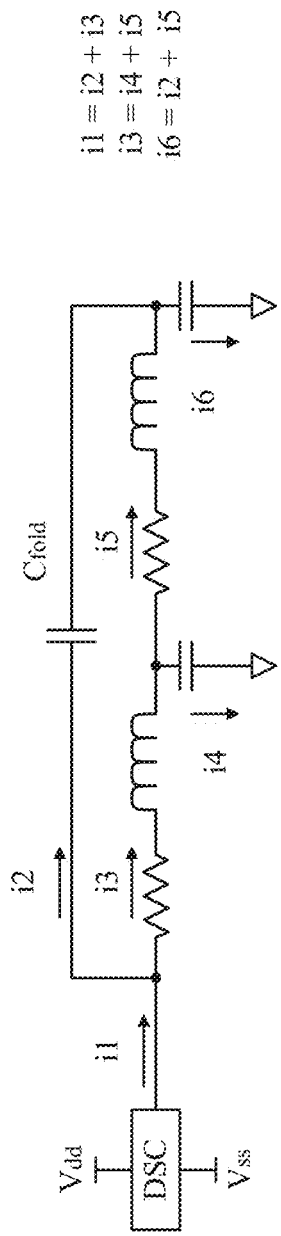
FIG. 36 is a diagram illustrating the equivalent circuit of FIG. 35 in accordance with embodiments of the present disclosure.

FIG. 36 is a diagram illustrating the equivalent circuit of FIG. 35 in accordance with embodiments of the present disclosure. As shown, current i1 is sourced by DSC and divides between Cfold and the transmission line portion of the equivalent circuit. Thus i1=i2+i3. The transmission line portion of the equivalent circuit is modeled as two RLC circuits. With this equivalent circuit, i4 shunts to the ground plane via a first capacitor such that i3=i4+i5. Further, with this equivalent circuit, i6=i2+i5. The equivalent circuit of FIG. 36 is useful at higher frequency signals produced by the DSC, e.g., greater than 1 MHz. In such case, the equivalent circuit is useful to detect folds of the folding display and/or to detect rolling of a rollable display when a high enough frequency signal is used.

Figure 37:
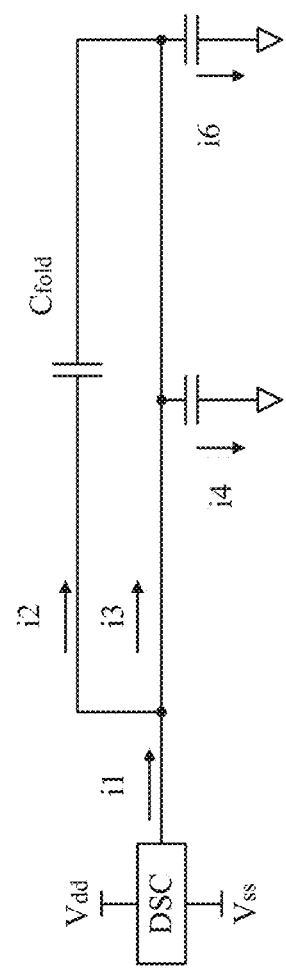
FIG. 37 is a diagram illustrating the equivalent circuit of FIG. 36 with distributed inductance and resistance ignored in accordance with embodiments of the present disclosure.

FIG. 37 is a diagram illustrating the equivalent circuit of FIG. 36 with distributed inductance and resistance ignored in accordance with embodiments of the present disclosure. As shown, i1=i2+i3. Further, i6=i2+i3−i4. In such case, as will be described further herein, the equivalent circuit of FIG. 37 may be used at lower signal frequencies to detect folding of the flexible display or to detect rolling of a flexible display.

Figure 38:
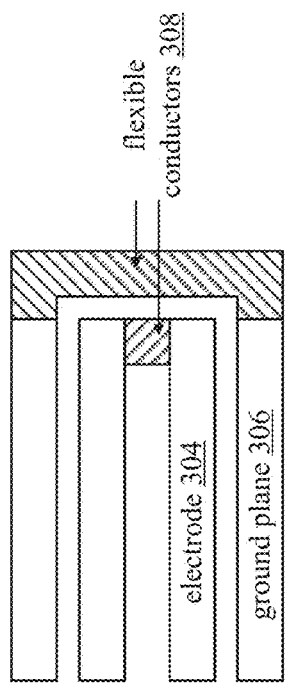
FIG. 38 is a diagram illustrating a portion of an electrode of a flexible display with multiple touch areas in a folded position in accordance with embodiments of the present disclosure.

FIG. 38 is a diagram illustrating a portion of an electrode of a flexible display with multiple touch areas in a folded position in accordance with embodiments of the present disclosure. As shown, the electrode 304 and ground plane 306 have corresponding flexible conductors 308 that may be folded without breaking. These flexible conductors 308 are used with the flexible displays previously illustrated and described here to allow for displays to be folded and/or rolled.

Figure 39A:
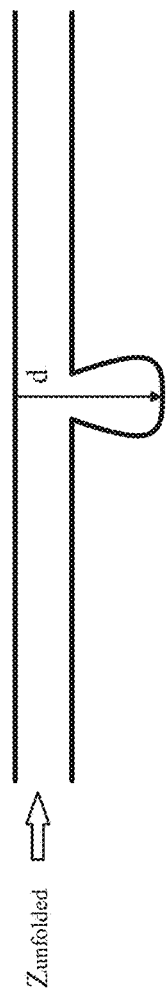
FIG. 39A is a diagram illustrating a simplified view of the electrode of the flexible display of FIG. 38 in an unfolded position in accordance with embodiments of the present disclosure.

FIG. 39A is a diagram illustrating a simplified view of the electrode of the flexible display of FIG. 38 in an unfolded position in accordance with embodiments of the present disclosure. With the configuration illustrated, a distance d exists between the electrode 304 and the ground plane 306 at the flexible conductors 308 at the folding axis.

Figure 39B:
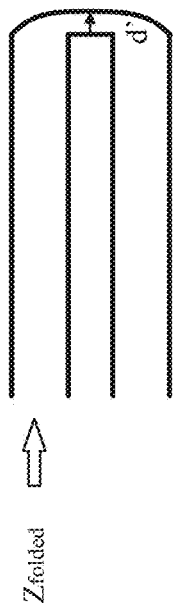
FIG. 39B is a diagram illustrating a simplified view of the electrode of the flexible display of FIG. 38 in a folded position in accordance with embodiments of the present disclosure.

FIG. 39B is a diagram illustrating a simplified view of the electrode of the flexible display of FIG. 38 in a folded position in accordance with embodiments of the present disclosure. With the configuration illustrated, a distance d' exists between the electrode 304 and the ground plane 306 at the flexible conductors 308 along the folding axis. Referring to both FIGS. 39A and 39B, as the flexible display folds and the distance between electrode 304 and ground plane 306 gets smaller, the self-capacitance of the electrode 304 to the ground plane 306 increases (impedance increases) and a measure of the self-capacitance and/or a change in the self-capacitance may be used to determine folding, e.g., angle of fold, amount of fold, etc. between display areas of the folding display.

Figure 40:
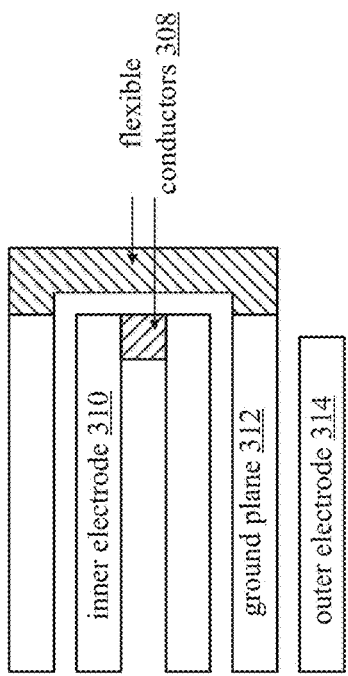
FIG. 40 is a diagram illustrating a portion of an electrode of a flexible display with multiple touch areas in a folded position in accordance with embodiments of the present disclosure.
Figure 41:
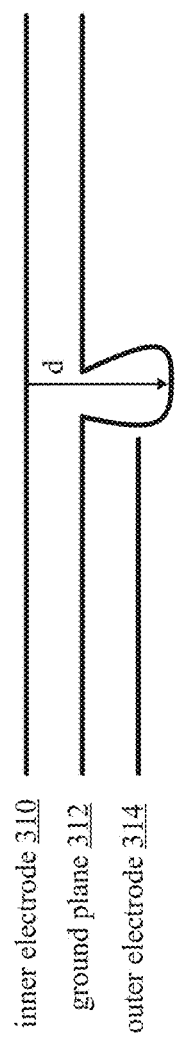
FIG. 41 is a diagram illustrating a simplified view of the electrode of the flexible display of FIG. 40 in an unfolded position in accordance with embodiments of the present disclosure.
Figure 42:
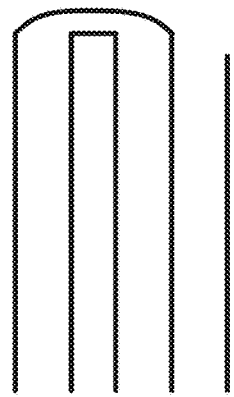
FIG. 42 is a diagram illustrating a simplified view of the electrode of the flexible display of FIG. 40 in a folded position in accordance with embodiments of the present disclosure.

FIG. 40 is a diagram illustrating a portion of an electrode of a flexible display with multiple touch areas in a folded position in accordance with embodiments of the present disclosure. FIG. 41 is a diagram illustrating a simplified view of the electrode of the flexible display of FIG. 40 in an unfolded position in accordance with embodiments of the present disclosure. FIG. 42 is a diagram illustrating a simplified view of the electrode of the flexible display of FIG. 40 in a folded position in accordance with embodiments of the present disclosure.

Referring to all of FIGS. 40, 41, and 42, an outer ground plane 314 resides opposite the ground plane 312 from the inner electrode 310. Mutual capacitive coupling between the outer electrode 314 and the inner electrode 310 may be measured by one or more DSCs. Generally, the outer electrode 314 will capacitively couple to the inner electrode 312 to a greater extent when display areas (adjacent or non-adjacent) of the flexible display are folded with respect to one another than when the flexible display is unfolded. The mutual capacitance between the outer electrode 314 and the inner electrode 310 may be used to determine to what extent the corresponding display areas of the flexible display are folded. Further, due to a change in the dimension d, as will be described further with reference to FIGS. 46A-46C, baseline mutual capacitance levels may be determined that indicate when the display areas are folded (or rolled) with respect to one another, partially opened, and/or fully opened.

Figure 43A:
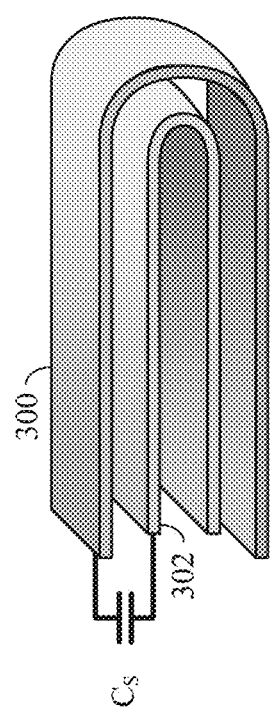
FIG. 43A is a diagram illustrating an electrode having a flexible portion in a folded position in in accordance with embodiments of the present disclosure.

FIG. 43A is a diagram illustrating an electrode having a flexible portion in a folded position in in accordance with embodiments of the present disclosure. The folded electrode 300 (spanning two display areas) will have twice the self-capacitance to the ground plane 302 per unit area. However, the self-capacitance of the electrode 300 to the ground plane 302 may be the same or closely the same when the electrode 300 is in a folded state versus an unfolded state. In some constructs the self-impedance of the electrode 300 with respect to the ground plane 302 may be different in the folded versus the unfolded state at higher frequencies due to inductive coupling of differing portions of the electrode 300 onto itself, e.g., due to generated magnetic fields interacting with one another with the electrode 300 in a folded position.

Figure 43B:
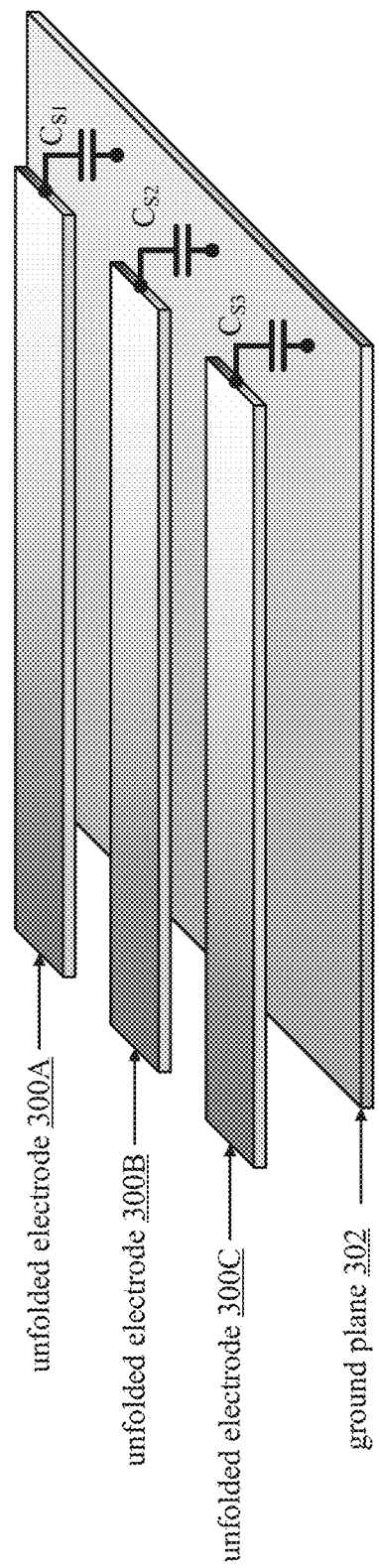
FIG. 43B is a diagram illustrating multiple electrodes with flexible portions in an unfolded position in accordance with embodiments of the present disclosure.

FIG. 43B is a diagram illustrating multiple electrodes with flexible portions in an unfolded position in accordance with embodiments of the present disclosure. Each of the unfolded electrodes 300A, 300B, and 300C has a corresponding self-capacitance to the ground plane 302, Cs1, Cs2, and Cs3, respectively. Changes in each of these self-capacitances may be used to indicate folding of a flexible touch display.

Figure 44A:
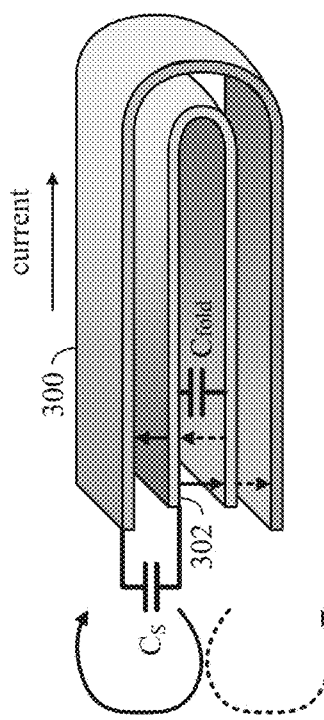
FIG. 44A is a diagram illustrating the electrode of FIG. 43A with self-capacitances modeled in accordance with embodiments of the present disclosure.
Figure 44B:
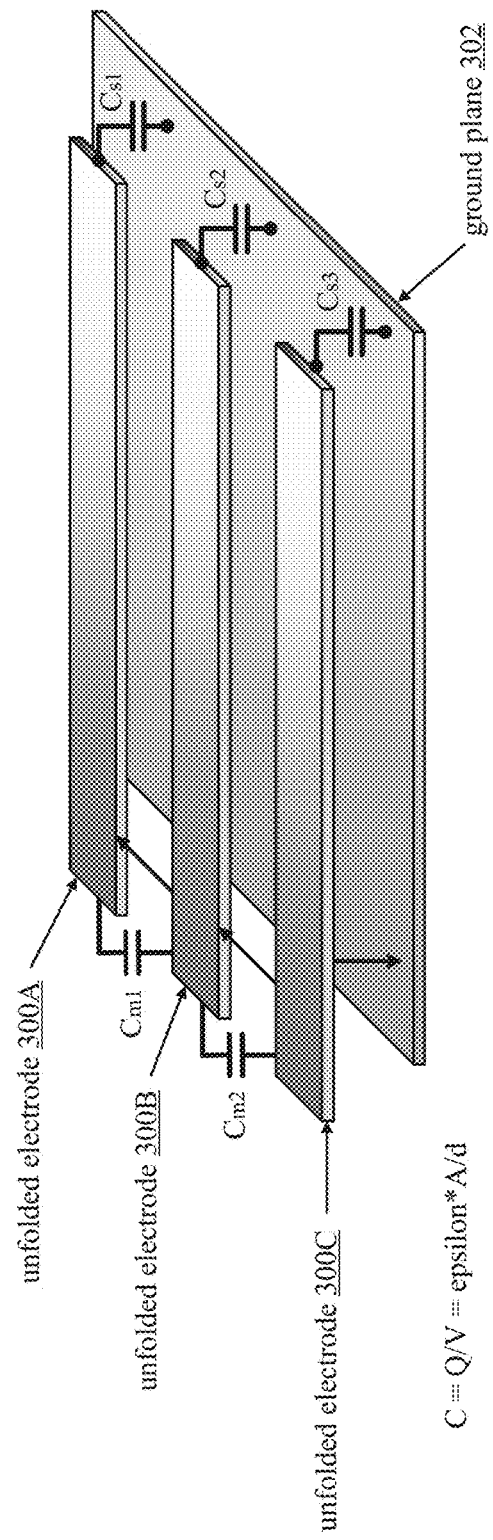
FIG. 44B is a diagram illustrating the electrodes of FIG. 43B with self-capacitances and mutual capacitances modeled in accordance with embodiments of the present disclosure.

FIG. 44A is a diagram illustrating the electrode of FIG. 43A with self-capacitances modeled in accordance with embodiments of the present disclosure. FIG. 44B is a diagram illustrating the electrodes of FIG. 43B with self-capacitances and mutual capacitances modeled in accordance with embodiments of the present disclosure. Folding of electrode 300 (or electrodes 300A, 300B, and 300C) reduces the e-field outside of the ground plane 302 and increases it within the ground plane 302, resulting in an increase in self-capacitance with mutual capacitance staying the same. Further, current flow in the electrode 300 and ground plane 302 at higher frequencies induces a magnetic field, causing a change in self-impedance in the folded state versus the unfolded state. These changes in self-impedance of the electrode 300 may be used to determine whether the electrode 300 is folded, unfolded or there in between. Mutual capacitance between electrodes 300A, 300B, and 300C, depending upon the configuration and the frequency of a signal used, may also change with a change in folding due and such changes may be used to detect folding.

Figure 45A:
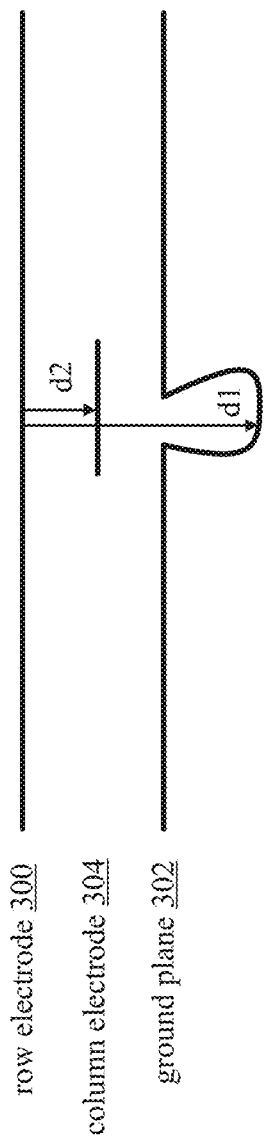
FIG. 45A is a diagram illustrating a simplified view of a row electrode, a column electrode, and a ground plane in an unfolded position in accordance with embodiments of the present disclosure.
Figure 45B:
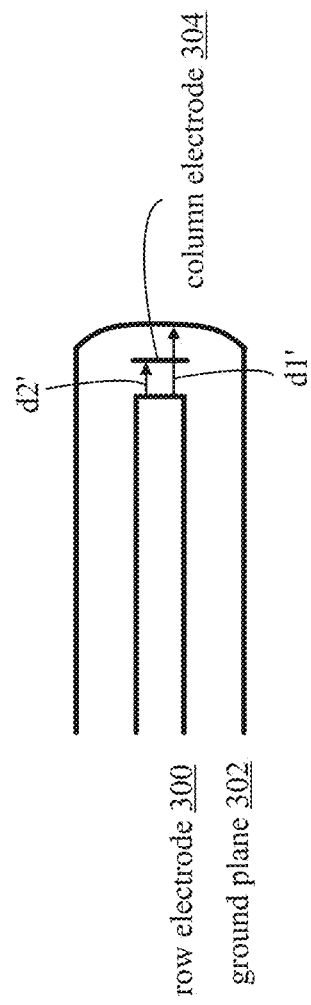
FIG. 45B is a diagram illustrating a simplified view of the row electrode, the column electrode, and the ground plane of FIG. 45A in a folded position in accordance with embodiments of the present disclosure.

FIG. 45A is a diagram illustrating a simplified view of a row electrode, a column electrode, and a ground plane in an unfolded position in accordance with embodiments of the present disclosure. FIG. 45B is a diagram illustrating a simplified view of the row electrode, the column electrode, and the ground plane of FIG. 45A in a folded position in accordance with embodiments of the present disclosure. The row electrode 300 extends across multiple touch areas as shown in FIGS. 38 and 40 and folds as touch areas change their positions with respect to one another (folding along a fold axis). The column electrode 304 is along a fold axis and does not fold as the touch areas fold with respect to one another. As shown, the row electrode 300 and the ground plane 302 include flexible conductors 308 that alter in shape when the displays move from an unfolded state to a folded state and back.

In an unfolded state, the distance between row electrode 300 and column electrode 304 is d2 and in a folded state the distance between row electrode 300 and column electrode 304 is d2', which is smaller than d2. Thus, with this change in distance between row electrode 300 and column electrode 304 in a folded versus an unfolded state (and in various fold angles), the mutual capacitance between the row electrode and the column electrode differs and may be used to indicate fold angle/amount of folding of differing touch display areas.

FIG. 46A is a graph illustrating touch sensing frequencies and fold/roll sensing frequencies in accordance with embodiments of the present disclosure. As shown touch sensing frequencies produced by DSCs reside within a first frequency band while fold/roll sensing frequencies produced by DSCs reside in a second frequency band that is greater (higher in frequency) than the first frequency band. As was previously described herein, electrodes have differing self and mutual impedances when driven in differing frequency ranges, e.g., higher inductive characteristics of the electrodes are more prevalent at higher frequencies than at lower frequencies. Because of this, higher frequencies may be employed to detect folds/rolls of flexible displays while lower frequencies may be employed to detect touches in touch areas of the flexible displays without interference between the touch detecting signals and the fold detecting signals.

FIG. 46B is a graph illustrating an example of electrode self and/or mutual impedance versus fold/roll position in accordance with embodiments of the present disclosure. As shown, the self or mutual impedance of an electrode may change with a relative folding or rolling of the flexible display. This concept applies to some or all constructs of flexible displays described herein. In such case, with some embodiments, a highest self or mutual impedance of an electrode may be observed when the flexible display (differing touch areas) is in an unfolded/unrolled state. In such case, the lowest self or mutual impedance of the electrode may be observed when the flexible display (differing touch areas) is in a folded/rolled state. Differing self or mutual impedances may correspond to selected thresholds, e.g., unfolded/unrolled threshold and folded/rolled threshold. These thresholds may be employed to determine when the flexible display is moving between unfolded/unrolled and folded/rolled states, or vice versa.

FIG. 46C is a graph illustrating another example of electrode self and/or mutual impedance versus fold/roll position in accordance with embodiments of the present disclosure. As shown, the self or mutual impedance of an electrode may change with a relative folding or rolling of the flexible display. This concept applies to some or all constructs of flexible displays described herein. In such case, with some embodiments, a lowest self or mutual impedance of an electrode may be observed when the flexible display (differing touch areas) is in an unfolded/unrolled state. In such case, the highest self or mutual impedance of the electrode may be observed when the flexible display (differing touch areas) is in a folded/rolled state. Differing self or mutual impedances may correspond to selected thresholds, e.g., unfolded/unrolled threshold and folded/rolled threshold. These thresholds may be employed to determine when the flexible display is moving between unfolded/unrolled and folded/rolled states, or vice versa.

Figure 47:
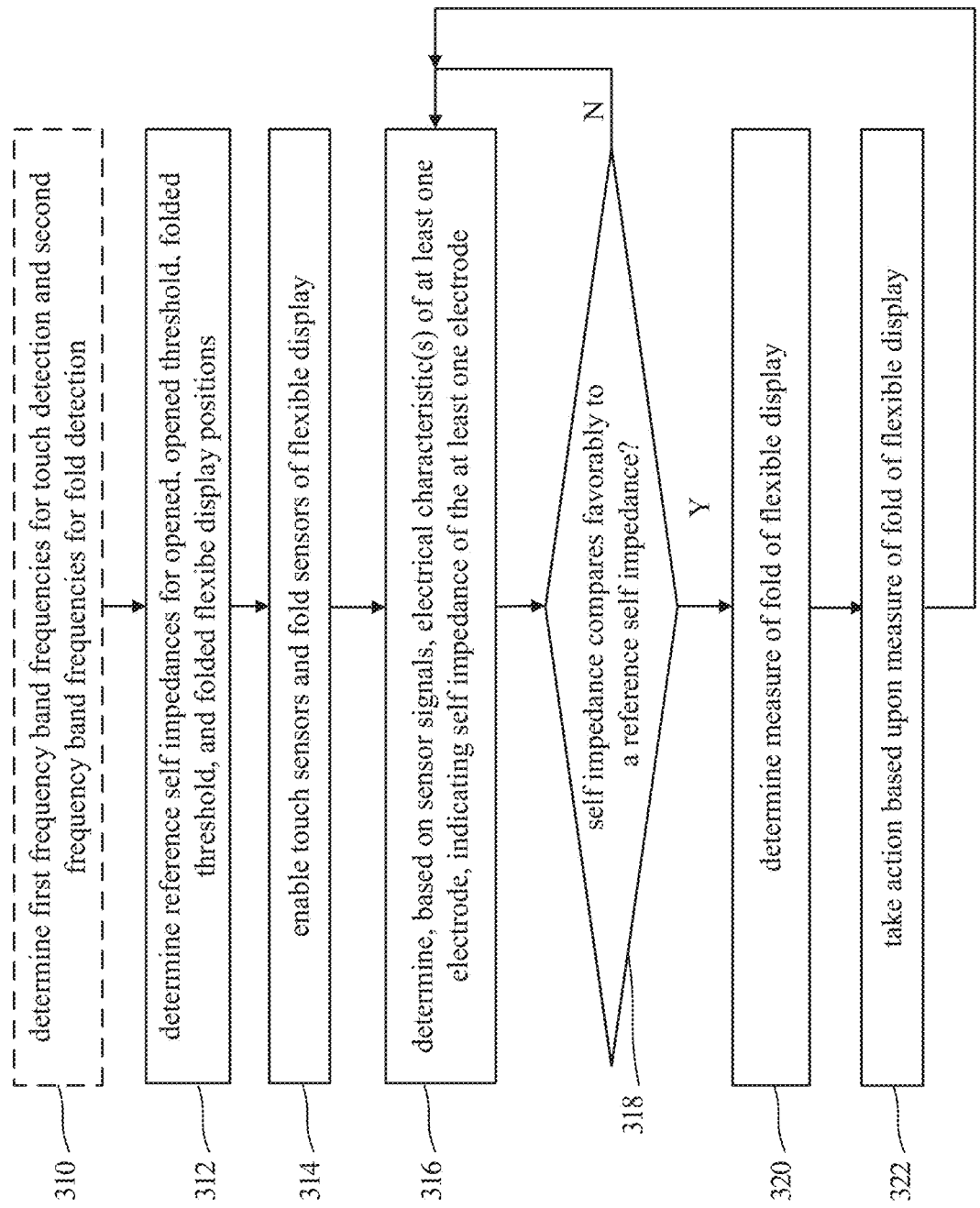
FIG. 47 is a flow chart illustrating operations for determining folding (or rolling) of a flexible display based upon self-impedance of electrode(s) in accordance with embodiments of the present disclosure.

FIG. 47 is a flow chart illustrating operations for determining folding (or rolling) of a flexible display based upon self-impedance of electrode(s) in accordance with embodiments of the present disclosure. Operation commences with optionally determining first frequency band frequencies for touch detection and second frequency band frequencies for fold/roll detection (step 310). Operation continues with determining reference self-impedances (self-capacitance and/or self-inductance) of operated electrodes for opened, opened threshold, folded threshold, and folded flexible display positions (step 312). These values may be determined from modeled data for the construct of the flexible display. Alternately, these values may be determined based upon initial and, optionally, periodic measures of the self-impedances of the operated electrodes. Similar values may be determined for various roll positions of a rolling flexible display. These values may be sampled over time and interpreted in conjunction with other captured data, e.g., use of the touch areas, to assist in determining when the flexible display is unfolded/unrolled or folded/rolled.

Operation continues with enabling touch sensors (DSCs) and fold sensors (DSCs) of the flexible display (step 314), which may be the same DCSs used for both touch and fold/roll detection. Then, operation continues with determining, based on the sensor signals, electrical characteristic(s) of at least one electrode, indicating self-impedance of the at least one electrode (step 316). Next, it is determined whether the self-impedance compares favorably to a reference self-impedance, e.g., corresponds to a reference self-impedance (step 318). If not, operation returns to step 316). If the comparison is favorable, operation includes determining a measure of folding/rolling of the flexible display (or portion thereof) (step 320). Operation continues with taking action based upon a measure of the fold (or roll) of the flexible display (step 322). Operation returns to step 316 from step 322.

Figure 48:
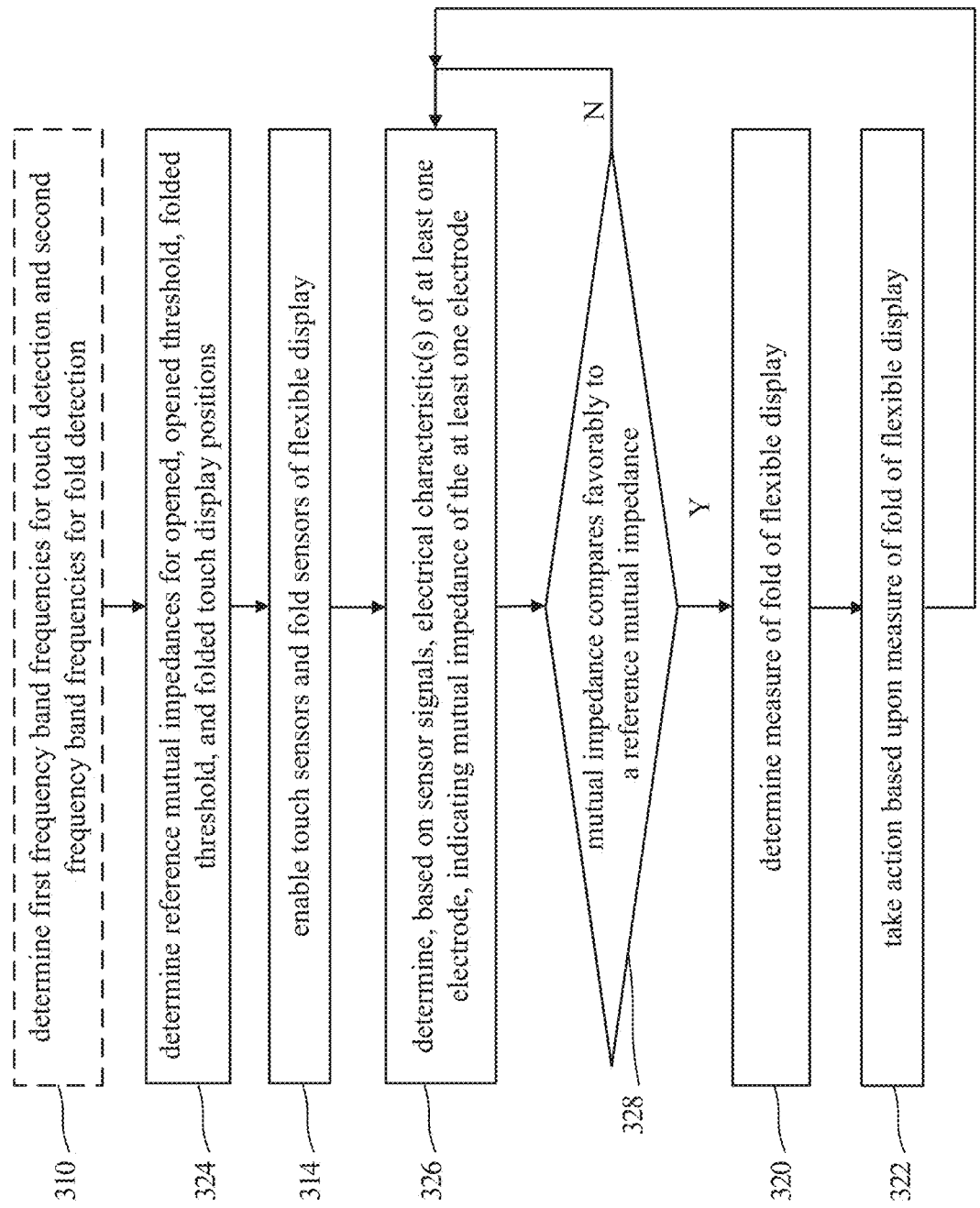
FIG. 48 is a flow chart illustrating operations for determining folding (rolling) of a flexible display based upon mutual impedance of electrode(s) in accordance with embodiments of the present disclosure.

FIG. 48 is a flow chart illustrating operations for determining folding (rolling) of a flexible display based upon mutual impedance of electrode(s) in accordance with embodiments of the present disclosure. The operations of FIG. 48 are similar to those of FIG. 47 but consider mutual impedance instead of self-impedance and, therefore, similar operations are consistently numbered. The operations of FIGS. 47 and 48 may be combined in some embodiments.

The operations of FIG. 48 commence with optionally determining first frequency band frequencies for touch detection and second frequency band frequencies for fold/roll detection (step 310). Operation continues with determining reference mutual-impedances (mutual-capacitance and/or mutual-inductance) of operated electrodes for opened, opened threshold, folded threshold, and folded flexible display positions (step 324). These values may be determined from modeled data for the construct of the flexible display. Alternately, these values may be determined based upon initial and, optionally, periodic measures of the mutual-impedances of the operated electrodes. Similar values may be determined for various roll positions of a rolling flexible display. These values may be sampled over time and interpreted in conjunction with other captured data, e.g., use of the touch areas, to assist in determining when the flexible display is unfolded/unrolled or folded/rolled.

Operation continues with enabling touch sensors (DSCs) and fold sensors (DSCs) of the flexible display (step 314), which may be common sensors for both functions. Then, operation continues with determining, based on the sensor signals, electrical characteristic(s) of at least one electrode, indicating mutual-impedance of the at least one electrode with respect to another electrode (step 326). Next, it is determined whether the mutual-impedance compares favorably to a reference mutual-impedance, e.g., corresponds to a reference mutual-impedance (step 328). If not, operation returns to step 326). If the comparison is favorable, operation includes determining a measure of folding/rolling of the flexible display (or portion thereof) (step 320). Operation continues with taking action based upon a measure of the fold (or roll) of the flexible display (step 322). Operation returns to step 326 from step 322.

Figure 49:
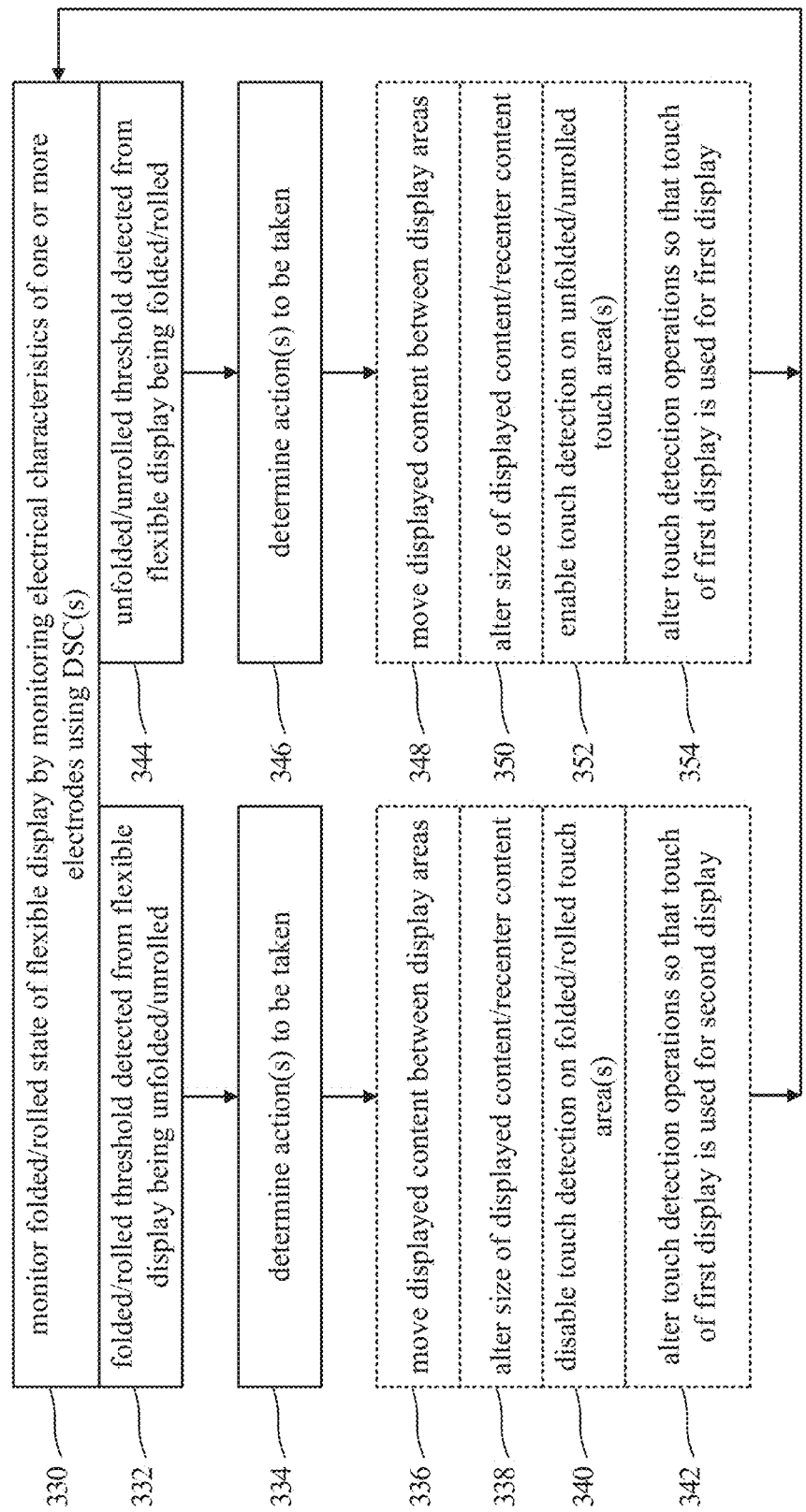
FIG. 49 is a flow chart illustrating alteration of operation of a foldable/rollable touch display based upon folded/rolled position in accordance with embodiments of the present disclosure.

FIG. 49 is a flow chart illustrating alteration of operation of a foldable/rollable touch display based upon folded/rolled position in accordance with embodiments of the present disclosure. Operations begin and continue with monitoring a folded/rolled state of a flexible display by monitoring electrical characteristics of one or more electrodes using DSC(s) (step 330). From step 330, the monitoring may detect a folded/rolled threshold from the flexible display being unfolded/unrolled (step 332). Referring to FIGS. 46B and 46C, such determination may be made when the measured self and/or mutual impedance of an electrode compares favorably with a folded/rolled threshold. With this determination made, operations continue with determining one or more actions to be taken (step 334). Such actions include one or more of moving displayed content between display areas (step 336), altering the size of displayed content/recentering content (step 338), disabling touch detection on folded/rolled touch area(s) (step 340) and altering touch detection operations so that touch of a first display is used for a second display (step 342). Of course, other operations described herein may additionally/alternately be employed when a change in configuration of a flexible display is detected.

Also, from step 330, the monitoring may detect an unfolded/unrolled threshold from the flexible display being folded/rolled (step 344). Referring to FIGS. 46B and 46C, such determination may be made when the measured self and/or mutual impedance of an electrode compares favorably unfolded/unrolled threshold. With this determination made, operations continue with determining one or more actions to be taken (step 346). Such actions include one or more of moving displayed content between display areas (step 348), altering the size of displayed content/recentering content (step 350), enabling touch detection on unfolded/unrolled touch area(s) (step 352) and altering touch detection operations so that touch of a first display is used for the first display (step 354). Of course, other operations described herein may additionally/alternately be employed when a change in configuration of a flexible display is detected.

Figures 50A, 50B:
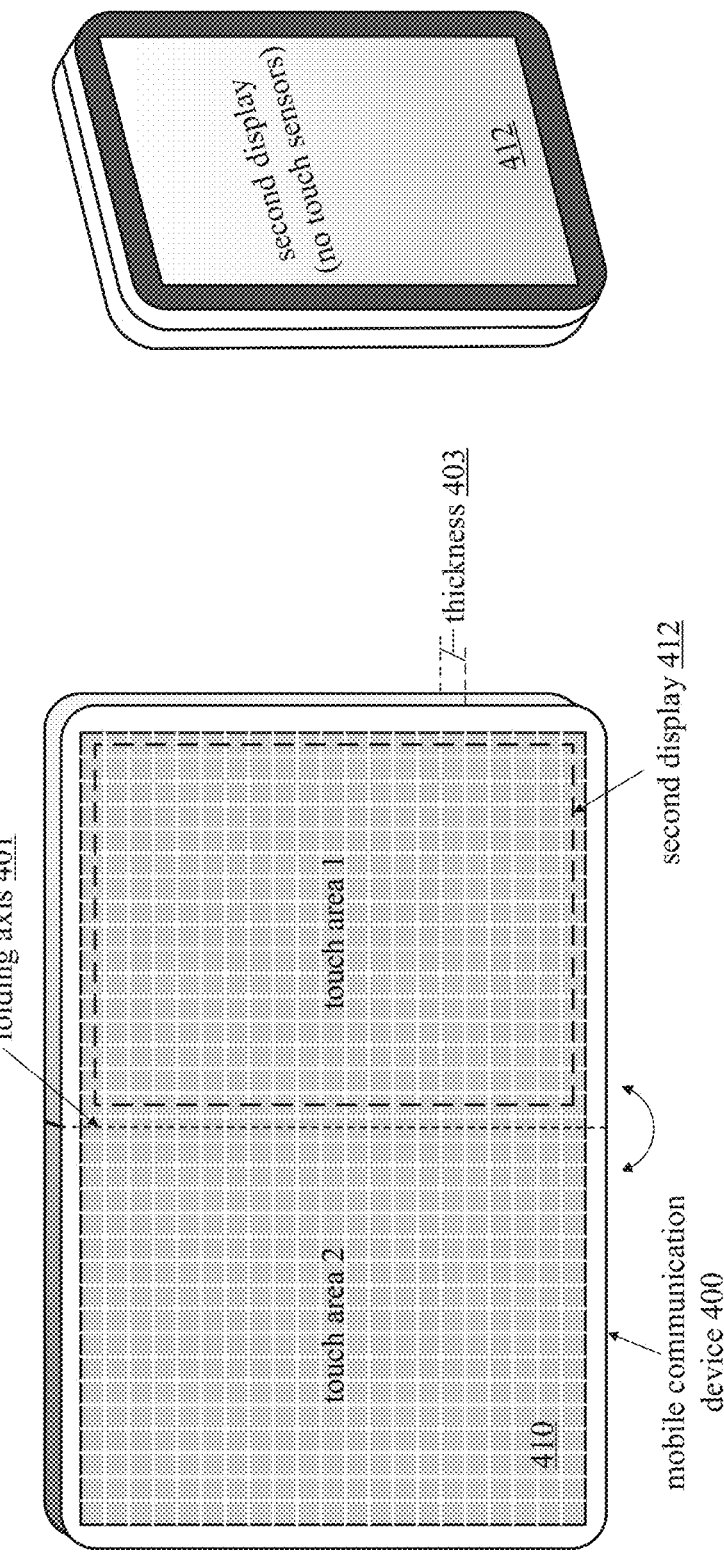
FIG. 50A is an example of a mobile communications device having a folding touch screen display and a second display.
FIG. 50B is an example of a second display of the mobile communications device of FIG. 50A that utilizes touch sensors of a folding touch screen display.

FIG. 50A is an example of a mobile communications device 400 having a flexible display 410 and a (backside) second display 412. The mobile communications device 400 may be a smartphone, tablet device, computing device, gaming device, e-reader, etc. In the illustrated example, the flexible display 410 can include a touch area 1 and a touch area 2 that are delineated by a folding axis 401. The mobile communications device 400 further includes a second display 412 that lacks touch sensors.

In this example, the second display 412 is a backside display disposed on an opposing surface from touch area 1 of the flexible display 410 and is co-planar with touch area 1. The second display 412 can be activated for use, for example, when the mobile communications device 400 is in a folded or substantially folded state such that touch area 1 and touch area 2 are not readily accessible to a user. A distance between touch area 1 of the flexible display 410 and a front surface of the second display 412 is represented as device thickness 403.

As described more fully below, one or more touch sensing layers of the flexible display 410 can be configured to provide touch sensing capabilities for the second display 412 (e.g., when the mobile communications device 400 is in a folded state). In an example, the flexible display 410 includes a plurality of row and column electrodes integrated into the first touch area and coupled to a plurality of drive-sense circuits (DSCs). In this example, a processing module of the mobile communications device 400 selectively configures the DSCs to sense a proximal touch to either touch area 1 or the second display 412.

FIG. 50B illustrates an example of a second display 412 of the mobile communications device 400 of FIG. 50A. The second display 412 can be either a flexible display or anon-flexible display and may be of the same or similar construction to the flexible display 410. In an example, the second display 412 is an OLED/AMOLED display lacking touch sensors/touch sensing capabilities. In another example, the second display 412 is a PMOLED or LCD display and the flexible display 410 is an AMOLED display. The second display 412 can be a full display that covers most or all of a backside of the mobile communications device 400, or a partial display that covers only a portion (e.g., half, or less) of the backside of the mobile communications device 400.

Figure 51:
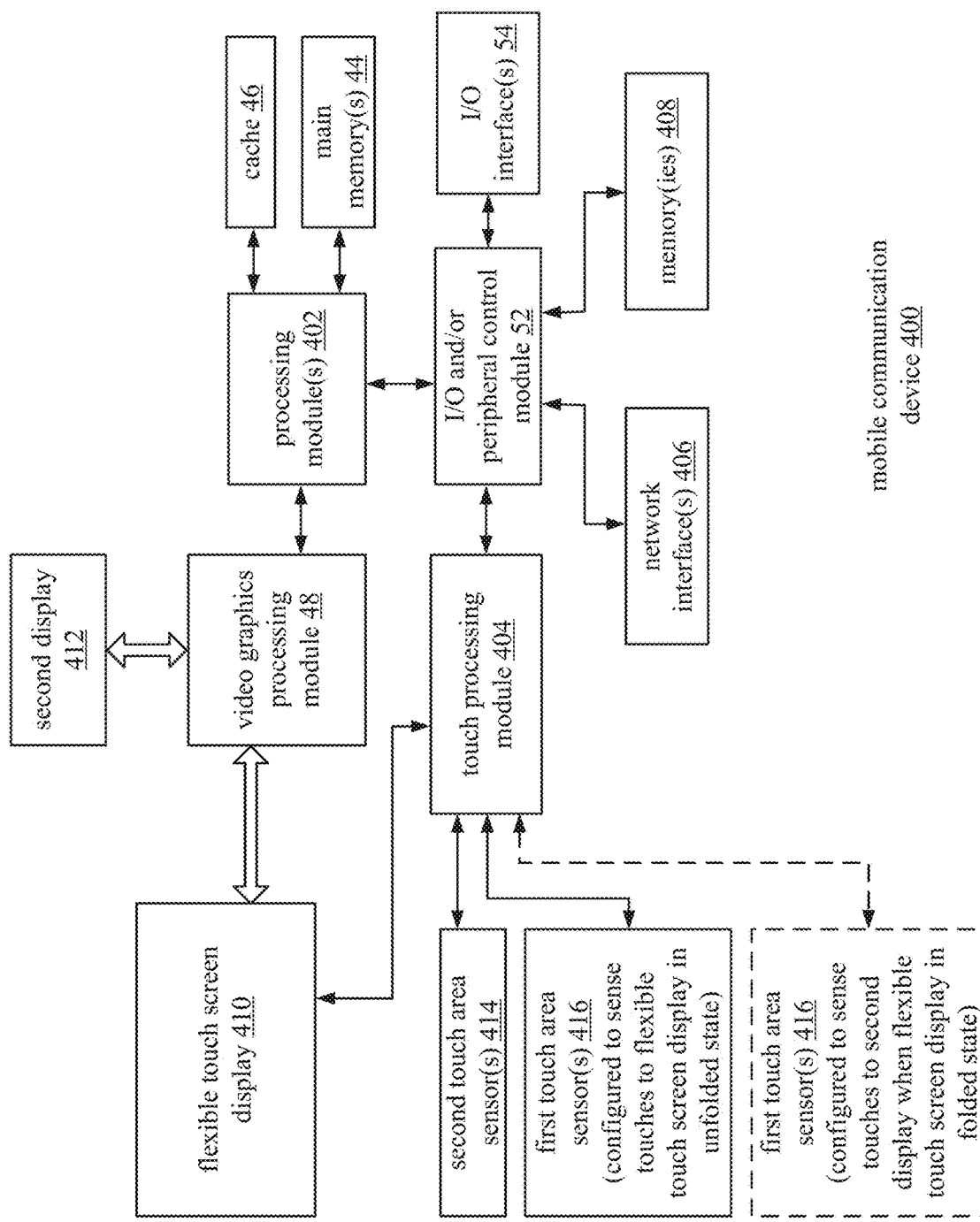
FIG. 51 is a block diagram of a mobile communication device having touch sensors configurable to sense touches to either a flexible touch screen display or a backside display.

FIG. 51 is a block diagram of a mobile communication device 400 having touch sensors configurable to sense touches to either a flexible touch screen display 410 or a second (backside) display 412. The mobile communication device 400 of FIG. 51 has components similar/same as those of the computing device of FIG. 2 with similar elements being number consistently. The mobile communication device 400 of FIG. 51 includes components consistent with a cellular telephone, small format tablet device, and/or another portable communication device. Thus, the mobile communication device 400 includes one or more wired and/or wireless network interfaces 406 to support wireless communications. Further, the mobile communication device 400 includes one or more processing modules 402 and memories 408 tailored to support the mobile communication device 400.

The mobile communication device 400 includes a case, within and upon which its other components are formed/housed. Similar to the computing device of FIG. 2, the mobile communication device 400 includes a touch processing module 404 that couples to a flexible touch screen display 410 that has touch sensors and drive-sense circuits, and which is located on a front surface of the case. The mobile communications device 400 further includes the second display 412 of FIG. 50B. The mobile communication device 400 also includes second touch area sensor(s) 414 and first touch area sensor(s) 416. In this example, the first touch area sensor(s) 416 can be selectively configured by the touch processing module 404 to sense touches to the flexible touch screen display 410 (e.g., when in an unfolded state) or to sense touches to the second display 412 (e.g., when the flexible touch screen display 410 is in a folded state).

Although not explicitly illustrated, the mobile communications device 400 may incorporate various internal structures in the area between the touch area 1 and the second display 412 that improve the ability of the touch sensors of the flexible touch screen display 410 to sense touches to the second display 412. In an example, the mobile communication device 400 incorporates via structures, posts, fasteners, screws, etc. having a relatively high dielectric constant. In another example, the second display 412 is positioned on a region of the backside of the mobile communication device 400 over a region in which the intermediate device layers have the highest dielectric constant with respect to the flexible touch screen display.

When the portion of the mobile communications device 400 including the touch area 1 and the second display 412 is considered as a cross section, the various layers include a first sensor layer, one or more display/dielectric layers, a second sensor layer, a layer including internal device componentry, and a second display 412 layer (the last two layers can be considered the device thickness 403 layers). A first group of drive-sense circuits 28 is coupled to the first sensor layer and a second group of drive-sense circuits 28 is coupled to the second sensor layer.

The device thickness 403 layers act as a dielectric for finger capacitance and/or for pen capacitance. The material, or materials, comprising the device thickness layers 403 will have an effective dielectric constant. A finger (or pen) capacitance is then at least partially based on the effective dielectric constant and thickness of the device thickness 403 layers. In particular, the capacitance (C) equals:

$$C = \epsilon \frac{A}{d}$$ where $A$ is plate area, $\epsilon$ is the dielectric constant(s), and $d$ is the distance between the plates, which includes the thickness of device thickness 403.

As such, the thicker the device thickness 403, the smaller the capacitance (finger and/or pen). As the capacitance decreases, its effect on the self-capacitance of the sensor layers and the effect on the mutual capacitance between the sensor layers is reduced. Accordingly, the drive-sense circuits 28 coupled to the sensors of the first sensor layer and the second sensor layer can be configured to provide the sensor signals at a desired voltage level, which increases as the finger and/or pen capacitance decreases due to the thickness of the device thickness 403 layers. In an embodiment, the first sensor layer includes a plurality of column electrodes, and the second sensor layer includes a plurality of row electrodes.

With a proximal touch on the second display 412, a finger capacitance is present with respect the first and second sensor layers. The finger capacitance includes a first capacitance component from the finger to the first sensor layer ($C_{f1}$) and a second capacitance component from the finger to the second sensor layer ($C_{f2}$). As previously discussed, the finger capacitance is effectively in parallel with the self-capacitances ($C_{p0}$ and $C_{p1}$) of the sensor layers, which increases the effective self-capacitance and decreases impedance at a given frequency. As also previously discussed, the finger capacitance is effectively in series with the mutual capacitance ($C_{m\_0}$) of the sensor layers, which decreases the effective mutual capacitance ($C_{m\_1}$) and increases impedance at a given frequency. This is illustrated with reference to FIGS. 52A-55.

Figure 52A:
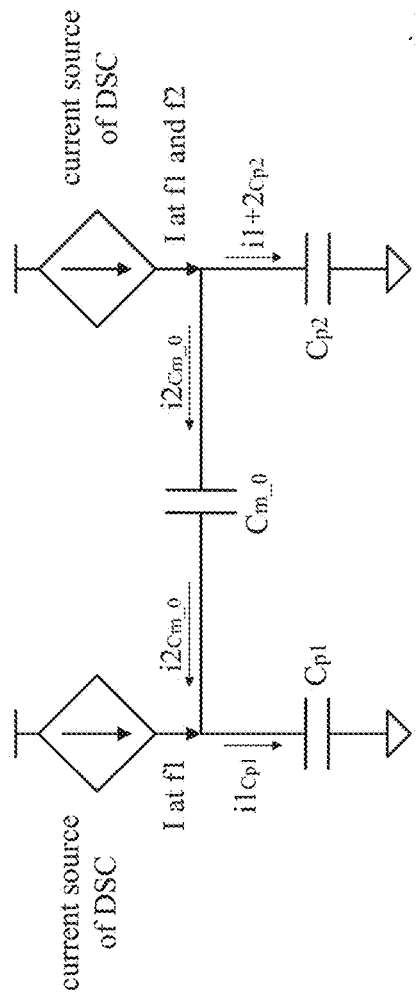
FIG. 52A is a schematic block diagram of an electrical equivalent circuit of two drive-sense circuits coupled to two electrodes without a finger touch.

FIG. 52A is a schematic block diagram of an electrical equivalent circuit of two drive-sense circuits coupled to two electrodes without a finger touch on the second display 412. The drive sense circuits are represented as dependent current sources, the self-capacitance of a first electrode is referenced as Cp1, the self-capacitance of the second electrode is referenced as Cp2, and the mutual capacitance between the electrodes is referenced as Cm_0. In this example, the current source of the first drive sense circuit is providing a controlled current (I at f1) that includes a DC component and an oscillating component, which oscillates at frequency f1. The current source of the second drive sense circuit is providing a controlled current (I at f1 and at f2) that includes a DC component and two oscillating components at frequency f1 and frequency f2.

The first controlled current (I at f1) has one component i1Cp1 and the second controlled current (I at f1 and f2) has two components: i1+2Cp2 and i2Cm_0. The current ratio between the two components for a controlled current is based on the respective impedances of the two paths.

Figure 52B:
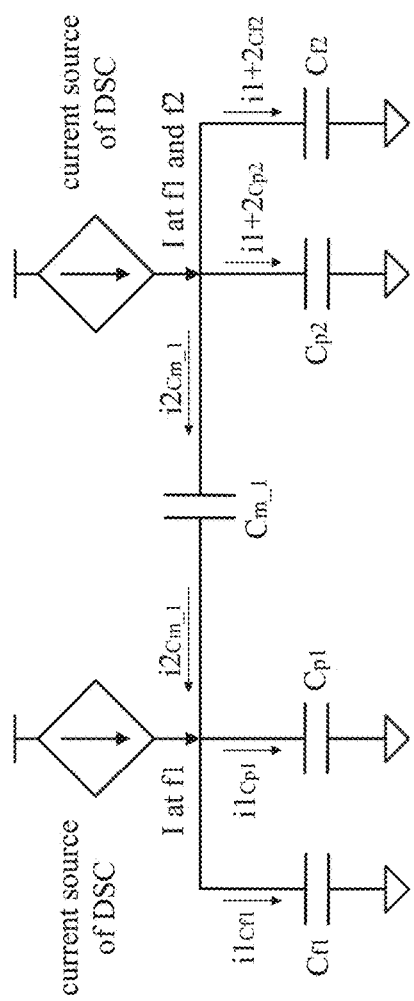
FIG. 52B is a schematic block diagram of an electrical equivalent circuit of two drive-sense circuits coupled to two electrodes as shown in FIG. 52A, but with a finger touch.

FIG. 52B is a schematic block diagram of an electrical equivalent circuit of two drive-sense circuits coupled to two electrodes as shown in FIG. 52A, but with a finger touch on the second display 412. The finger touch is represented by the finger capacitances (Cf1 and Cf2), which are in parallel with the self-capacitance (Cp1 and Cp2). The dependent current sources are providing the same levels of current as in FIG. 54A (I at f1 and I at f1 and f2).

In this example, however, more current is being directed towards the self-capacitance in parallel with the finger capacitance than in FIG. 54A. Further, less current is being directed towards the mutual capacitance (Cm_1) (i.e., taking charge away from the mutual capacitance, where C=Q/V). With the self-capacitance effectively having an increase in capacitance due to the finger capacitance, its impedance decreases and, with the mutual capacitance effectively having a decrease in capacitance, its impedance increases.

The drive sense circuits can detect the change in the impedance of the self-capacitance and of the mutual capacitance when the change is within the sensitivity of the drive sense circuits. For example, V=I*Z, I*t=C*V, and Z=½πfC (where V is voltage, I is current, Z is impedance, t is time, C is capacitance, and f is the frequency), thus V=I*½πfC. If the change between C is small, then the change in V will be small. If the change in V is too small to be detected by the drive sense circuit, then a finger touch will go undetected. To reduce the chance of missing a touch due to device thickness 403, the voltage (V) and/or the current (I) can be increased. As such, for small capacitance changes, the increased voltage and/or current allows the drive sense circuit to detect a change in impedance. As an example, as device thickness 403 increases, the voltage and/or current is increased by 2 to more than 100 times.

FIG. 52C is a schematic block diagram of an electrical equivalent circuit of a single drive-sense circuit coupled to an electrode with a finger touch. This is similar to FIG. 52B, but for just one drive-sense circuit and one electrode. In this example, the drive-sense circuit is represented as a dependent current source, the self-capacitance of the electrode is referenced as $C_{p1}$, and the capacitance of the finger touch is represented as $C_{f1}$. The drive-sense circuit is providing a controlled current (I at f1) that includes a DC component and an oscillating component, which oscillates at frequency f1, and the controlled current (I at f1) has two components: i1$_{Cp1}$ and i1$_{Cf1}$.

FIG. 53 is an example graph that plots finger capacitance verses device thickness 403 for the example of FIGS. 50A and 50B. As shown, as the thickness of the device thickness 403 increases, the finger capacitance decreases. This effects changes in the mutual capacitance as shown in FIG. 54 and in self-capacitance as shown in FIG. 55.

FIG. 54 is an example graph that plots mutual capacitance verses device thickness 403 and drive voltage verses device thickness 403 for the example of FIG. 50A. As shown, as the thickness increases, the difference between the mutual capacitance without a touch and mutual capacitance with a touch decreases. In order for the decreasing difference to be detected, the voltage (or current) sourced to the electrode increases substantially inversely proportion to the decrease in finger capacitance.

FIG. 55 is an example graph that plots self-capacitance verses device thickness 403 and drive voltage verses device thickness 403 for the example of FIG. 50A. As shown, as the thickness increases, the difference between the self-capacitance without a touch and self-capacitance with a touch decreases. In order for the decreasing difference to be detected, the voltage (or current) sourced to the electrode increases substantially inversely proportion to the decrease in finger capacitance.

FIG. 56 is a flow chart illustrating operation of the mobile communication device of the example of FIG. 50A. The method is performed by one or more processing modules of the mobile communication device 400, such as touch processing module 404 and/or processing module(s) 402 ("processing module"). The method begins at step 420 with a mobile communications device having a flexible touch screen display having at least a first touch area (e.g., touch area 1) and a second display disposed on an opposing side of the device from the first touch area.

When the flexible touch screen display is in an unfolded state at step 422 as determined by the processing module, the method continues at step 426 where the processing module enables the touch sensors of the flexible touch screen display to sense touches on the display. Next, at step 428, the processing module determines touches to at least the first touch area of the flexible touch screen display. The method continues at step 430 where the processing module determines whether the flexible touch screen display is in a folded state. In response to determining that the display is not folded, the processing module continues to sense touches to flexible touch screen display at step 428. In response to determining that the flexible touch screen display is in a folded state, the method continues at (optional) step 432, and the processing module disables touch sensors of the display outside of the first touch area.

When the flexible touch screen display is in a folded state at step 424 as determined by the processing module, the method continues at step 434 where the processing module configures touch sensors of the first touch area of the flexible touch screen display to sense proximal touches to the second display (e.g., by increasing a voltage and/or current level of sensor signals generated by drive-sense circuits coupled to touch sensors of the first touch area). The method continues at step 436 where the processing module determines touches to area(s) of the second display.

Referring to the drawings and the prior description herein various particular embodiments are contemplated. According to one embodiment, a device includes a flexible display configured to display images in at least a first touch area and a second touch area, wherein the first touch area is configured to rotate with respect to the second touch area along a folding axis, a first plurality of column electrodes integrated into the first touch area of the flexible display, a second plurality of column electrodes integrated into the second touch area of the flexible display, at least one folding axis column electrode extending along the folding axis of the flexible display, a plurality of row electrodes integrated into and extending across the first touch area and the second touch area of the flexible display; and a plurality of drive-sense circuits configured to drive sensor signals on the first plurality of column electrodes, the second plurality of column electrodes, and the plurality of row electrodes.

The device further includes a processing module coupled to the plurality of drive-sense circuits, the processing module configured to sense, based on the sensor signals, a first electrical characteristic of at least one row electrode and at least one column electrode of the first plurality of column electrodes or the second plurality of column electrodes, determine, based on the first electrical characteristic, a proximal touch to at least one of the first touch area or the second touch area, sense, based on the sensor signals, a second electrical characteristic of at least one row electrode and at least one folding axis column electrode, and determine, based on the second electrical characteristic, a measure of fold between the first touch area and the second touch area.

With another embodiment, a device includes a flexible display configured to display images in at least a first touch area, a second touch area, and a third touch area, wherein the first touch area is configured to rotate with respect to the second touch area along a first folding axis, and the third touch area is configured to rotate with respect to the second touch area along a second folding axis, a first plurality of column electrodes integrated into the first touch area of the flexible display, a second plurality of column electrodes integrated into the second touch area of the flexible display, a third plurality of column electrodes integrated into the third touch area of the flexible display, at least one first folding axis column electrode extending along the first folding axis, at least one second folding axis column electrode extending along the second folding axis, a plurality of row electrodes integrated into and extending across the first touch area, the second touch area, and the third touch area, a plurality of drive-sense circuits configured to drive sensor signals on the first plurality of column electrodes, the second plurality of column electrodes, the third plurality of column electrodes, and the plurality of row electrodes and a processing module coupled to the plurality of drive-sense circuits.

The processing module is configured to sense, based on the sensor signals, a first electrical characteristic of at least one row electrode and at least one column electrode of the first plurality of column electrodes, the second plurality of column electrodes or the third plurality of column electrodes, determine, based on the first electrical characteristic, a proximal touch to at least one of the first touch area, the second touch area or the third touch area, sense, based on the sensor signals, a second electrical characteristic of at least one row electrode and at least one first folding axis column electrode, determine, based on the second electrical characteristic, a measure of fold between the first touch area and the second touch area, sense, based on the sensor signals, a third electrical characteristic of at least one row electrode and at least one second folding axis column electrode, and determine, based on the third electrical characteristic, a measure of fold between the second touch area and the third touch area.

With another embodiment, a device includes a flexible display configured to display images in at least a first touch area and a second touch area, wherein the first touch area is configured to rotate with respect to the second touch area along a folding axis, a first plurality of column electrodes integrated into the first touch area of the flexible display, a second plurality of column electrodes integrated into the second touch area of the flexible display, a plurality of row electrodes integrated into and extending across the first touch area and the second touch area, a plurality of drive-sense circuits configured to drive sensor signals on the first plurality of column electrodes, the second plurality of column electrodes, and the plurality of row electrodes, and a processing module coupled to the plurality of drive-sense circuits. The processing module configured to sense, based on the sensor signals, a first electrical characteristic of at least one row electrode and at least one column electrode of the first plurality of column electrodes or the second plurality of column electrodes, determine, based on the first electrical characteristic, a proximal touch to at least one of the first touch area or the second touch area, sense, based on the sensor signals, a second electrical characteristic of at least one row electrode, and determine, based on the second electrical characteristic, a measure of fold between the first touch area and the second touch area.

With still another embodiment, a device includes a flexible display configured to display images in at least a first touch area and a second touch area, wherein the first touch area is configured to rotate with respect to the second touch area along a folding axis, a plurality of first column electrodes integrated into the first touch area of the flexible display, a plurality of first row electrodes integrated into the first touch area of the flexible display, a plurality of second column electrodes integrated into the second touch area of the flexible display, a plurality of second row electrodes integrated into and extending across the second touch area of the flexible display, a plurality of drive-sense circuits and a processing module. The plurality of drive-sense circuits are configured to drive sensor signals in a first frequency group on the first plurality of column electrodes and the first plurality of row electrodes and drive sensor signals in a second frequency group on the second plurality of column electrodes and the second plurality of row electrodes, the second frequency group having at least one non-common frequency component that is not present in the first frequency group. The processing module is coupled to the plurality of drive-sense circuits and is configured to sense, based on the sensor signals, a first electrical characteristic of at least one row electrode of the first plurality of column electrodes and at least one column electrode of the first plurality of column electrodes, determine, based on the first electrical characteristic, a proximal touch to the first touch area, sense, based on the sensor signals, a second electrical characteristic of at least one row electrode of the second plurality of column electrodes and at least one column electrode of the second plurality of column electrodes, determine, based on the second electrical characteristic, a proximal touch to the second touch area, sense, based on the sensor signals, a third electrical characteristic of at least one row electrode of the first plurality of column electrodes and/or at least one column electrode of the first plurality of column electrodes based upon presence of the at least one non-common frequency component and determine, based on the third electrical characteristic, a measure of fold between the first touch area and the second touch area.

These embodiments include optional aspects. With a one optional aspect, the at least one folding axis electrode belongs to one or more of the first plurality of column electrodes and the second plurality of column electrodes. With another optional aspect, the second electrical characteristic indicates one or more of mutual capacitance between the at least one row electrode and the at least one folding axis column electrode, self-capacitance of a row electrode or a combination of these, mutual capacitance between an electrode and another substantially parallel conductor. With yet another optional aspect, a sensor signal of the sensor signals includes a drive signal component and a receive signal component, wherein a drive-sense circuit of the plurality of drive-sense circuits generates the drive signal component and interprets the receive signal component to produce a representation of impedance of an electrode coupled to the drive-sense circuit.

With yet another optional aspect, at least one drive signal component in a first frequency band and the second electrical characteristic is based on at least one drive signal component in a second frequency band that is greater than the first frequency band. With another optional aspect, the at least one first folding axis electrode belongs to one or more of the first plurality of column electrodes and the second plurality of column electrodes and the at least one second folding axis electrode belongs to one or more of the second plurality of column electrodes and the third plurality of column electrodes.

According to another embodiment, a device includes a flexible display configured to display images in at least a first touch area, a second touch area, and a third touch area, wherein the first touch area is configured to rotate with respect to the second touch area along a first folding axis, and the third touch area is configured to rotate with respect to the second touch area along a second folding axis, a first plurality of column electrodes integrated into the first touch area of the flexible display, a second plurality of column electrodes integrated into the second touch area of the flexible display, a third plurality of column electrodes integrated into the third touch area of the flexible display, a plurality of row electrodes integrated into and extending across the first touch area, the second touch area, and the third touch area, a plurality of drive-sense circuits configured to drive sensor signals on the first plurality of column electrodes, the second plurality of column electrodes, the third plurality of column electrodes, and the plurality of row electrodes and a processing module. The processing module couples to the plurality of drive-sense circuits and is configured to sense, based on the sensor signals, a first electrical characteristic of at least one row electrode and at least one column electrode of the first plurality of column electrodes, the second plurality of column electrodes or the third plurality of column electrodes, determine, based on the first electrical characteristic, a proximal touch to at least one of the first touch area, the second touch area or the third touch area, sense, based on the sensor signals, a second electrical characteristic of at least one row electrode and at least one first folding axis column electrode, determine, based on the second electrical characteristic, a measure of fold between the first touch area and the second touch area, and determine that the measure of fold exceeds a closed fold threshold and, based upon the determination, disable at least a portion of the functionality of the first touch area or the second touch area.

With still another embodiment, a device includes a flexible display configured to display images in at least a first touch area, a second touch area, and a third touch area, wherein the first touch area is configured to rotate with respect to the second touch area along a first folding axis, and the third touch area is configured to rotate with respect to the second touch area along a second folding axis, a first plurality of column electrodes integrated into the first touch area of the flexible display, a first plurality of row electrodes integrated into the first touch area of the flexible display, a second plurality of column electrodes integrated into the second touch area of the flexible display, a second plurality of row electrodes integrated into the second touch area of the flexible display, a third plurality of column electrodes integrated into the third touch area of the flexible display, a third plurality of row electrodes integrated into the third touch area of the flexible display, a plurality of drive-sense circuits configured to drive sensor signals on the first plurality of column electrodes, the first plurality of row electrodes, the second plurality of column electrodes, the second plurality of tow electrodes, the third plurality of column electrodes, and the third plurality of row electrodes, and a processing module. The processing module couples to the plurality of drive-sense circuits and is configured to sense, based on the sensor signals, electrical characteristics of at least one row electrode and at least one column electrode of the first, second or third touch area, determine, based on the first electrical characteristic, a proximal touch to at least one of the first touch area, the second touch area or the third touch area, sense, based on the sensor signals, a second electrical characteristic of at least one row electrode and at least one first folding axis column electrode, determine, based on the second electrical characteristic, a measure of fold between the first touch area and the second touch area, and determine that the measure of fold exceeds a closed fold threshold and, based upon the determination, disable at least a portion of the functionality of the first touch area or the second touch area.

The embodiments may include optional aspects. With one optional aspect, the at least a portion of the functionality includes at least one of touch detection functionality or display functionality. With another optional aspect, at least a portion of the functionality includes redirecting video display from a first one of the first, second or third touch areas to a different one of the first, second or third touch areas. With another optional aspect, the processing module is further configured to determine that the measure of fold is less than an opened fold threshold and, based upon the determination, enable at least a portion of the functionality of the first touch area or the second touch area.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal $X>5$ is equivalent to determining if $-X<-5$, and the comparison to determine if signal A matches signal B can likewise be performed by determining $-A$ matches $-B$ or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or may further include memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above-described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A device comprising:
   a flexible display configured to display images in at least a first touch area and a second touch area, wherein the first touch area is configured to rotate with respect to the second touch area along a folding axis;
   a first plurality of column electrodes integrated into the first touch area of the flexible display;
   a first plurality of row electrodes integrated into the first touch area of the flexible display;
   a first plurality of drive-sense circuits operable, when enabled, to drive sensor signals on the first plurality of column electrodes and the first plurality of row electrodes;
   a second plurality of column electrodes integrated into the second touch area of the flexible display;
   a second plurality of row electrodes integrated into the second touch area of the flexible display;
   a second plurality of drive-sense circuits operable, when enabled, to drive sensor signals on the second plurality of column electrodes and the second plurality of row electrodes; and
   a processing module coupled to the first plurality of drive-sense circuits and the second plurality of drive-sense circuits, the processing module configured to:
      sense, based on the sensor signals, an electrical characteristic of at least one row electrode and at least one column electrode of the first touch area or the second touch area; and
      determine, based on the electrical characteristic, a proximal touch to at least one of the first touch area or the second touch area.

2. The device of claim 1, wherein a sensor signal of the sensor signals includes a drive signal component and a receive signal component, wherein a drive-sense circuit of the drive-sense circuits generates the drive signal component and interprets the receive signal component to produce a representation of an impedance on an electrode coupled to the drive-sense circuit.

3. The device of claim 2, further comprising:
   digital filtering circuitry coupled between the drive-sense circuits and the processing module; and
   reference signal circuitry coupled to the first plurality of drive-sense circuits and the second plurality of drive-sense circuits, wherein the processing module is further configured to generate control signals to enable the reference signal circuitry to provide reference signals to the drive-sense circuits for establishing drive signal components of the sensor signals.

4. The device of claim 1, wherein:
   the first plurality of column electrodes are formed of a first set of conductive pads of the flexible display;
   the second plurality of column electrodes are formed of a second set of conductive pads of the flexible display;
   the first plurality of row electrodes are formed of a third set of conductive pads of the flexible display; and
   the second plurality of row electrodes are formed of a fourth set of conductive pads of the flexible display.

5. The device of claim 1, wherein the first plurality of column electrodes, the second plurality of column electrodes, the first plurality of row electrodes, and the second plurality of row electrodes are line electrodes, and wherein the first plurality of column electrodes are separated from the first plurality of row electrodes by a dielectric layer and arranged in a crossing pattern, and the second plurality of column electrodes are separated from the second plurality of row electrodes by the dielectric layer and arranged in a crossing pattern.

6. The device of claim 1, wherein the flexible display is an organic light-emitting diode (OLED) display or an active matrix organic light emitting diode (AMOLED) display.

7. The device of claim 1, wherein the flexible display is formed on a substrate comprising at least one of a flexible glass, a flexible metal or a flexible plastic.

8. The device of claim 1, wherein the first plurality of column electrodes, the second plurality of column electrodes, the first plurality of row electrodes, and the second plurality of row electrodes are formed of a substantially transparent metal, graphene or indium tin oxide (ITO).

9. The device of claim 1, further comprising:
a second display disposed, at least in part, on an opposing side of the device from the first touch area of the flexible display.

10. The device of claim 9, wherein the second display is a touch display including:
a third plurality of column electrodes integrated into the touch display;
a third plurality of row electrodes integrated into the touch display; and
a third plurality of drive-sense circuits operable, when enabled, to drive sensor signals on the third plurality of column electrodes and the third plurality of row electrodes.

11. A device comprising:
a flexible display configured to display images in at least a first touch area, a second touch area, and a third touch area, wherein the first touch area is configured to rotate with respect to the second touch area along a first folding axis, and the third touch area is configured to rotate with respect to the second touch area along a second folding axis;
a first plurality of column electrodes and a first plurality of row electrodes integrated into the first touch area of the flexible display;
a second plurality of column electrodes and a second plurality of row electrodes integrated into the second touch area of the flexible display;
a third plurality of column electrodes and a third plurality of row electrodes integrated into the third touch area of the flexible display;
a plurality of drive-sense circuits operable, when enabled, to drive sensor signals on the first plurality of column electrodes, the second plurality of column electrodes, the third plurality of column electrodes, the first plurality of row electrodes, the second plurality of row electrodes, and the third plurality of row electrodes; and
a processing module coupled to the plurality of drive-sense circuits, the processing module configured to:
sense, based on the sensor signals, an electrical characteristic of at least one row electrode and at least one column electrode of the first touch area, the second touch area or the third touch area; and
determine, based on the electrical characteristic, a proximal touch to at least one of the first touch area, the second touch area or the third touch area.

12. The device of claim 11, wherein a sensor signal of the sensor signals includes a drive signal component and a receive signal component, wherein a drive-sense circuit of the plurality of drive-sense circuits generates the drive signal component and interprets the receive signal component to produce a representation of an impedance on an electrode coupled to the drive-sense circuit.

13. The device of claim 12, further comprising:
digital filtering circuitry coupled between the plurality of drive-sense circuits and the processing module; and
reference signal circuitry coupled to the plurality of drive-sense circuits, wherein the processing module is further configured to generate control signals to enable the reference signal circuitry to provide reference signals to the plurality of drive-sense circuits for establishing drive signal components of the sensor signals.

14. The device of claim 11, wherein:
the first plurality of column electrodes are formed of a first set of conductive pads of the flexible display;
the second plurality of column electrodes are formed of a second set of conductive pads of the flexible display;
the third plurality of column electrodes are formed of a third set of conductive pads of the flexible display;
the first plurality of row electrodes are formed of a fourth set of conductive pads of the flexible display;
the second plurality of row electrodes are formed of a fifth set of conductive pads of the flexible display; and
the third plurality of row electrodes are formed of a sixth set of conductive pads of the flexible display.

15. The device of claim 11, wherein the first plurality of column electrodes, the second plurality of column electrodes, the third plurality of column electrodes, and the first plurality of row electrodes, the second plurality of row electrodes, and the third plurality of row electrodes are line electrodes, and wherein the first plurality of column electrodes are separated from the first plurality of row electrodes by a dielectric layer and arranged in a crossing pattern, the second plurality of column electrodes are separated from the second plurality of row electrodes by the dielectric layer and arranged in a crossing pattern, and the third plurality of column electrodes are separated from the third plurality of row electrodes by the dielectric layer and arranged in a crossing pattern.

16. The device of claim 11, further comprising:
a second display substantially disposed on an opposing side of the device from at least one of the first touch area, the second touch area or the third touch area of the flexible display.

17. A device comprising:
a flexible display configured to display images in at least a first touch area and a second touch area, wherein the first touch area is configured to rotate with respect to the second touch area along a folding axis;
a second display disposed, at least in part, on an opposing side of the device from at least one of the first touch area or the second touch area of the flexible display, the second display configured to display images in a third touch area;
a first plurality of column electrodes and a first plurality of row electrodes integrated into the first touch area of the flexible display;
a second plurality of column electrodes and a second plurality of row electrodes integrated into the second touch area of the flexible display;
a third plurality of column electrodes and a third plurality of row electrodes integrated into the third touch area of the second display;
a plurality of drive-sense circuits operable, when enabled, to drive sensor signals on the first plurality of column electrodes, the second plurality of column electrodes, the third plurality of column electrodes, the first plurality of row electrodes, the second plurality of row electrodes, and the third plurality of row electrodes; and
a processing module coupled to the plurality of drive-sense circuits, the processing module configured to:
sense, based on the sensor signals, an electrical characteristic of at least one row electrode and at least one column electrode of the first touch area, the second touch area or the third touch area; and determine, based on the electrical characteristic, a proximal touch to at least one of the first touch area, the second touch area, or the third touch area.

18. The device of claim 17, wherein the second display is a second flexible display.

19. The device of claim 17, wherein a sensor signal of the sensor signals includes a drive signal component and a receive signal component, wherein a drive-sense circuit of the plurality of drive-sense circuits generates the drive signal component and interprets the receive signal component to produce a representation of an impedance on an electrode coupled to the drive-sense circuit.

20. The device of claim 19, further comprising:

digital filtering circuitry coupled between the plurality of drive-sense circuits and the processing module; and reference signal circuitry coupled to the plurality of drive-sense circuits, wherein the processing module is further configured to generate control signals to enable the reference signal circuitry to provide reference signals to the plurality of drive-sense circuits for establishing drive signal components of the sensor signals.

* * * * *